United States Patent
Lee et al.

(10) Patent No.: US 10,469,189 B2
(45) Date of Patent: Nov. 5, 2019

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jangwon Lee, Seoul (KR); Sejin Oh, Seoul (KR); Woosuk Kwon, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/113,827

(22) Filed: Aug. 27, 2018

(65) Prior Publication Data
US 2018/0367227 A1    Dec. 20, 2018

Related U.S. Application Data

(63) Continuation of application No. 14/913,934, filed as application No. PCT/KR2014/013065 on Dec. 30, 2014, now Pat. No. 10,097,294.
(Continued)

(51) Int. Cl.
*H04H 20/71* (2008.01)
*H04L 29/06* (2006.01)
(Continued)

(52) U.S. Cl.
CPC ......... *H04H 20/71* (2013.01); *H04L 65/4069* (2013.01); *H04L 65/4076* (2013.01);
(Continued)

(58) Field of Classification Search
CPC ... H04L 65/601; H04L 65/608; H04L 65/607; H04L 69/22; H04L 69/326; H04L 67/02;
(Continued)

(56) References Cited

U.S. PATENT DOCUMENTS

2005/0160184 A1*  7/2005  Walsh ................. H04L 12/1868
                                                              709/247
2006/0015568 A1*  1/2006  Walsh ................. H04L 12/1859
                                                              709/217
(Continued)

FOREIGN PATENT DOCUMENTS

CN    101931029  A    12/2010
CN    103262556  A    8/2013
(Continued)

OTHER PUBLICATIONS

Luby et al., "Layered Coding Transport (LCT) Building Block," RFC5651.TXT, Internet Society (ISOC) 4, Rue Des Falaises Ch-1205, Geneva, Switzerland, Oct. 1, 2009, XP015065692, pp. 1-34.
(Continued)

*Primary Examiner* — Aristrocratis Fotakis
(74) *Attorney, Agent, or Firm* — Birch, Stewart, Kolasch & Birch, LLP

(57) ABSTRACT

A device with one or more processors for processing broadcast signals, the device including a depacketizing processor for extracting one or more delivery objects from one or more Layered Coding Transport (LCT) packets of the broadcast signals based on signaling information including mapping information, wherein the one or more LCT packet are used to transport the one or more delivery objects including service data for one or more broadcast services of the broadcast signals, wherein the one or more delivery object are carried in one or more transport sessions, wherein each LCT packet includes a header having a Transport Object Identifier (TOI) identifying a delivery object being carried in
(Continued)

the each LCT packet, wherein the mapping information is used to establish a one-to-one mapping between the TOI and a uniform resource locator (URL) for the delivery object, wherein the one or more LCT packets and the signaling information are transmitted separately, wherein the header of each LCT packet further includes type information indicating whether a type of the delivery object being carried in the each LCT packet is a media segment type or an initialization segment type and a decoding processor for decoding the service data for the broadcast service.

4 Claims, 43 Drawing Sheets

Related U.S. Application Data

(60) Provisional application No. 61/923,242, filed on Jan. 3, 2014.

(51) Int. Cl.
*H04L 29/08* (2006.01)
*H04N 19/89* (2014.01)
*H04N 21/235* (2011.01)
*H04N 21/236* (2011.01)
*H04N 21/61* (2011.01)
*H04N 21/84* (2011.01)
*H04N 21/2362* (2011.01)

(52) U.S. Cl.
CPC .......... *H04L 65/602* (2013.01); *H04L 65/607* (2013.01); *H04L 67/02* (2013.01); *H04N 19/89* (2014.11); *H04N 21/235* (2013.01); *H04N 21/236* (2013.01); *H04N 21/2362* (2013.01); *H04N 21/23614* (2013.01); *H04N 21/6131* (2013.01); *H04N 21/84* (2013.01)

(58) Field of Classification Search
CPC ............... H04L 65/4069; H04N 21/84; H04N 21/8586; H04N 21/262; H04N 19/89
See application file for complete search history.

(56) References Cited

U.S. PATENT DOCUMENTS

| | | | |
|---|---|---|---|
| 2006/0107169 A1* | 5/2006 | Vedantham | H04L 1/004 714/752 |
| 2009/0080865 A1 | 3/2009 | Jang et al. | |
| 2009/0316831 A1* | 12/2009 | Song | H04L 27/02 375/301 |
| 2012/0239785 A1 | 9/2012 | Pazos | |
| 2013/0014202 A1 | 1/2013 | Suh | |
| 2013/0036234 A1 | 2/2013 | Pazos et al. | |
| 2013/0191860 A1 | 7/2013 | Kitazato et al. | |
| 2013/0254631 A1 | 9/2013 | Luby et al. | |
| 2013/0291050 A1* | 10/2013 | Kim | H04N 21/2362 725/118 |
| 2014/0098745 A1 | 4/2014 | Balasubramanian et al. | |
| 2014/0201796 A1 | 7/2014 | Moon et al. | |
| 2014/0201797 A1* | 7/2014 | Kim | H04N 21/26241 725/116 |
| 2014/0229529 A1 | 8/2014 | Barone et al. | |
| 2014/0307734 A1* | 10/2014 | Luby | H04L 12/18 370/390 |
| 2015/0100996 A1* | 4/2015 | Freeman | H04N 21/4385 725/110 |
| 2015/0172348 A1 | 6/2015 | Lohmar et al. | |
| 2015/0215369 A1 | 7/2015 | Yamagishi | |
| 2015/0229676 A1 | 8/2015 | Bouazizi et al. | |
| 2016/0219311 A1 | 7/2016 | Yamagishi | |
| 2018/0278970 A1* | 9/2018 | So | H04L 1/00 |

FOREIGN PATENT DOCUMENTS

| | | |
|---|---|---|
| EP | 3065414 A1 | 9/2016 |
| KR | 10-0848273 B1 | 7/2008 |
| WO | WO 2012/138909 A1 | 10/2012 |
| WO | WO 2013/022309 A1 | 2/2013 |
| WO | WO 2013/107502 A1 | 7/2013 |
| WO | WO 2014/169233 A2 | 10/2014 |

OTHER PUBLICATIONS

Paila et al., "FLUTE—FIle Delivery over Undirectional Transport", Qualcomm Technologies, Inc., Internet Engineering Task Force (IETF), Nov. 2012, 1 page, ISSN: 2070-1721.

* cited by examiner

[Fig. 1]
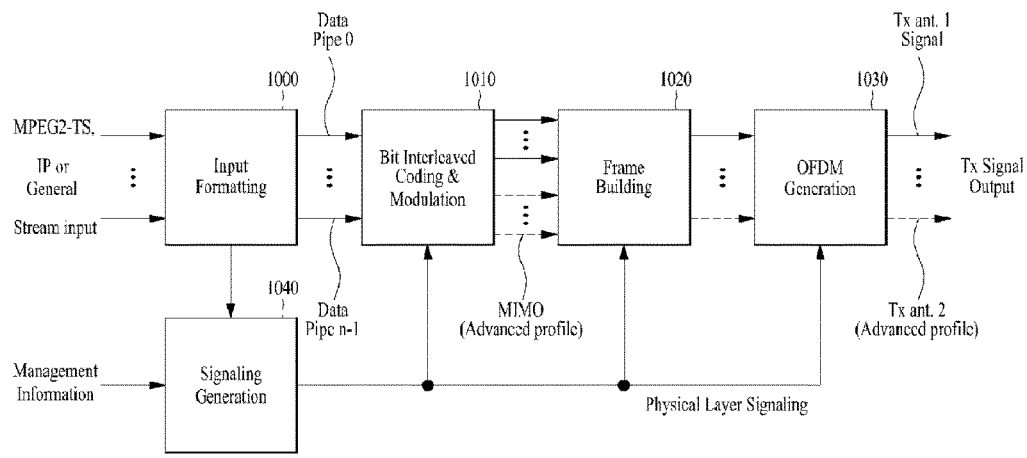
[Fig. 2]
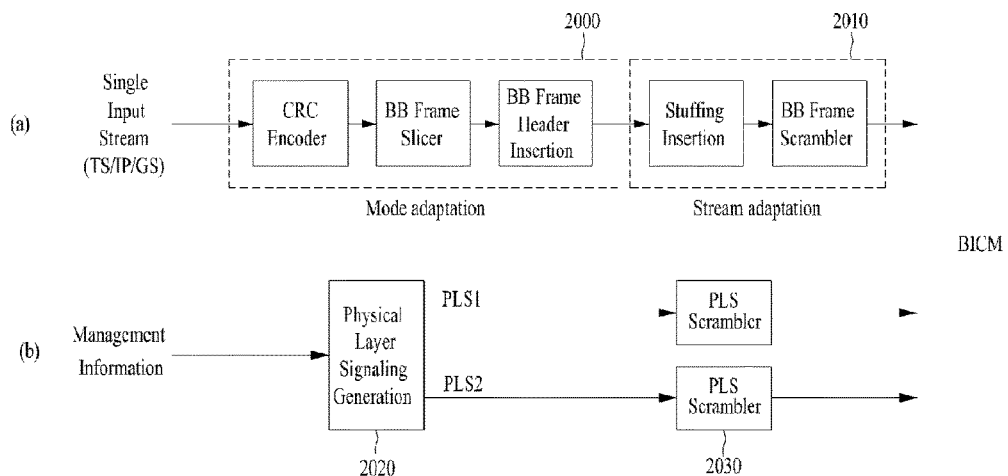
[Fig. 3]
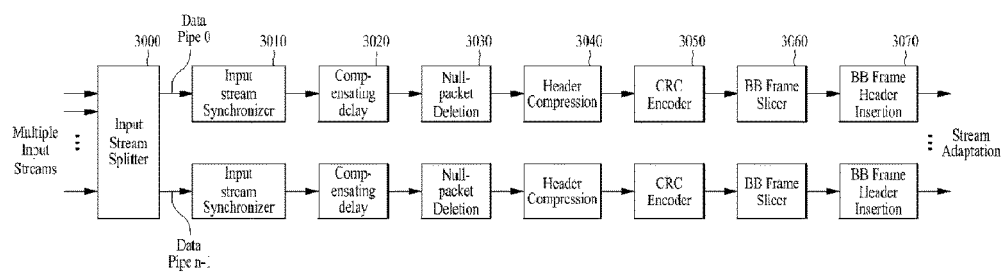

[Fig. 4]
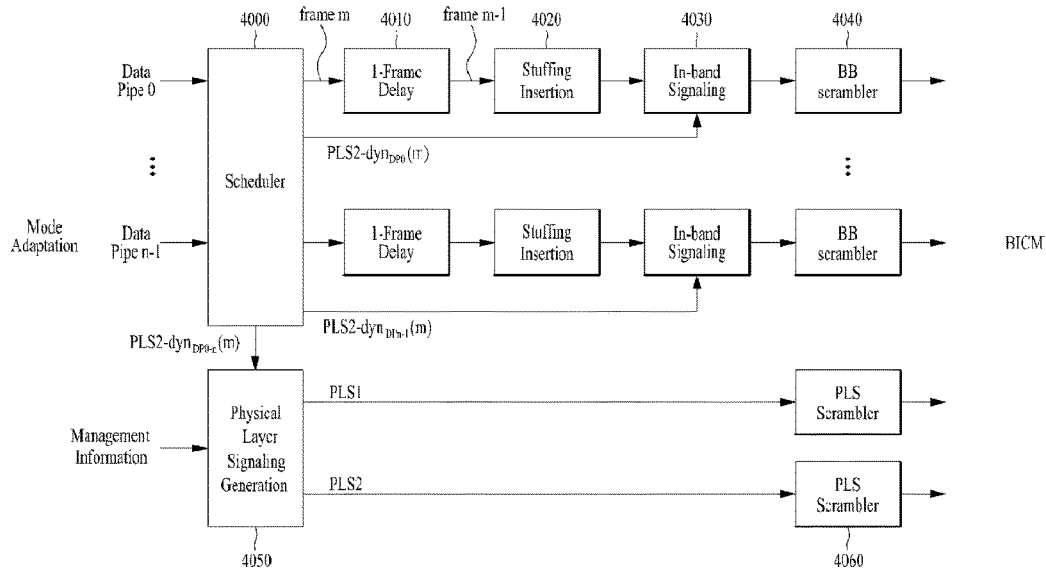
[Fig. 5]
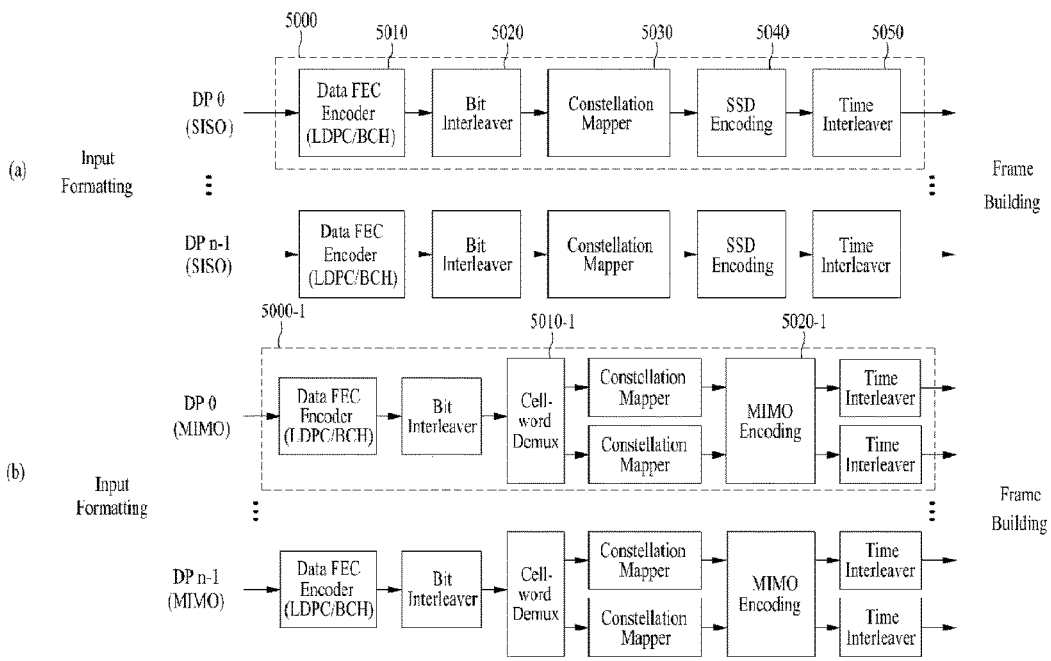
[Fig. 6]
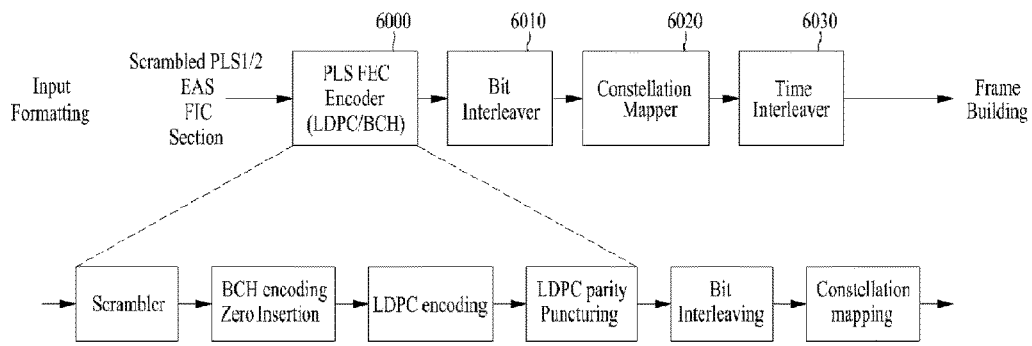

[Fig. 7]
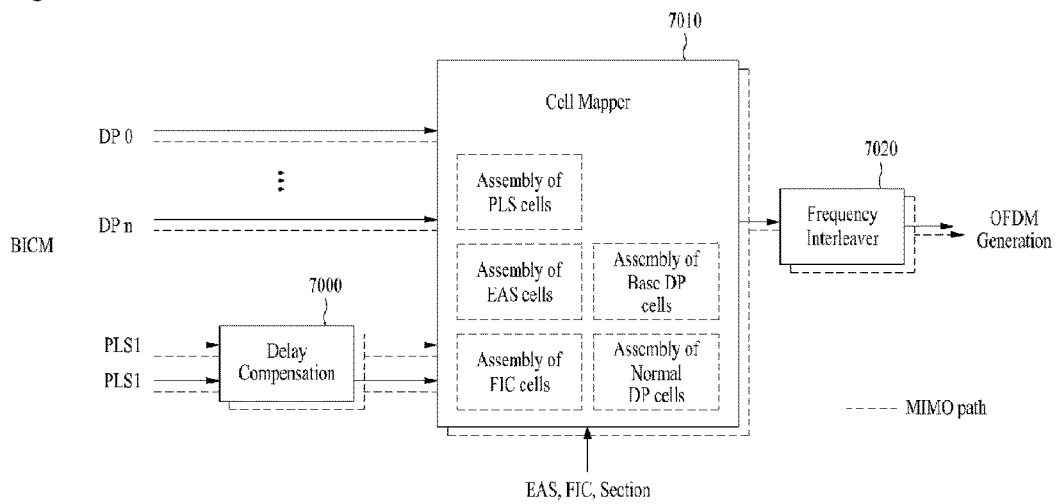
[Fig. 8]
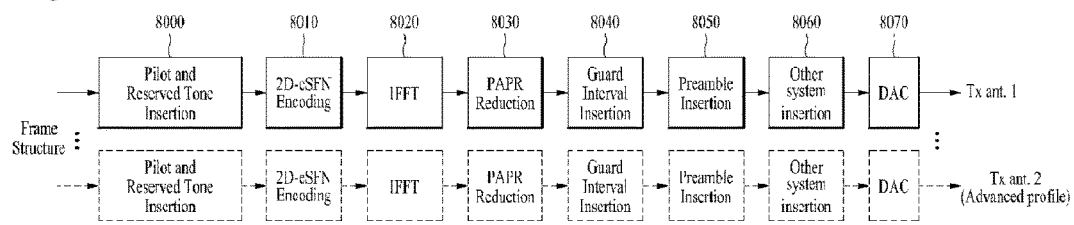
[Fig. 9]
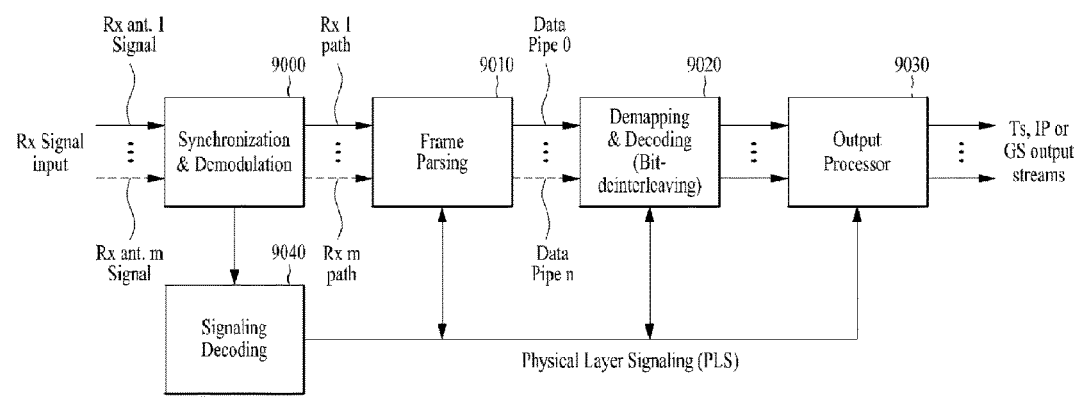

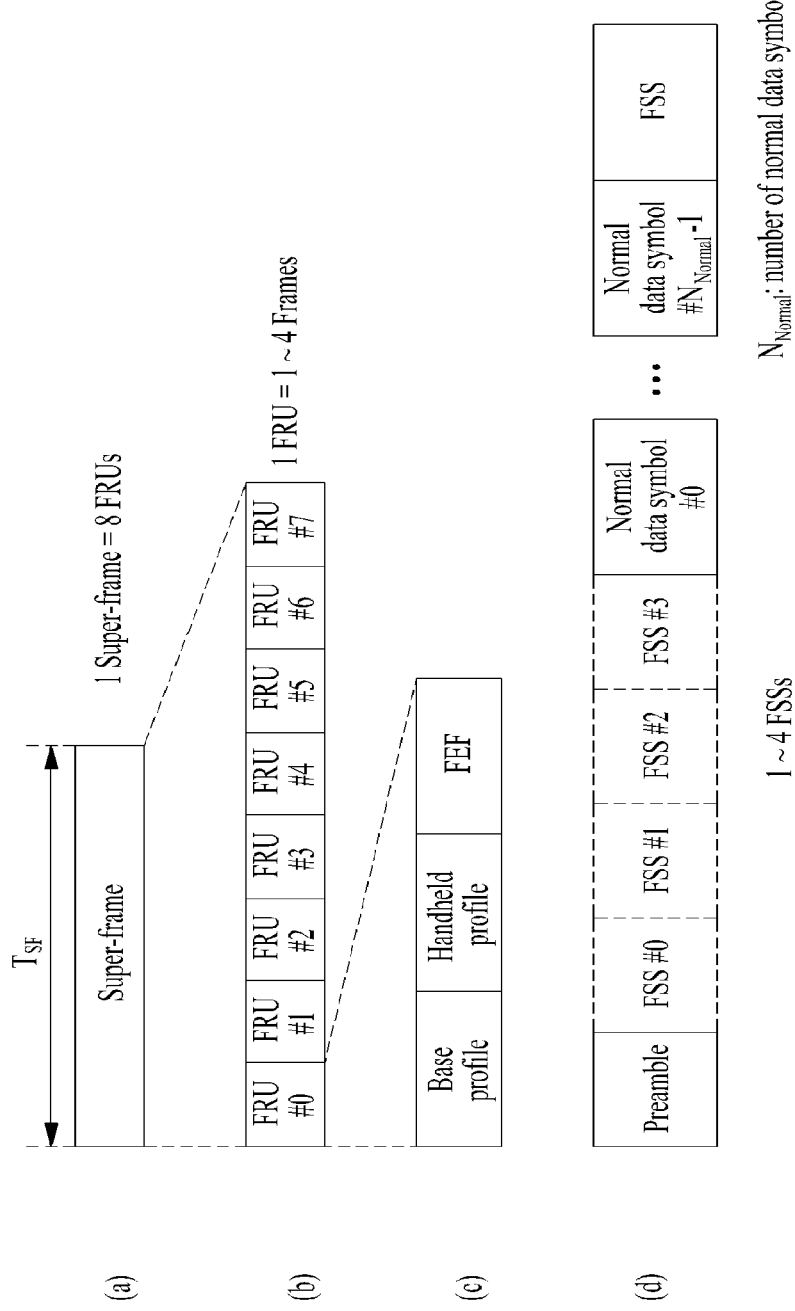
[Fig. 10]

[Fig. 11]
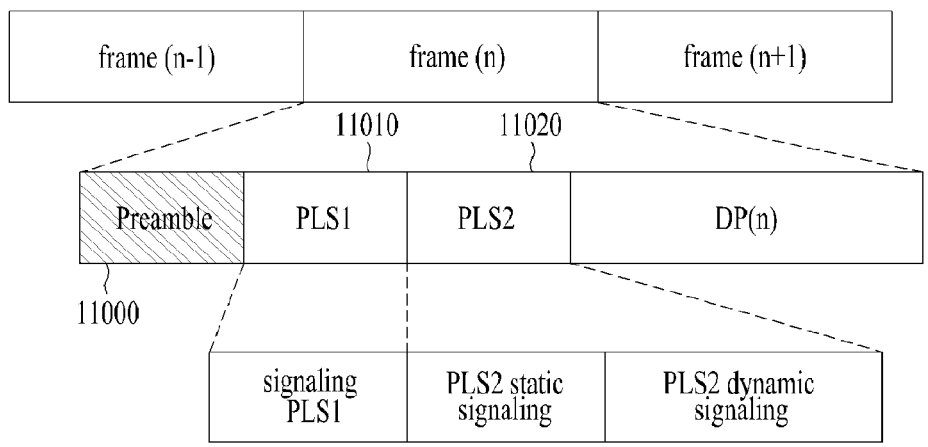
[Fig. 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Fig. 15]
| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |
[Fig. 16]

[Fig. 17]
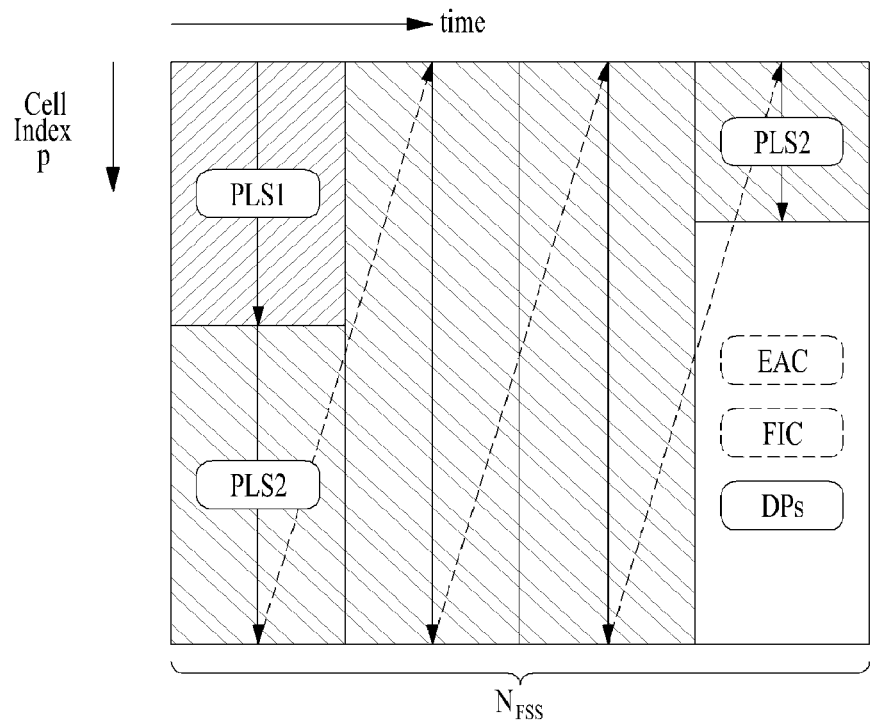
[Fig. 18]
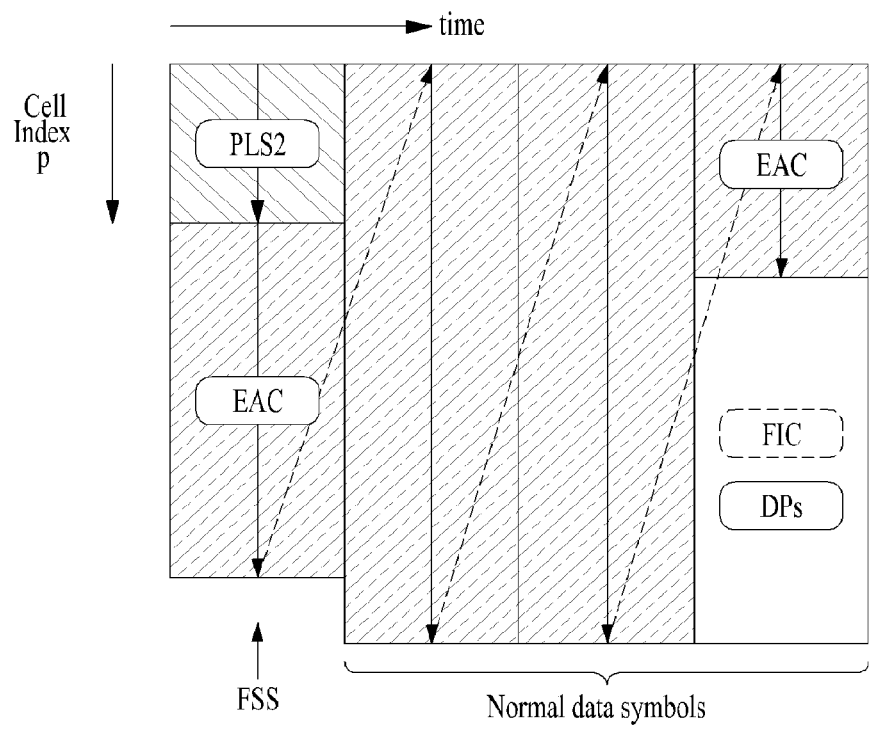

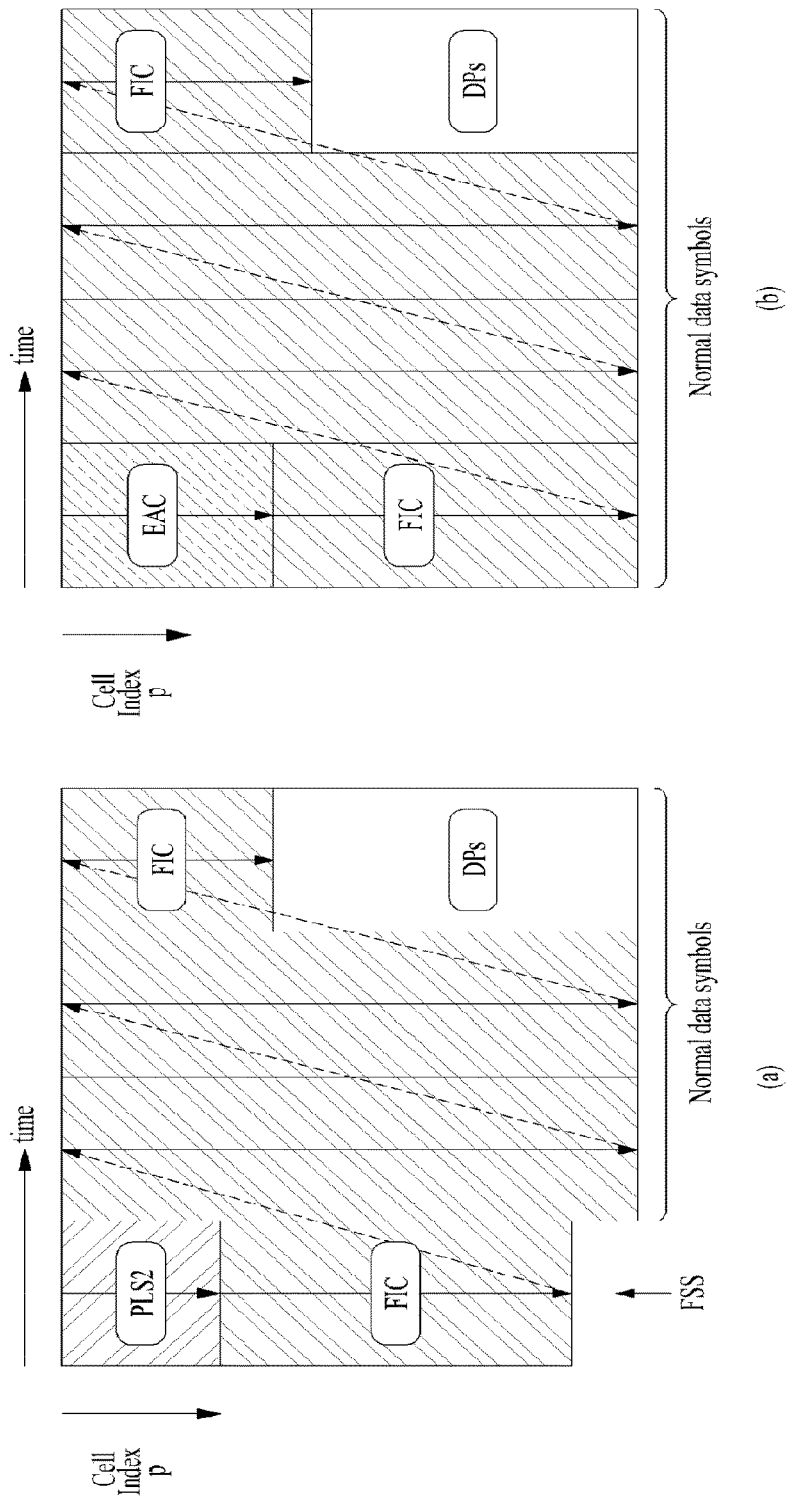
[Fig. 19]

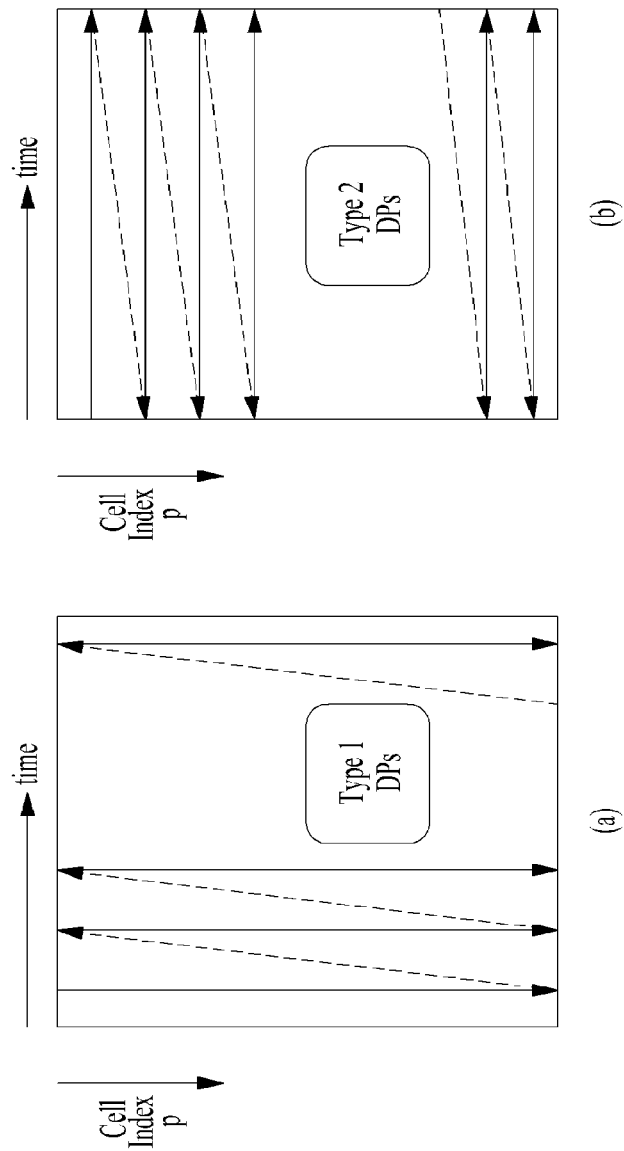

[Fig. 21]
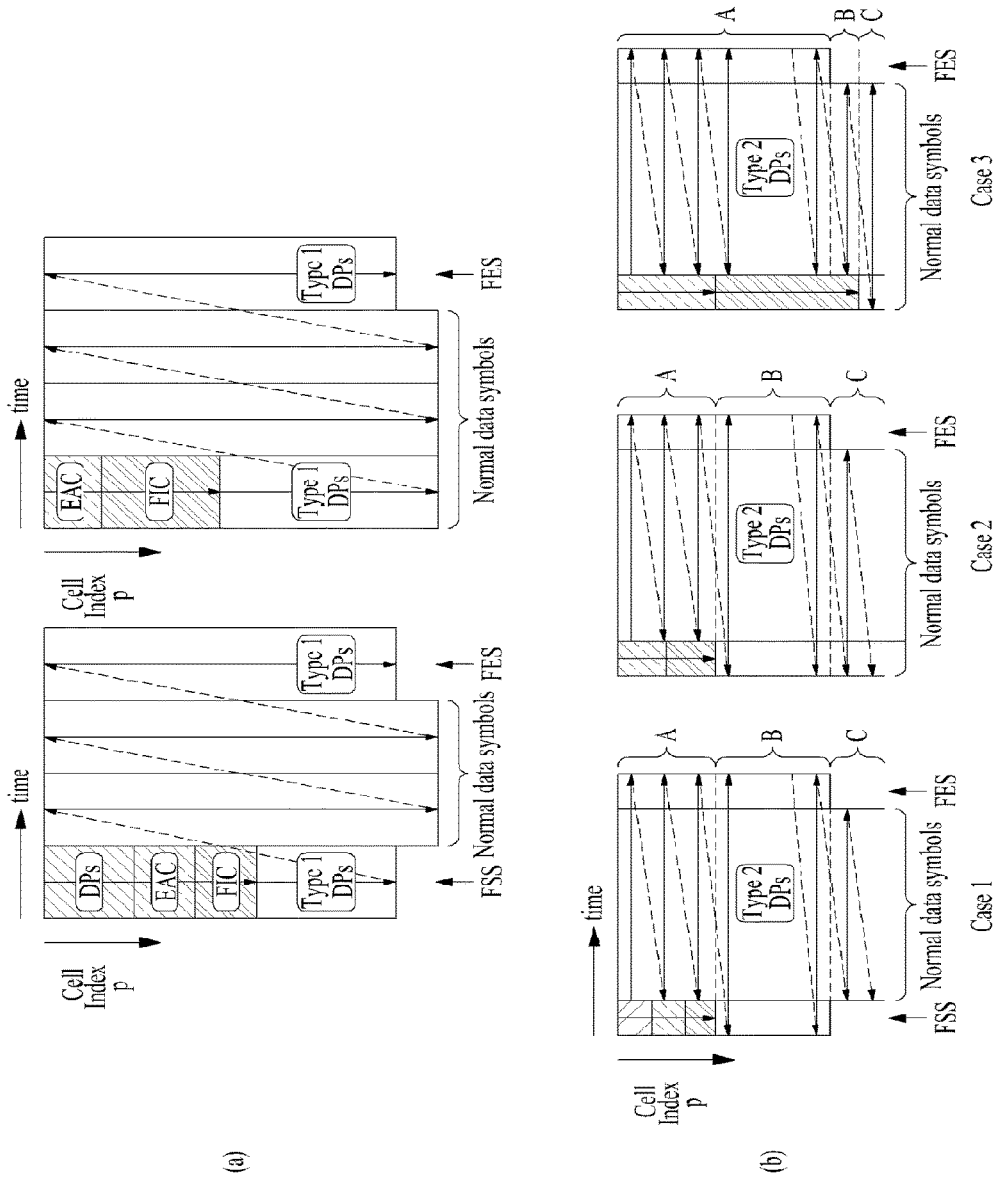
[Fig. 22]
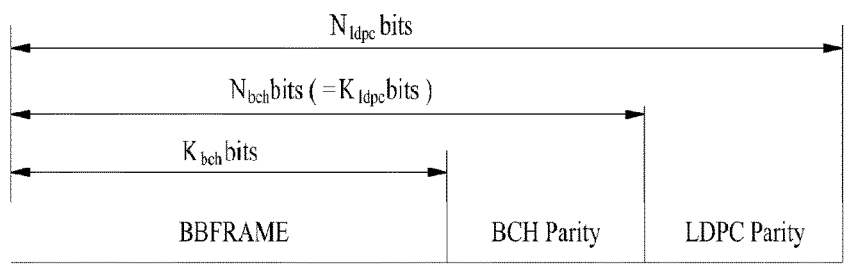

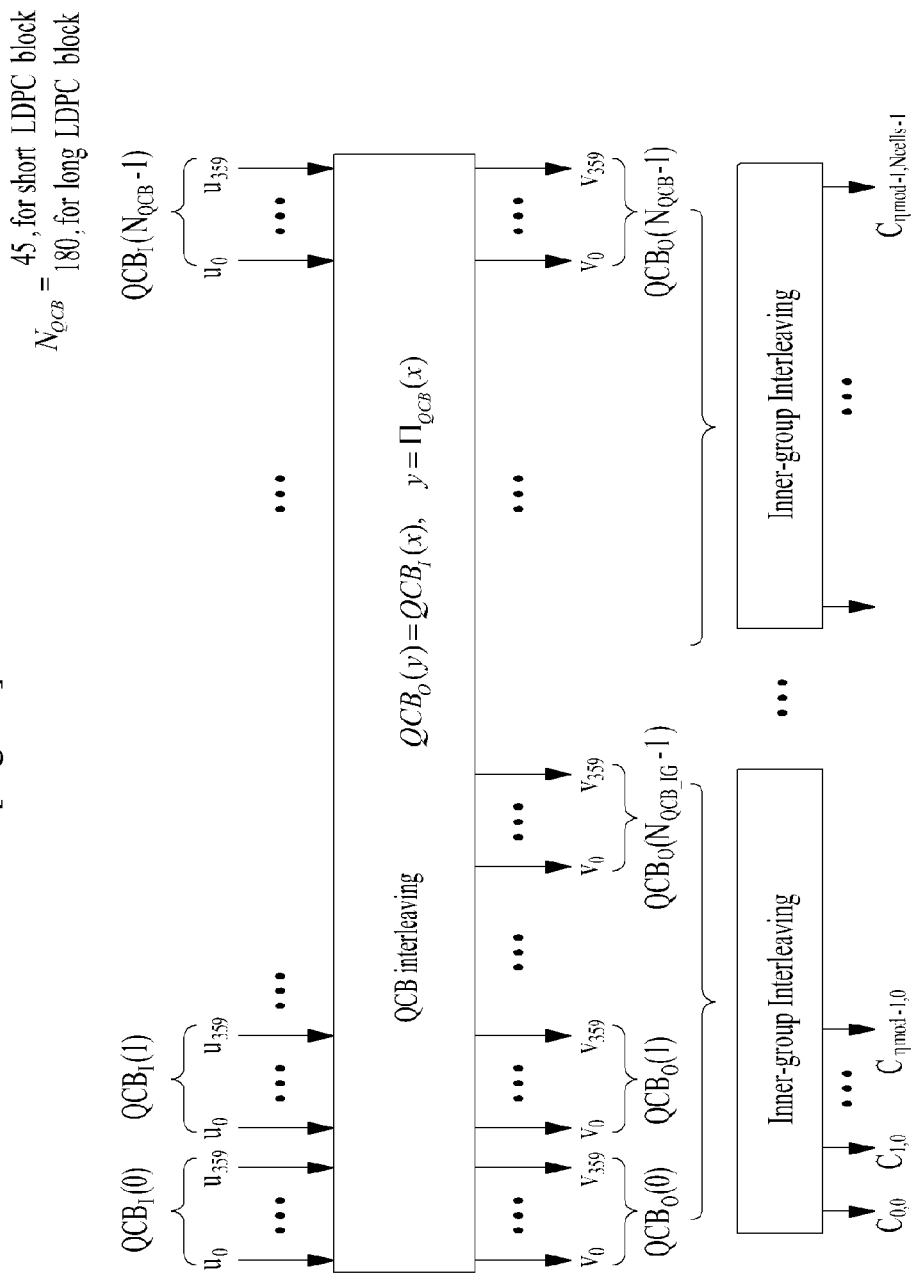
[Fig. 23]

[Fig. 24]
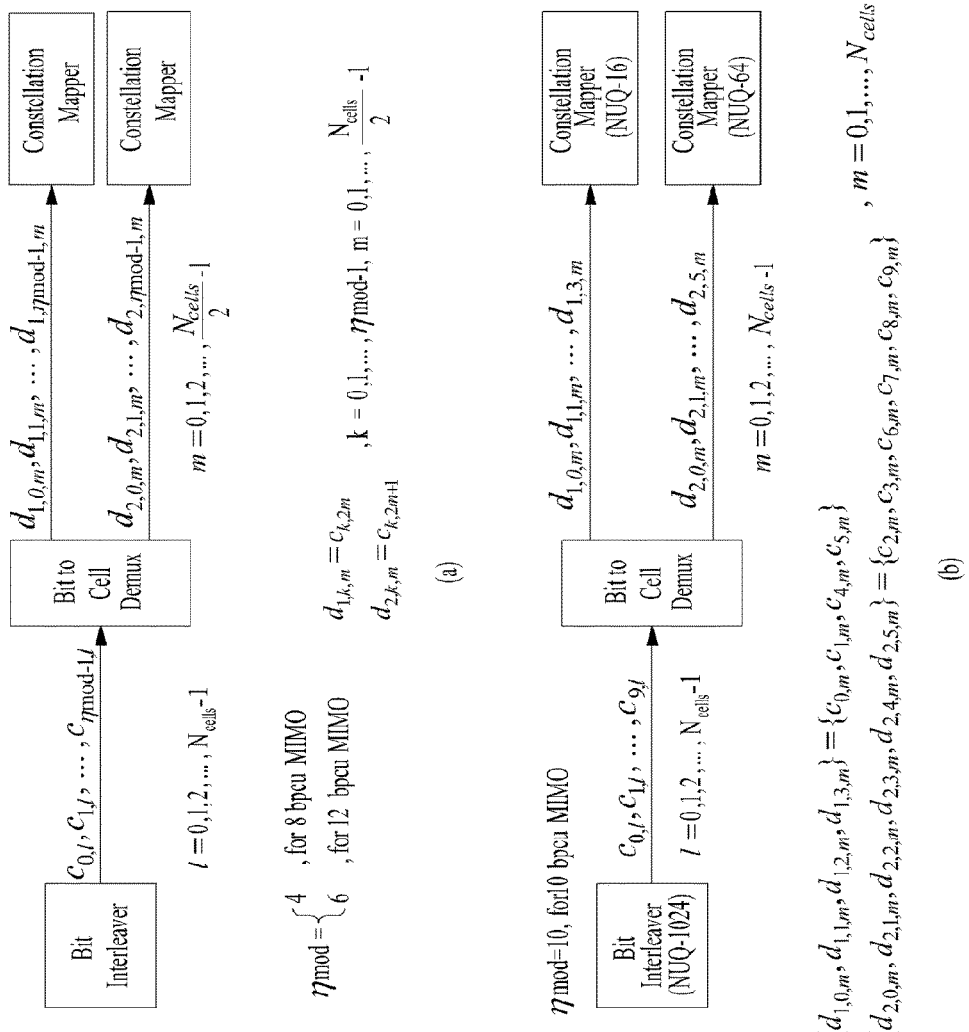

[Fig. 25]
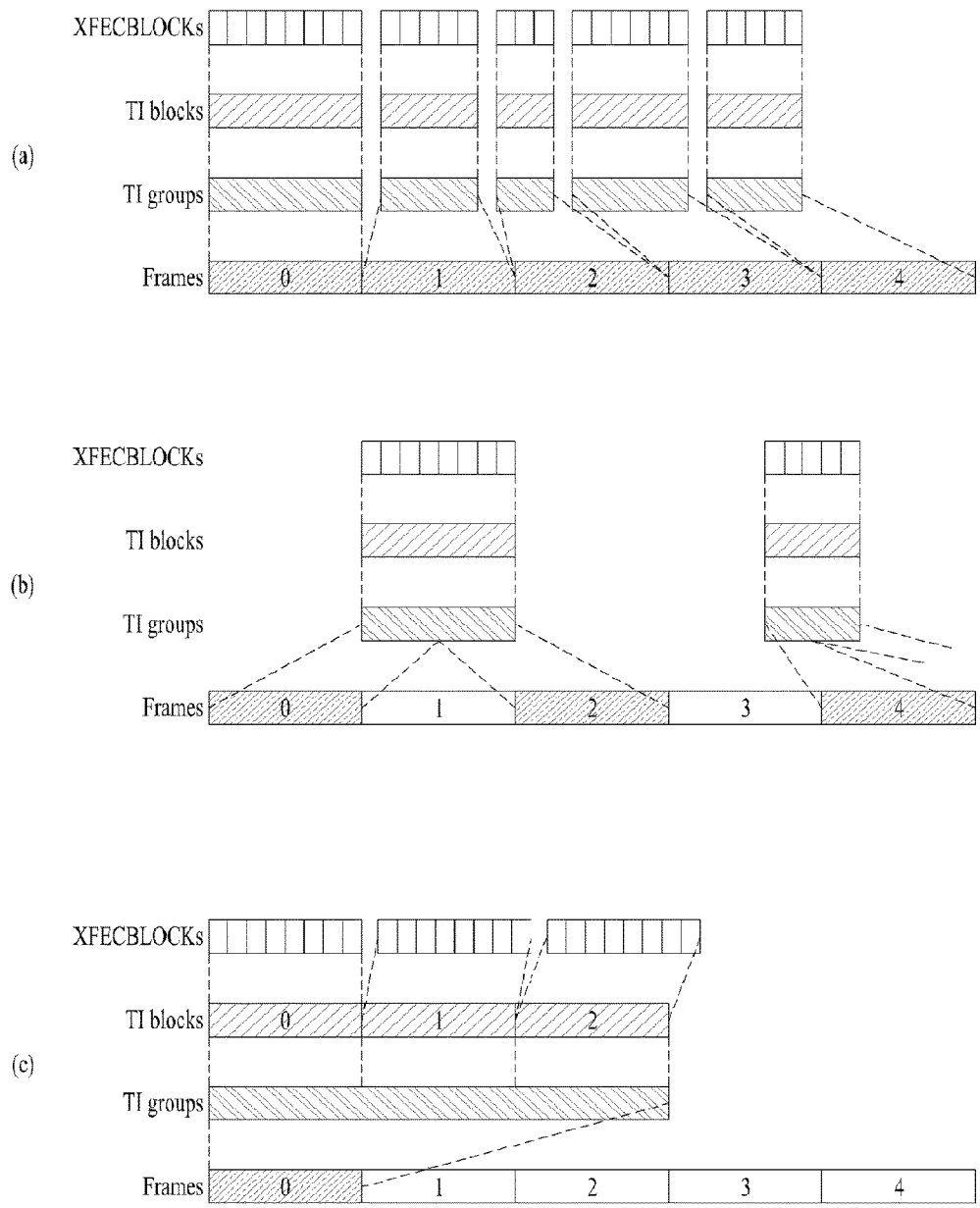

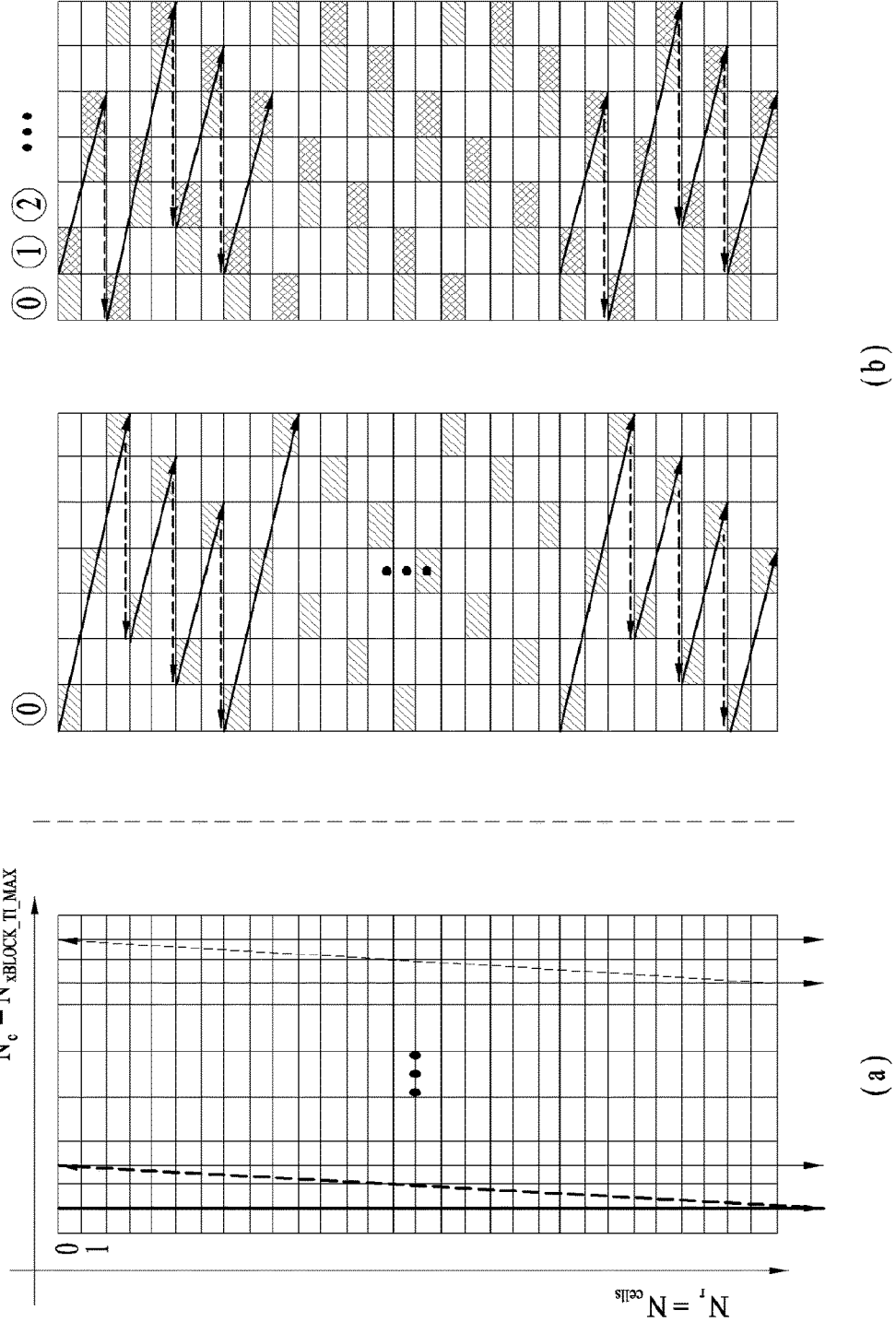
[Fig. 26]

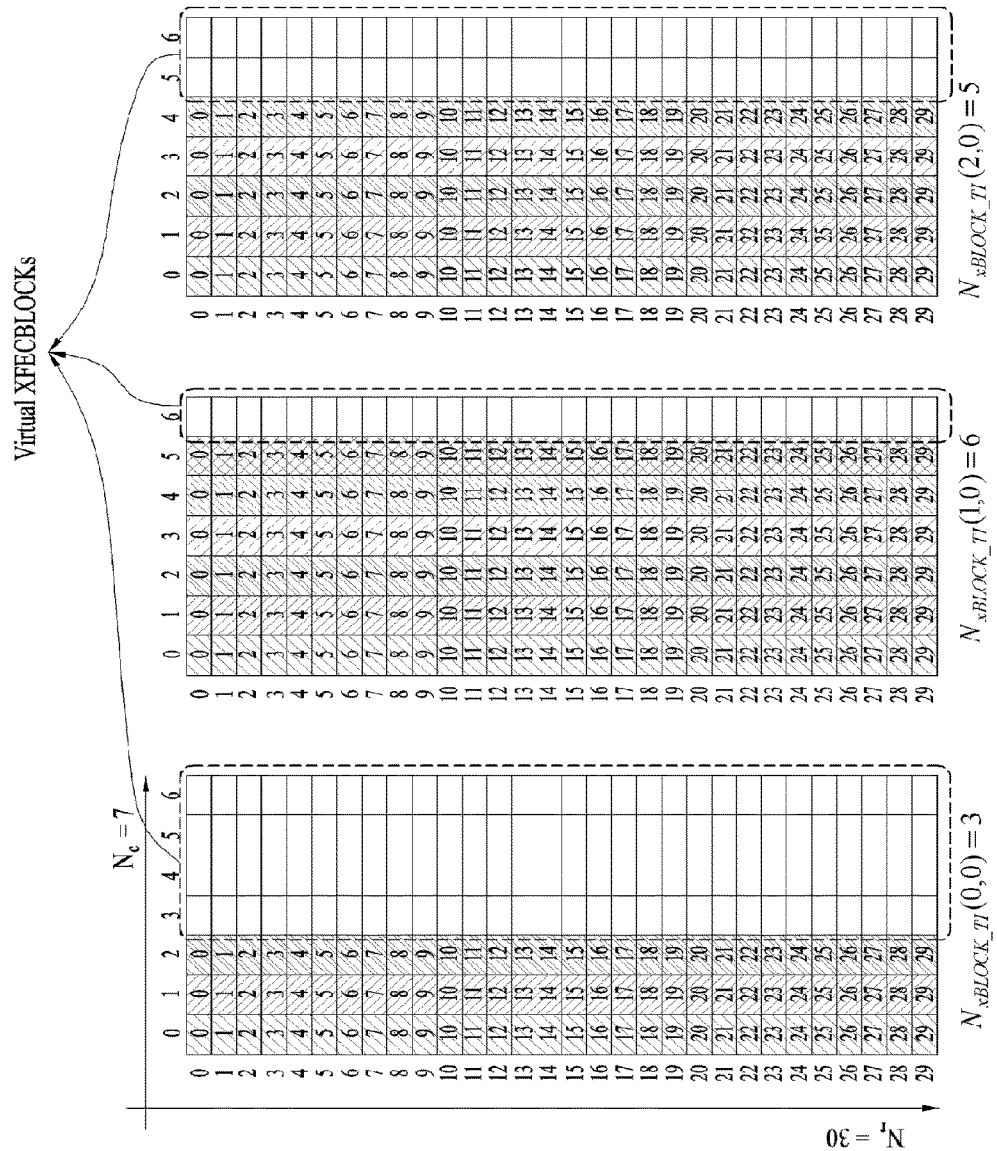

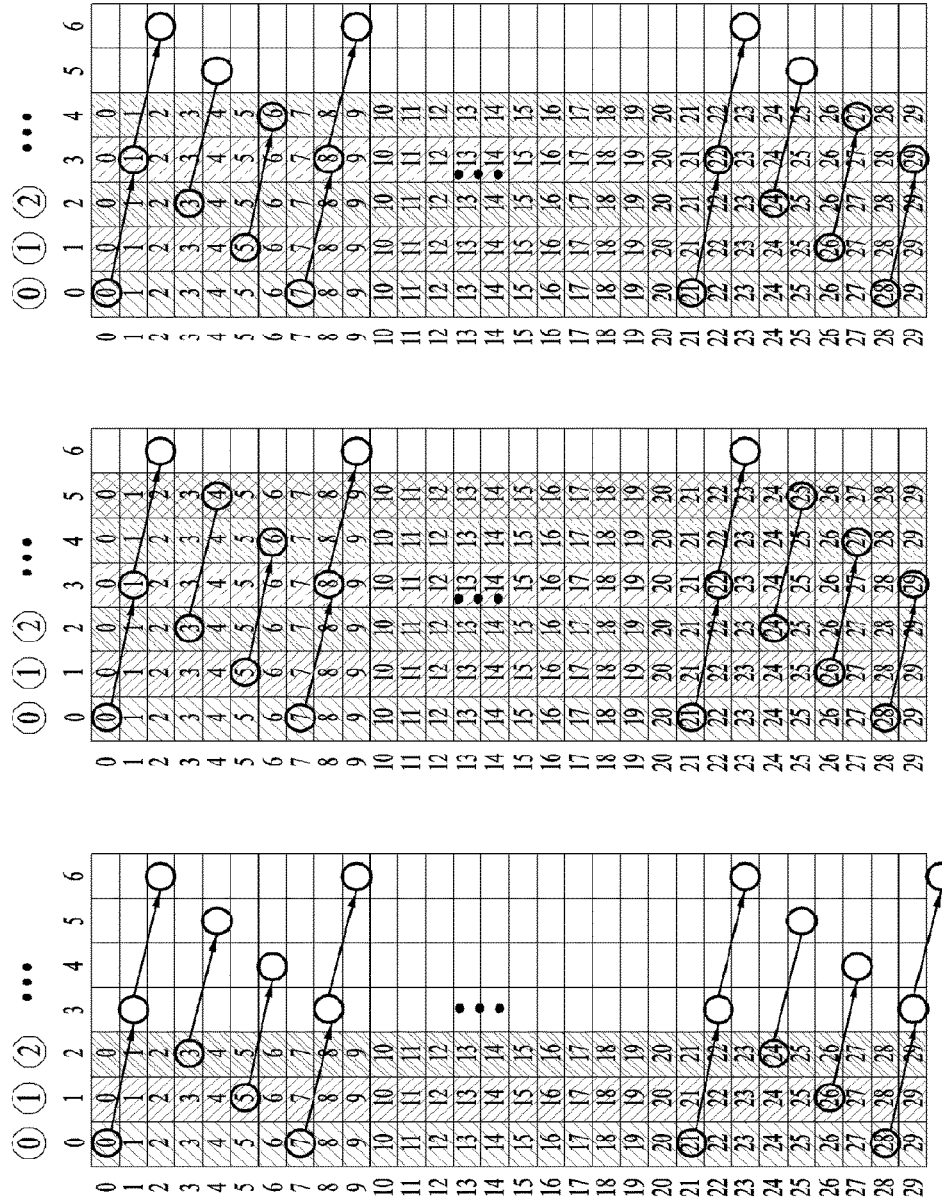
[Fig. 28]

[Fig. 29]
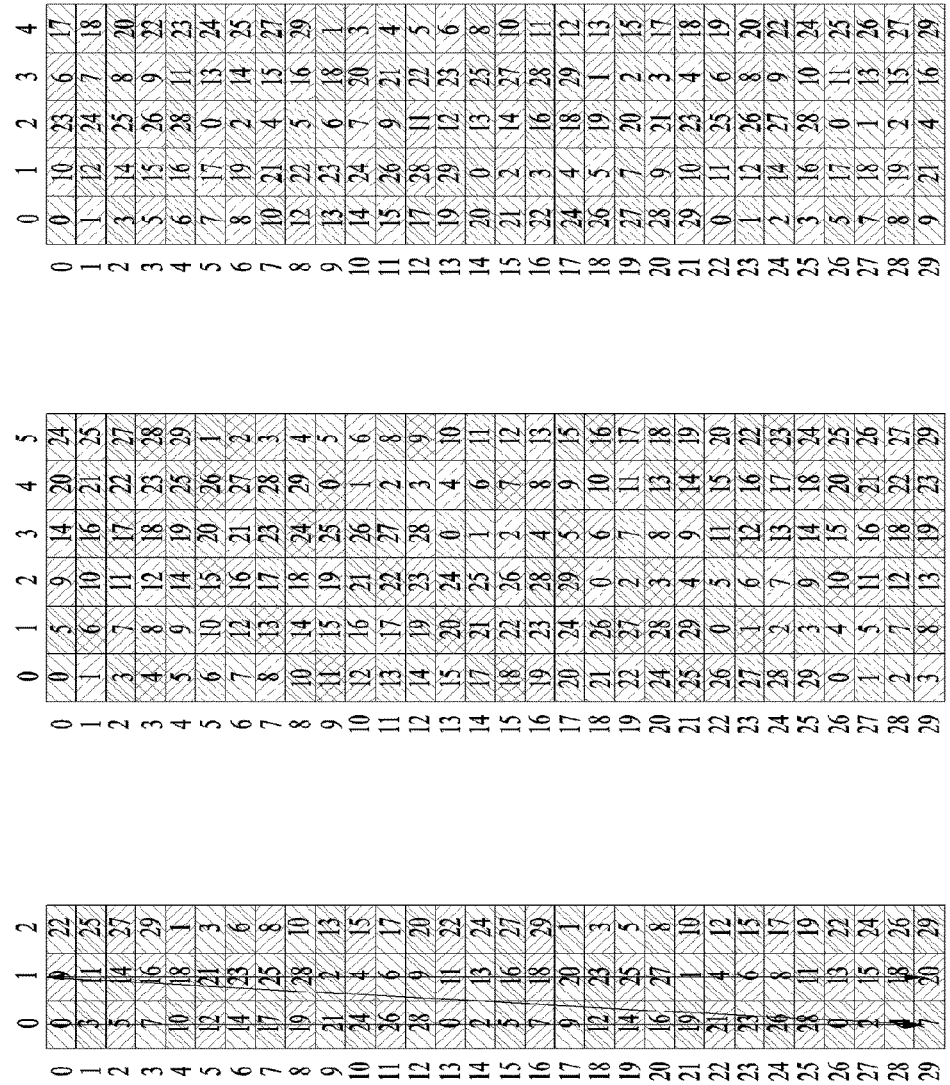

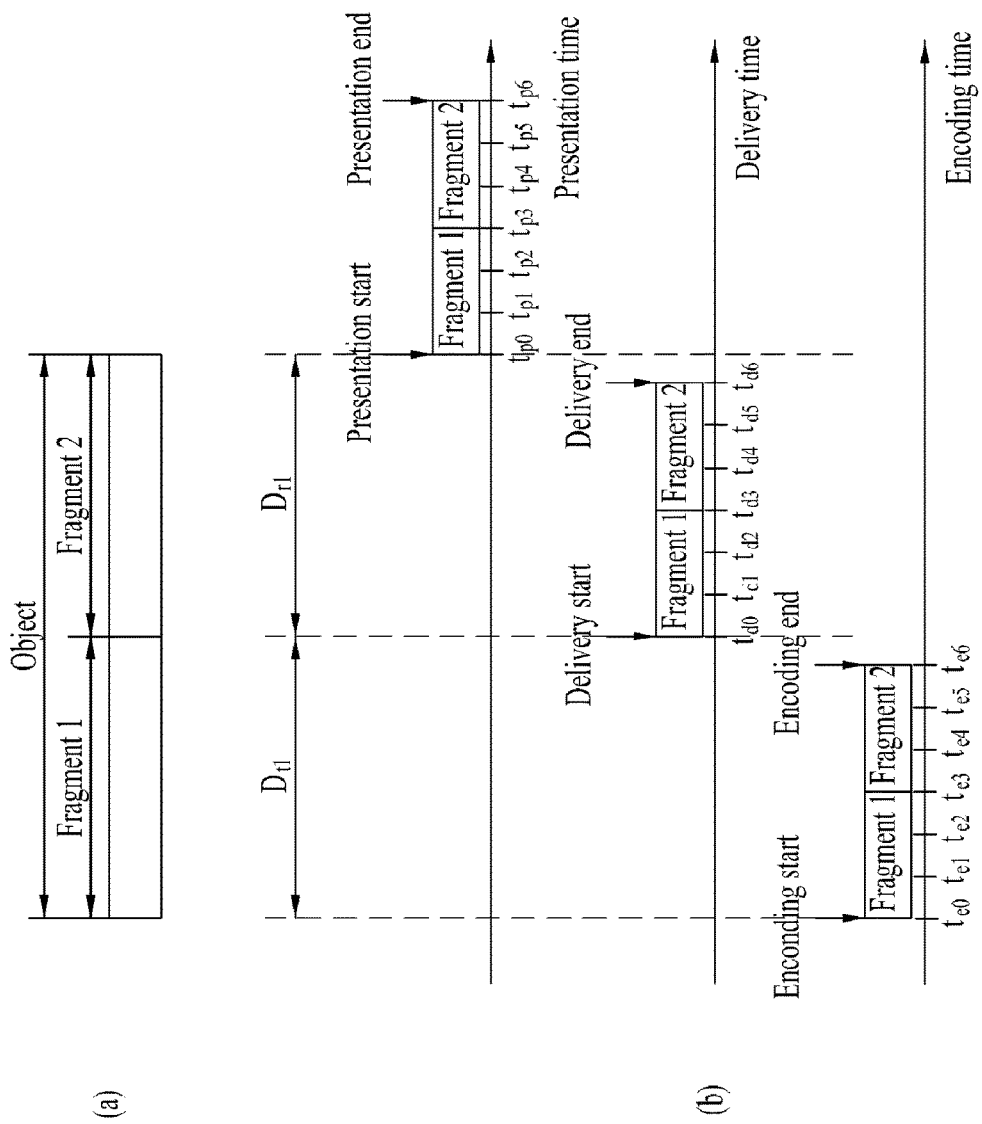
[Fig. 30]

[Fig. 31]
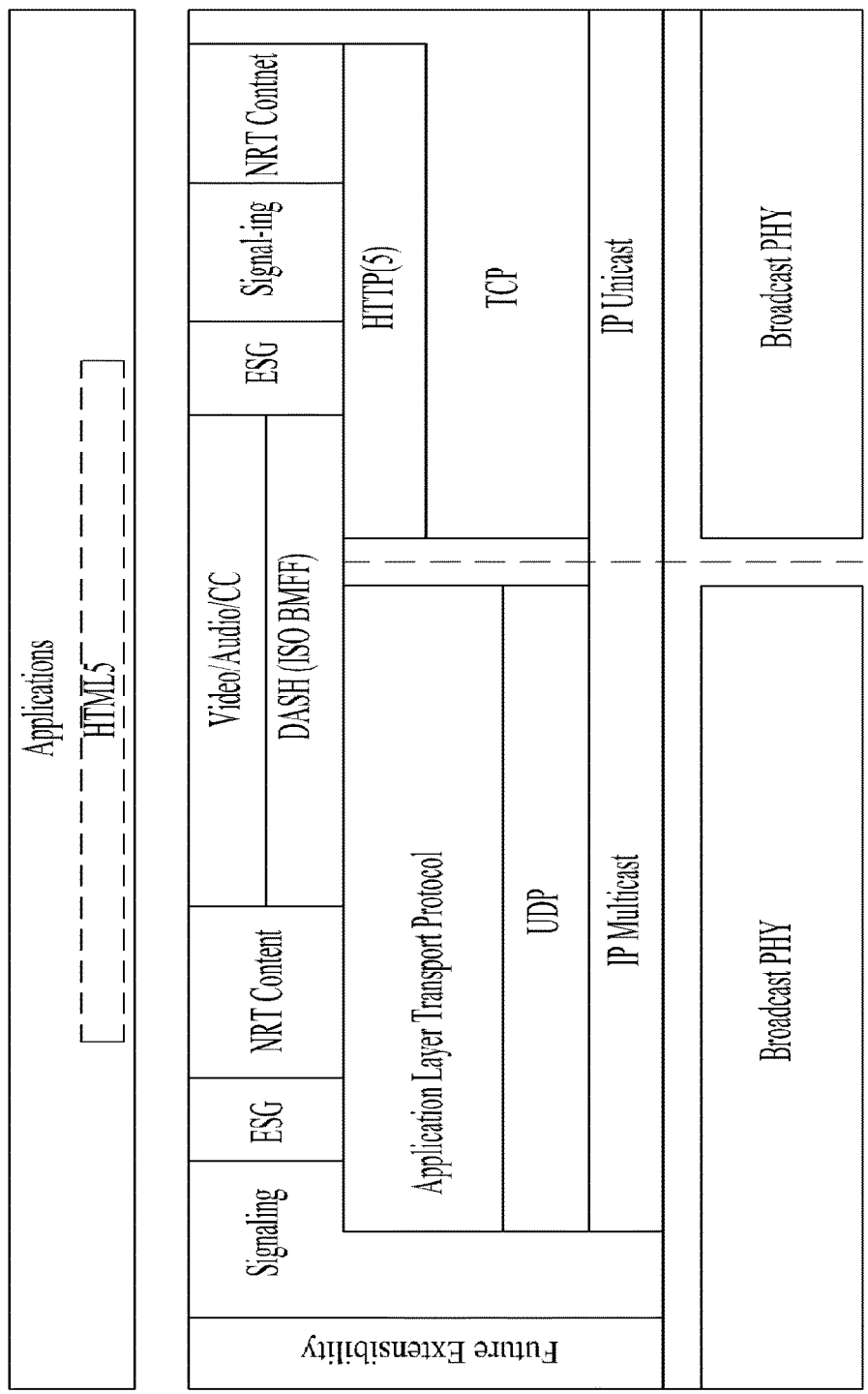

[Fig. 32]
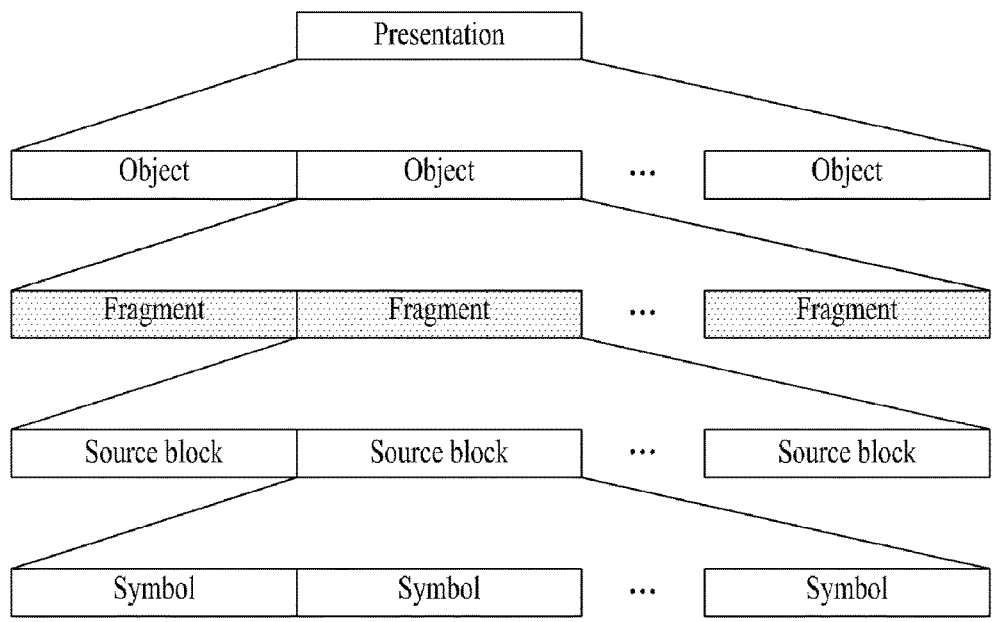

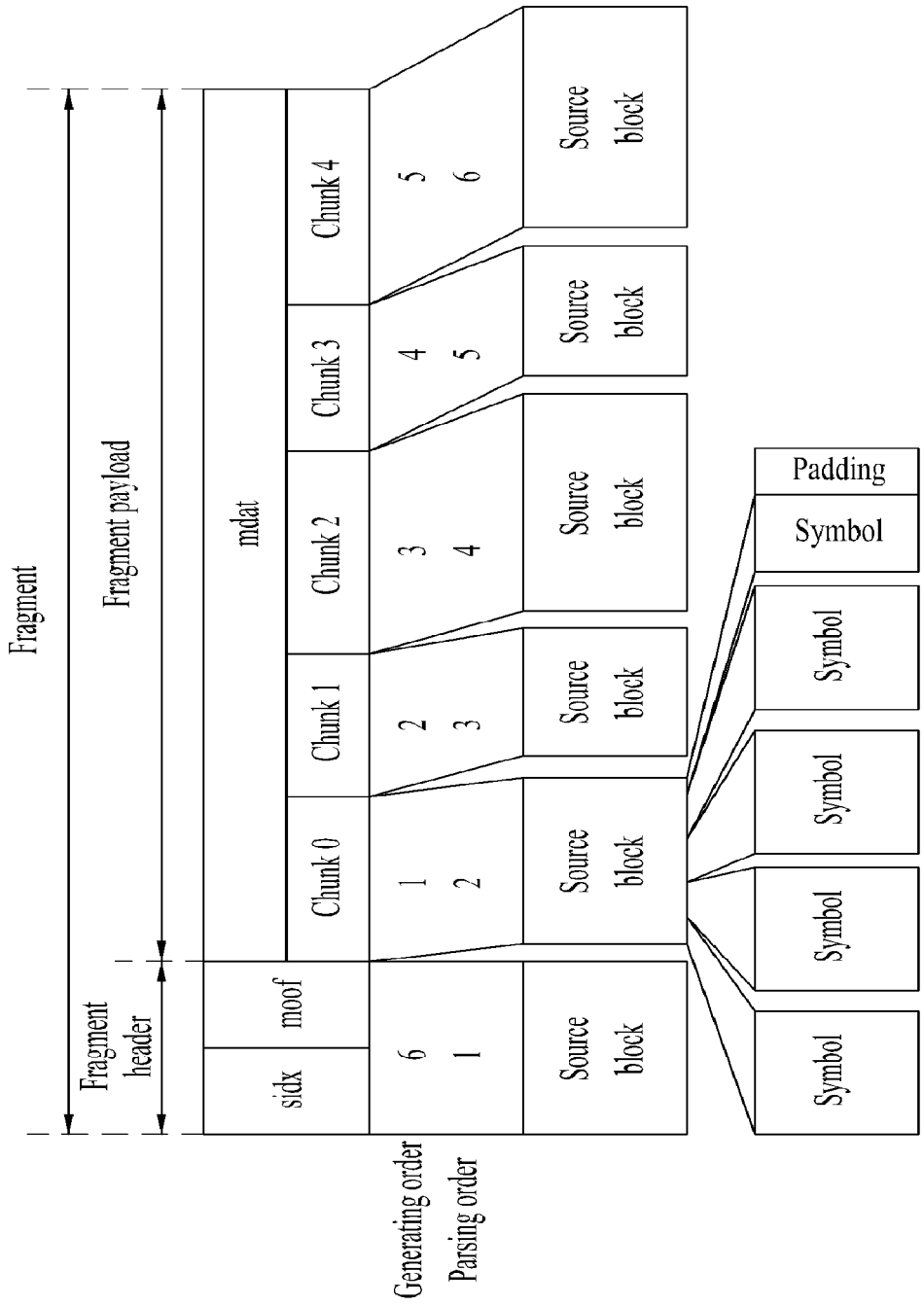
[Fig. 33]

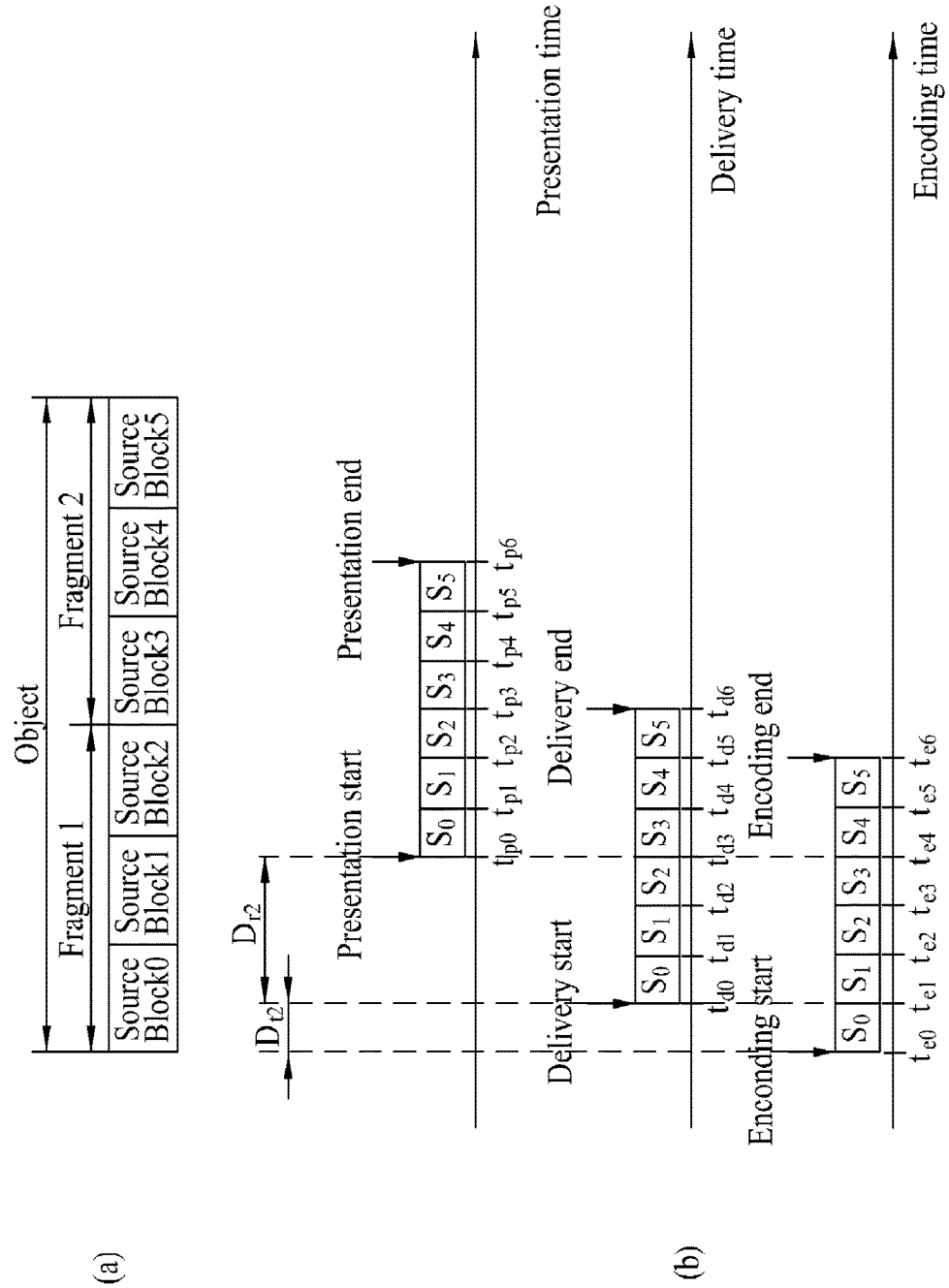

[Fig. 35]

| 0 | | 7 | | | | | | | 15 | 23 | 31 |
|---|---|---|---|---|---|---|---|---|---|---|---|
| V | C | R | S | O | H | T | R | A | B | HDR_LEN | Codepoint (CP) |
| Congestion Control Information (CCI) ||||||||||||
| Transport Session Identifier (TSI) ||||||||||||
| Transport Object Identifier (TOI) ||||||||||||
| HET | | | SI | FH | FC | | Padding Bytes (PB) ||| reserved ||
| Header Extensions (EXT_FTI, EXT_TIME etc.) ||||||||||||
| FEC Payload ID ||||||||||||
| Encoding symbol (s) ||||||||||||

[Fig. 36]

| 0 | | 7 | | | | | | | 15 | 23 | 31 |
|---|---|---|---|---|---|---|---|---|---|---|---|
| V | C | R | S | O | H | T | R | A | B | HDR_LEN | Codepoint (CP) |
| Congestion Control Information (CCI) ||||||||||||
| Transport Session Identifier (TSI) ||||||||||||
| Transport Object Identifier (TOI) ||||||||||||
| HET | | | SI | FH | FHL ||| Padding Bytes (PB) |||
| Header Extensions (EXT_FTI, EXT_TIME etc.) ||||||||||||
| FEC Payload ID ||||||||||||
| Encoding symbol (s) ||||||||||||

[Fig. 37]

| Element of Attribute name | | | type | Use |
|---|---|---|---|---|
| FDT | | | | |
| | @ Expires | | string | M |
| | @ Complete | | boolen | O |
| | @ Content-Type | | string | O |
| | @ Content-Encoding | | string | O |
| | @ FEC-OTI-FEC-Encoding-ID | | unsignedLong | O |
| | @ FEC-OTI-FEC-Instance-ID | | unsignedLong | O |
| | @ FEC-OTI-Maximum-Source-Block-Length | | unsignedLong | O |
| | @ FEC-OTI-Encoding-Symbol-Length | | unsignedLong | O |
| | @ FEC-OTI-Max-Number-of-Encoding-Symbols | | unsignedLong | O |
| | @ FEC-OTI-Scheme-Specific-Info | | unsignedLong | O |
| | @ Real-Time-Support | | boolen | O |
| | File | | | O...N |
| | | @ Content-Location | string | M |
| | | @ TOI | positiveInteger | M |
| | | @ Complete | boolen | O |
| | | @ Content-Type | string | O |
| | | @ Content-Encoding | string | O |
| | | @ FEC-OTI-FEC-Encoding-ID | unsignedByte | O |
| | | @ FEC-OTI-FEC-Instance-ID | unsignedLong | O |
| | | @ FEC-OTI-Maximum-Source-Block-Length | unsignedLong | O |
| | | @ FEC-OTI-Encoding-Symbol-Length | unsignedLong | O |
| | | @ FEC-OTI-Max-Number-of-Encoding-Symbols | unsignedLong | O |
| | | @ FEC-OTI-Scheme-Specific-Info | base64Binary | O |
| | | @ Real-Time-Support | boolen | O |

[Fig. 38]
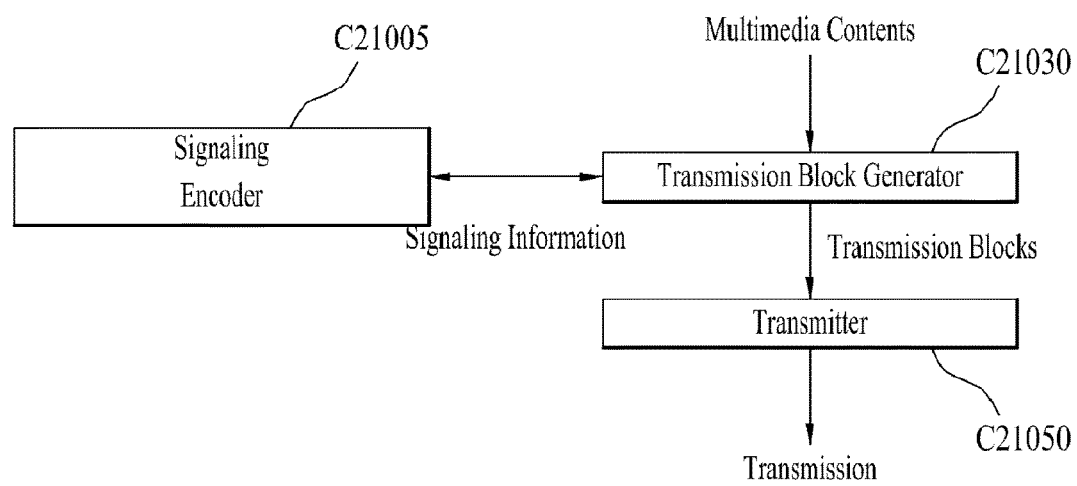

[Fig. 39]
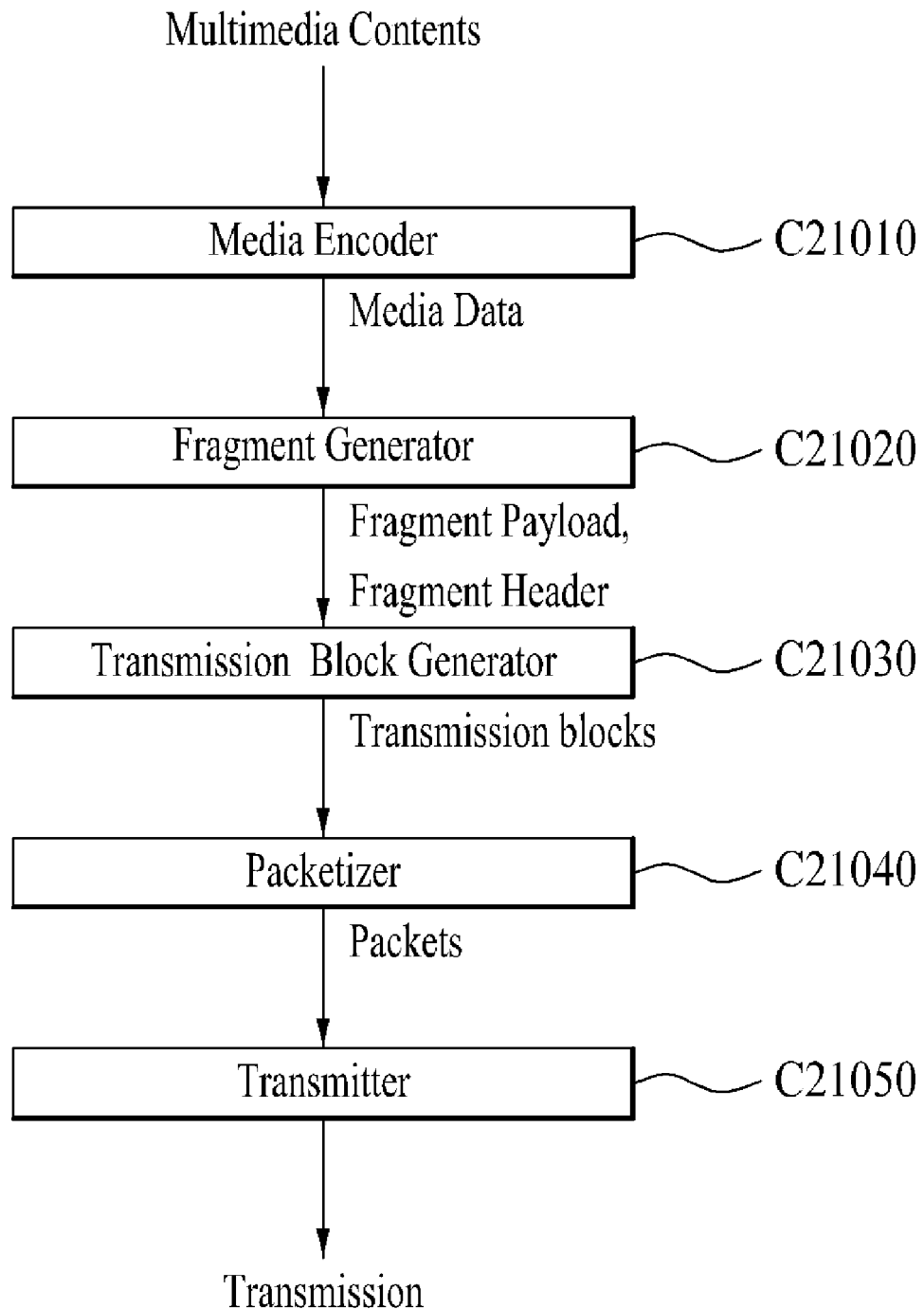

[Fig. 40]
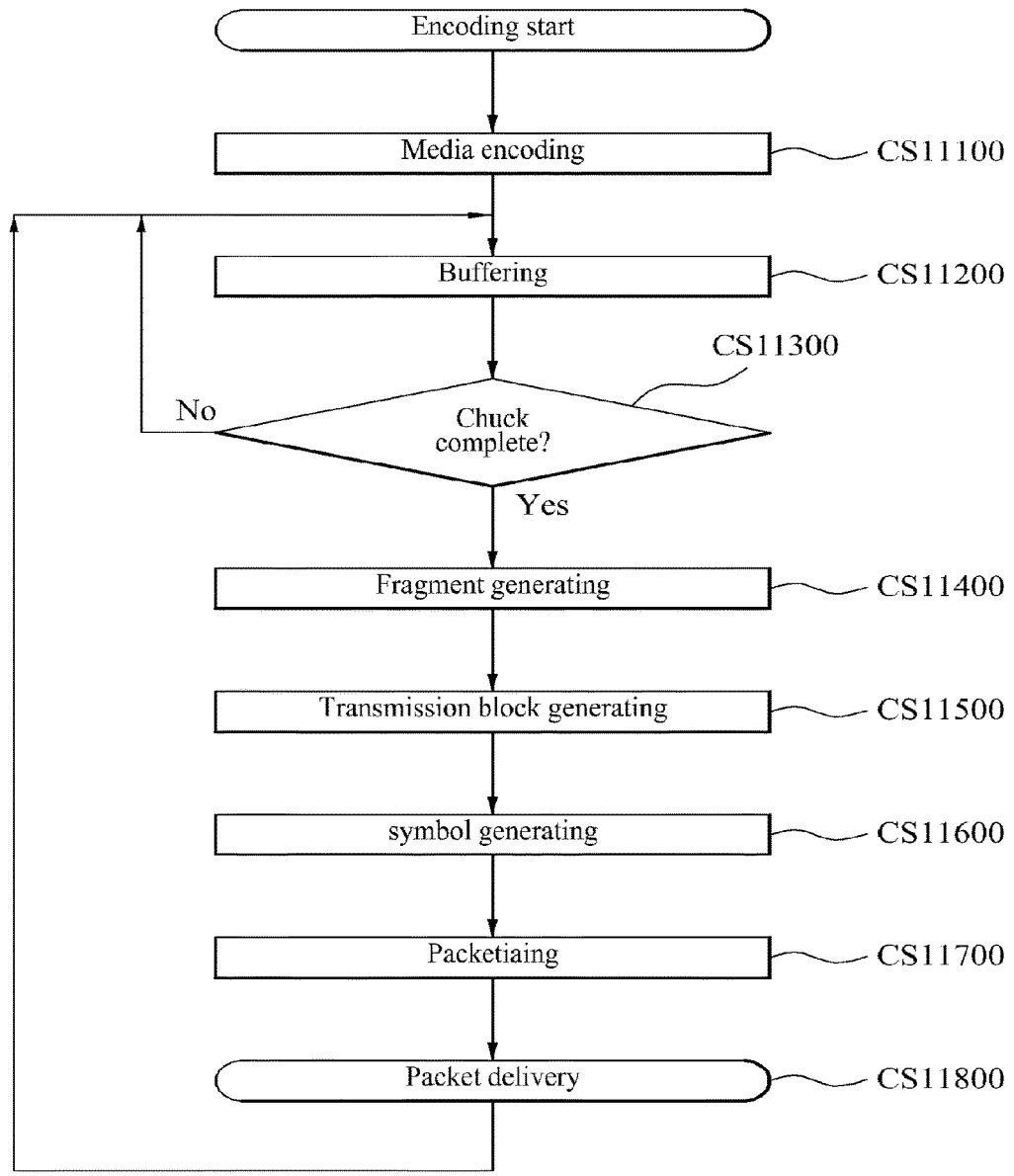

[Fig. 41]
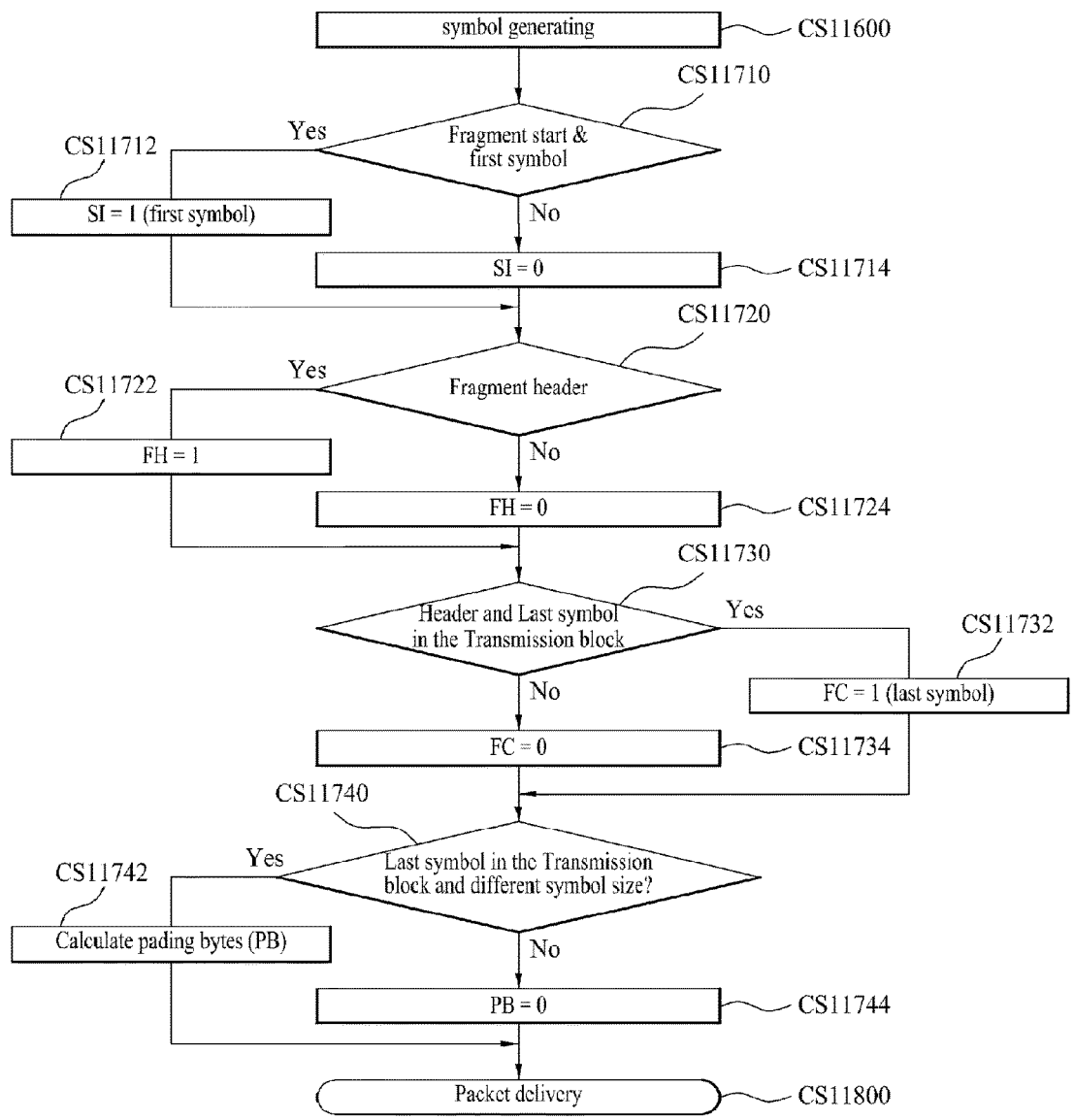

[Fig. 42]
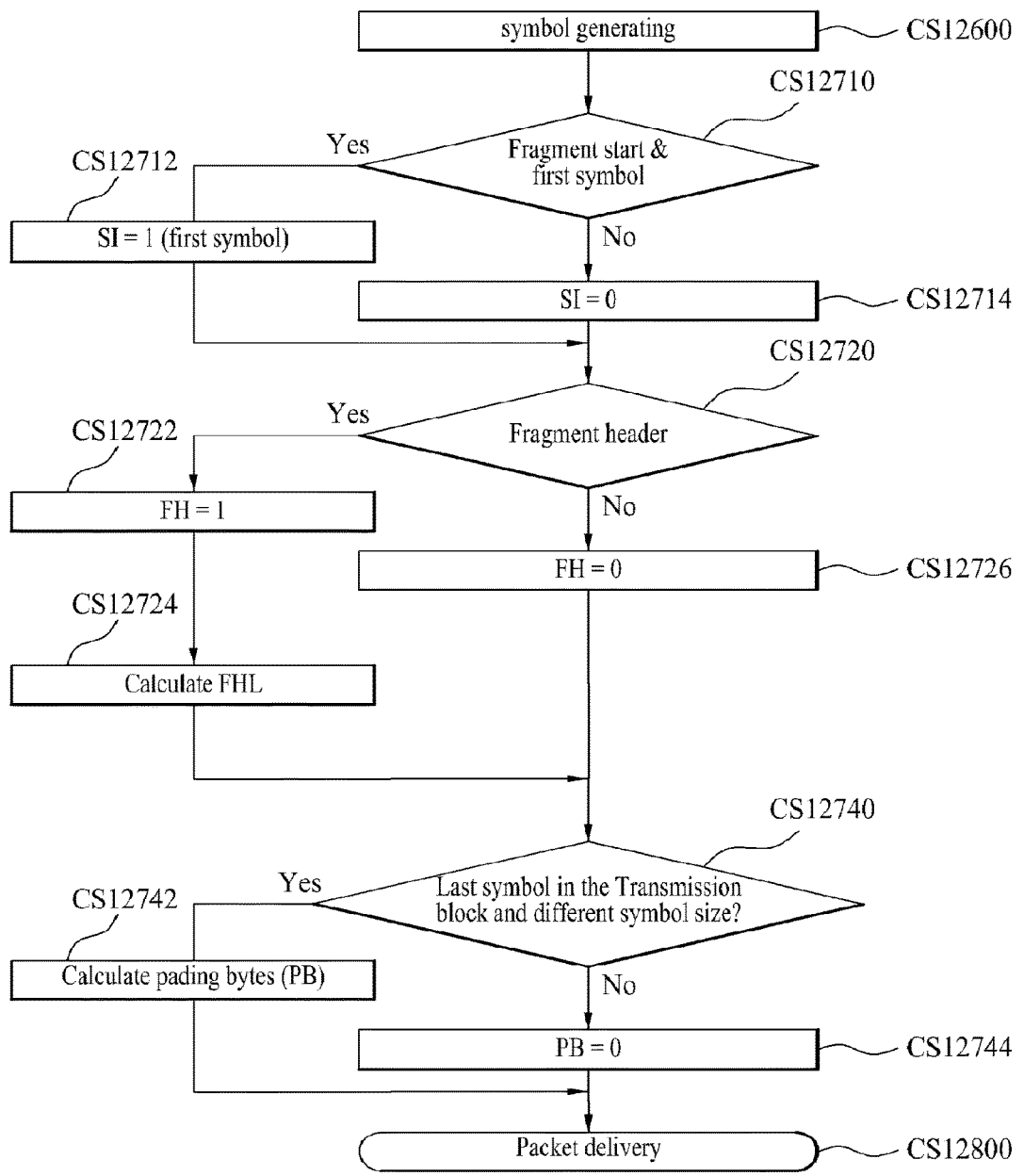

[Fig. 43]
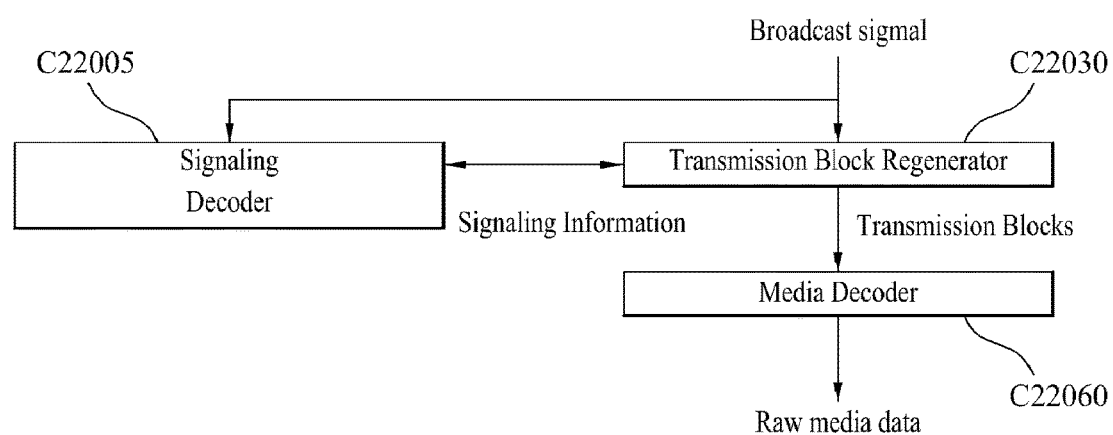

[Fig. 44]
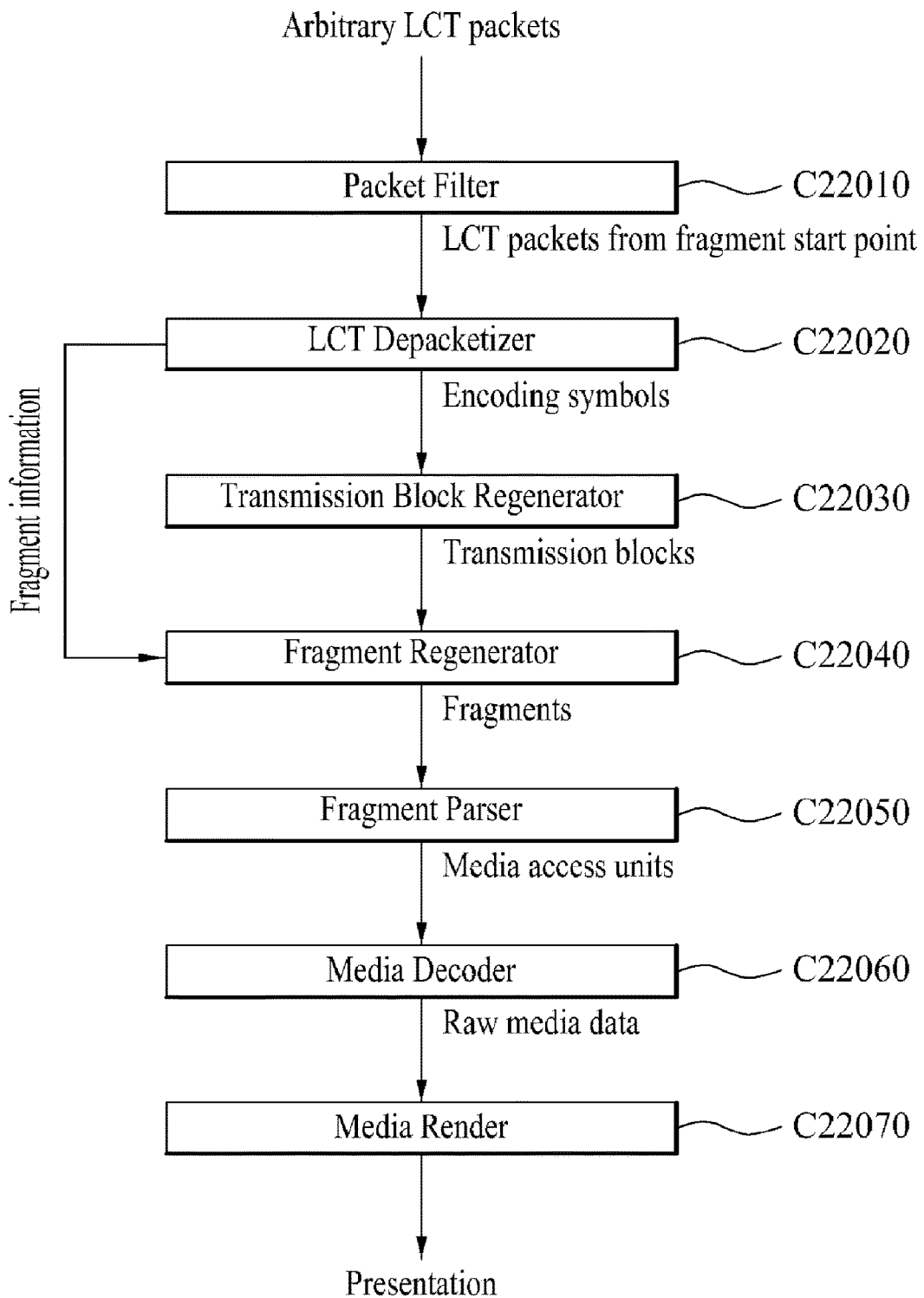

[Fig. 45]
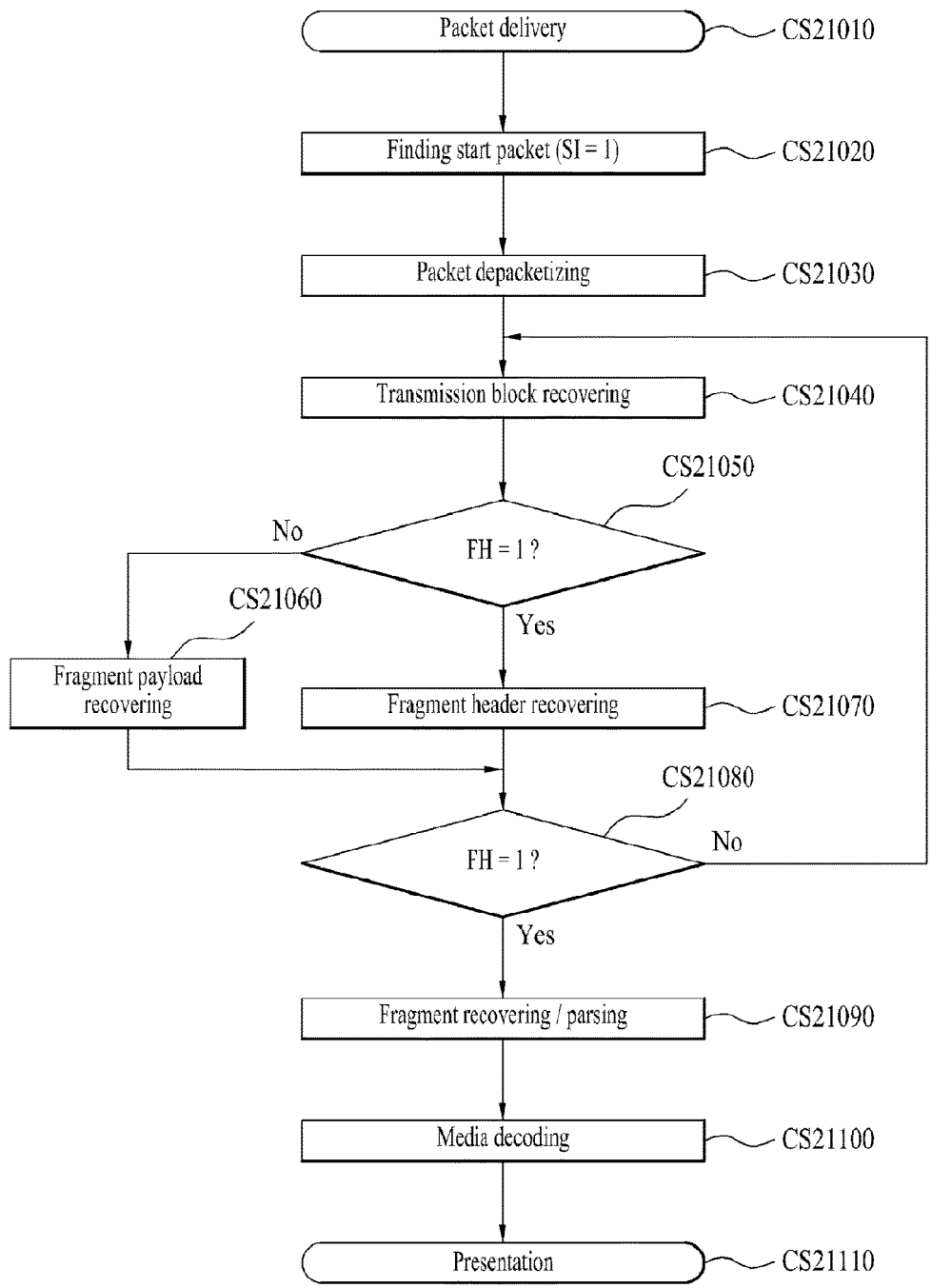

[Fig. 46]
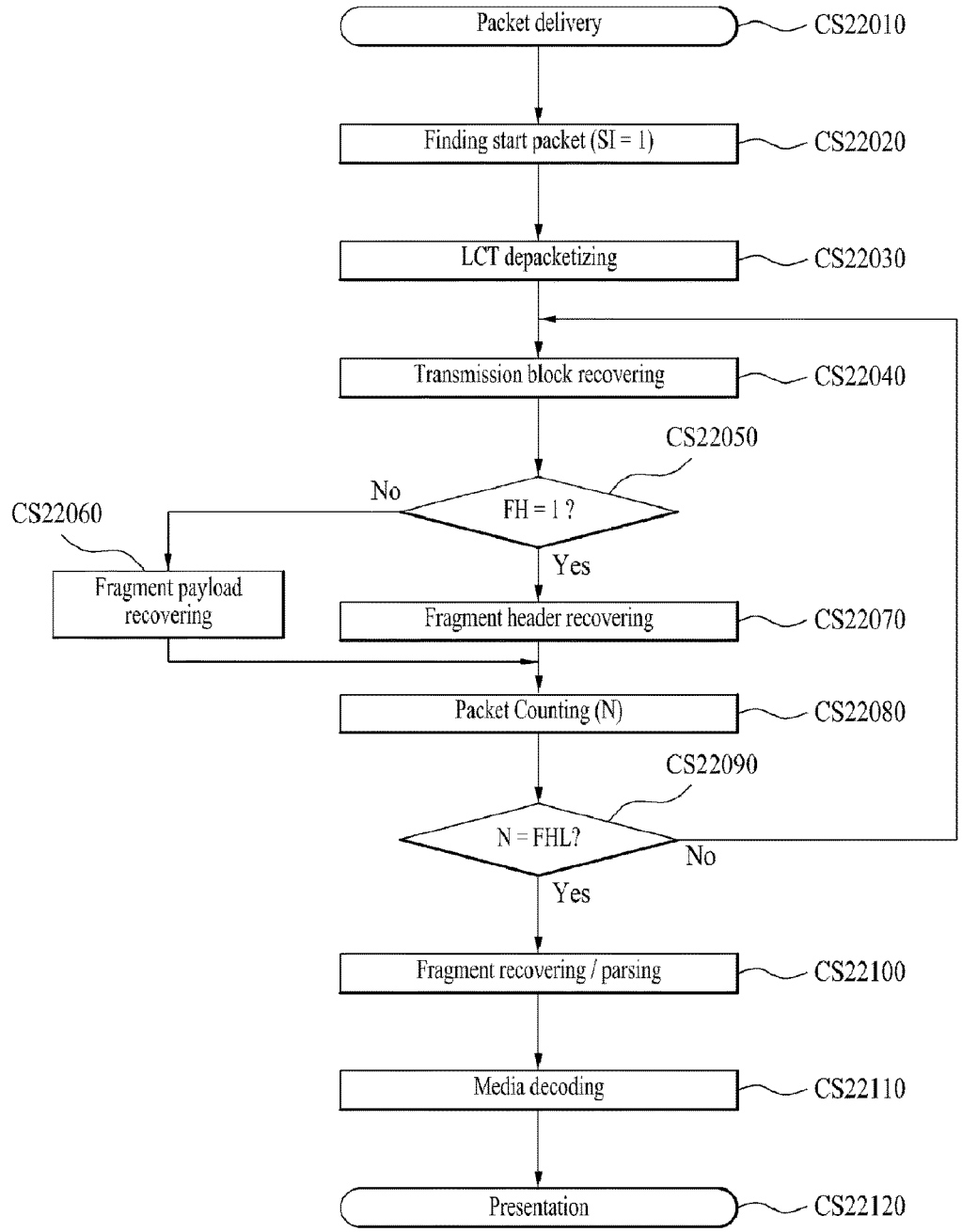

[Fig. 47]

| 0 | | 7 | | | | | 15 | | | 23 | 31 |
|---|---|---|---|---|---|---|---|---|---|---|---|
| V | C | PSI | S | O | H | Type | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| Header Extensions (EXT_FTI, EXT_TIME etc.) ||||||||||||
| FEC Payload ID ||||||||||||
| Encoding symbol (s) ||||||||||||

[Fig. 48]

| 0 | | 7 | | | | | 15 | | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET | | | Type | | | | | Reserved | | | |
| Header Extensions (EXT_FTI, EXT_TIME etc.) ||||||||||||
| FEC Payload ID ||||||||||||
| Encoding symbol (s) ||||||||||||

[Fig. 49]
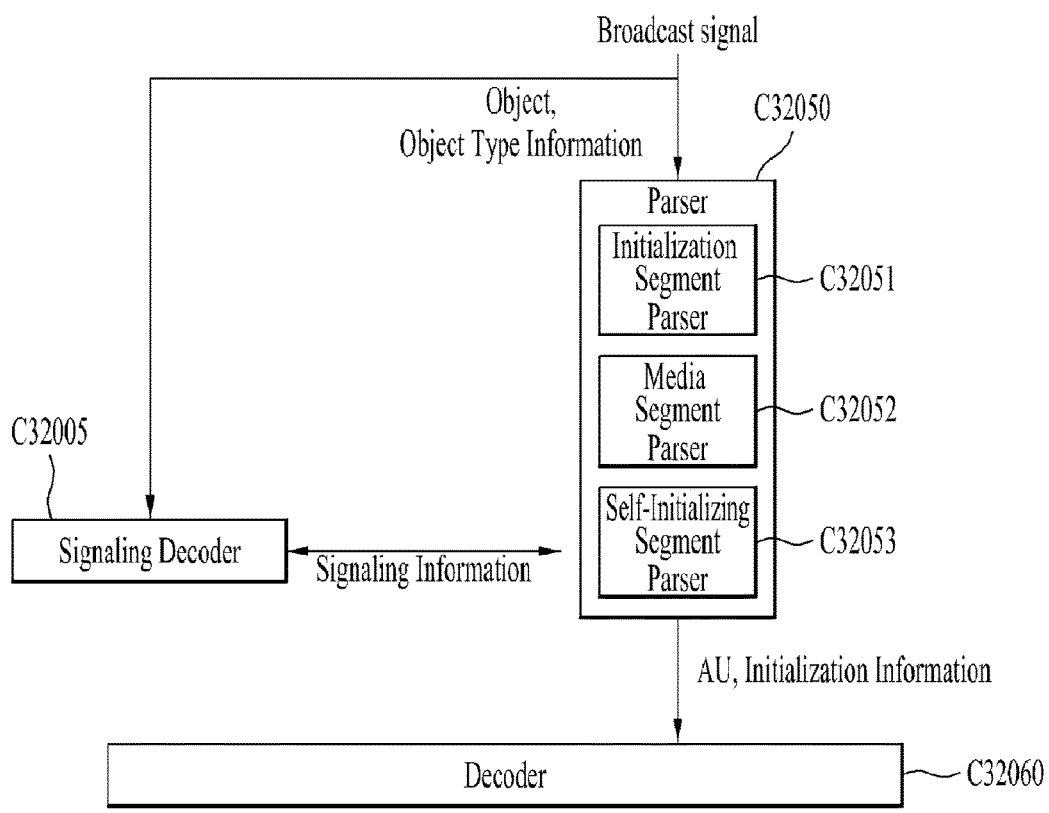

[Fig. 50]
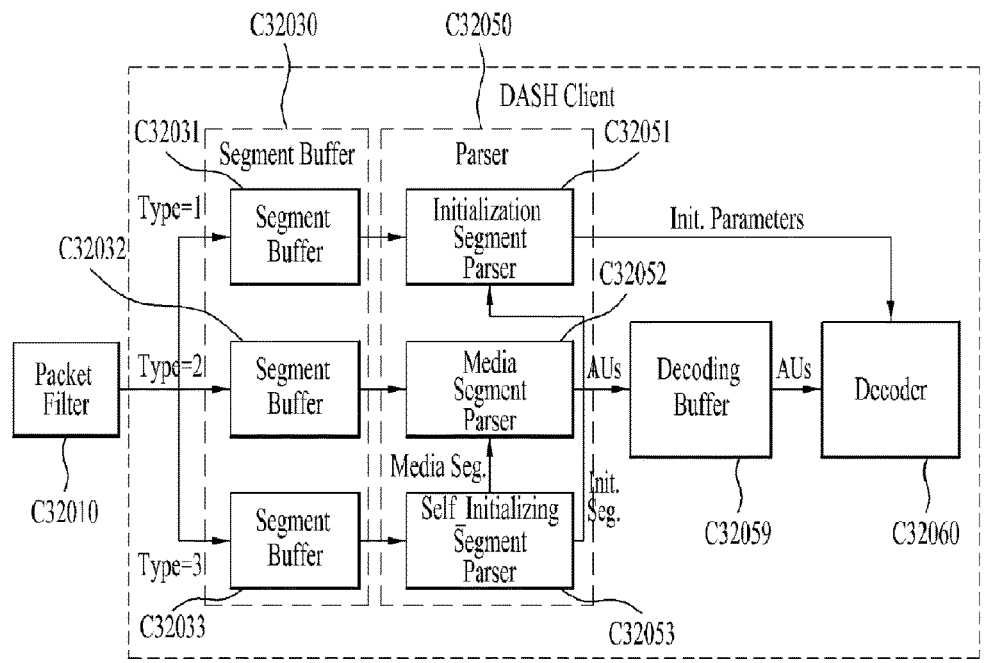
[Fig. 51]
| 0 | | | | | | | | 7 | | | | | | | 15 | | | | | | | | 23 | | | | | | | | 31 |
|---|---|---|---|---|---|---|---|---|---|---|---|---|---|---|---|---|---|---|---|---|---|---|---|---|---|---|---|---|---|---|---|
| V | | C | | PSI | S | O | H | Res | A | B | | | HDR_LEN | | | | | | Codepoint (CP) | | | | | | | | | | | | |
| Congestion Control Information (CCI) |||||||||||||||||||||||||||||||| 
| Transport Session Identifier (TSI) ||||||||||||||||||||||||||||||||
| Transport Object Identifier (TOI) ||||||||||||||||||||||||||||||||
| HET |||||||| Internal Structure Type |||||||| Reserved ||||||||||||||||
| Header Extensions (EXT_FTI, EXT_TIME etc.) ||||||||||||||||||||||||||||||||
| FEC Payload ID ||||||||||||||||||||||||||||||||
| Encoding symbol (s) ||||||||||||||||||||||||||||||||

[Fig. 52]

| 0 | | 7 | | | 15 | | | | 23 | 31 |
|---|---|---|---|---|---|---|---|---|---|---|
| V | C | PSI | S | O | H | Res | A | B | HDR_LEN | Codepoint (CP) |
| Congestion Control Information (CCI) ||||||||||||
| Transport Session Identifier (TSI) ||||||||||||
| Transport Object Identifier (TOI) ||||||||||||
| HET ||| SF || Reserved ||| Offset |||
| Header Extensions (EXT_FTI, EXT_TIME etc.) ||||||||||||
| FEC Payload ID ||||||||||||
| Encoding symbol (s) ||||||||||||

[Fig. 53]

| 0 | | 7 | | | 15 | | | | 23 | 31 |
|---|---|---|---|---|---|---|---|---|---|---|
| V | C | PSI | S | O | H | Res | A | B | HDR_LEN | Codepoint (CP) |
| Congestion Control Information (CCI) ||||||||||||
| Transport Session Identifier (TSI) ||||||||||||
| Transport Object Identifier (TOI) ||||||||||||
| HET |||| HEL |||| URL |||
| Header Extensions (EXT_FTI, EXT_TIME etc.) ||||||||||||
| FEC Payload ID ||||||||||||
| Encoding symbol (s) ||||||||||||

[Fig. 54]

| 0 | | | | | | | | | 7 | | | | | | | | 15 | | | | | | | | 23 | | | | | | | 31 |
|---|---|---|---|---|---|---|---|---|---|---|---|---|---|---|---|---|---|---|---|---|---|---|---|---|---|---|---|---|---|---|---|---|
| V | | C | | PSI | S | O | H | Res | A | B | | | HDR_LEN | | | | | | | | Codepoint (CP) | | | | | | | | | | | |
| Congestion Control Information (CCI) |||||||||||||||||||||||||||||||||
| Session Group Identifier (SGI) |||||||||||||||| Divided Transport Session Identifier (DTSI) ||||||||||||||||
| Object Group Identifier (OGI) |||||||||||||||| Divided Transport Object Identifier (DTOI) ||||||||||||||||
| Header Extensions (EXT_FTI, EXT_TIME etc.) |||||||||||||||||||||||||||||||||
| FEC Payload ID |||||||||||||||||||||||||||||||||
| Encoding symbol (s) |||||||||||||||||||||||||||||||||

[Fig. 55]
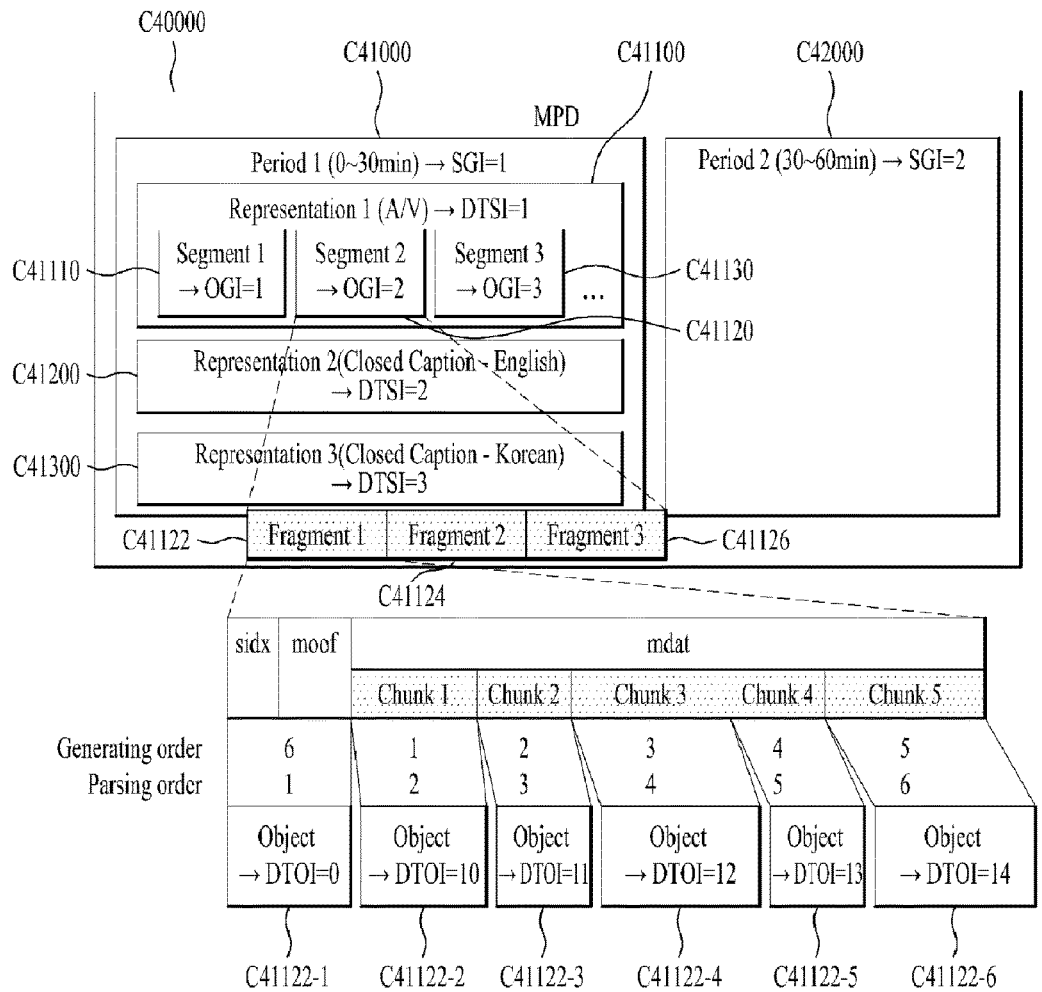
[Fig. 56]
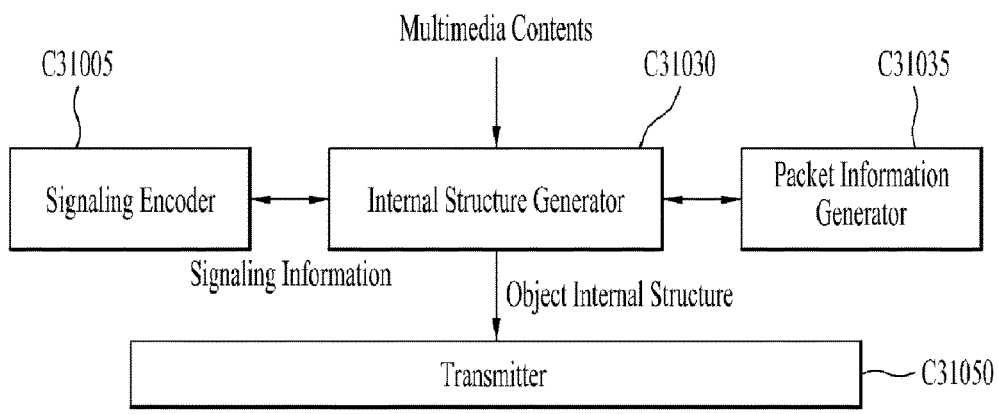

[Fig. 57]
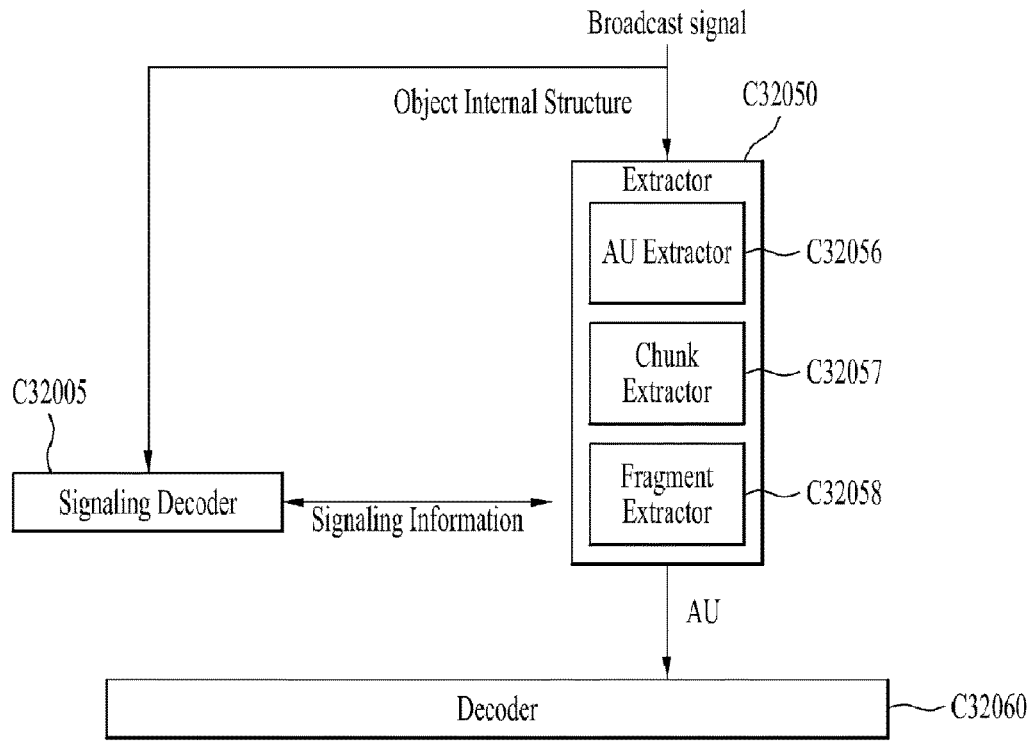
[Fig. 58]
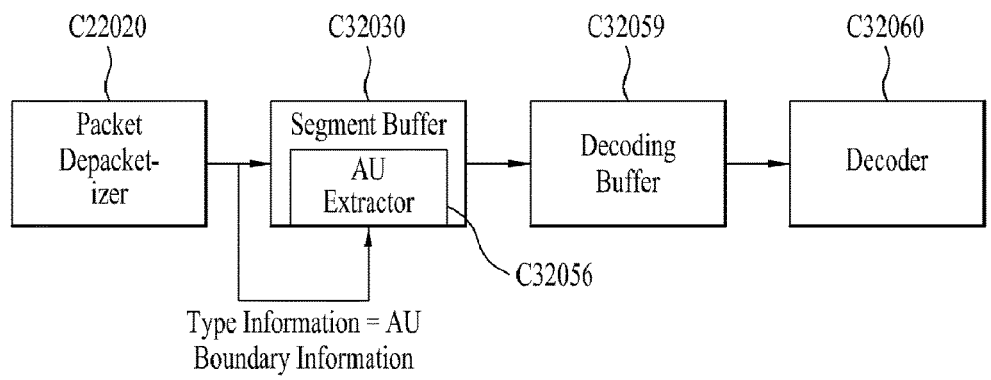

[Fig. 59]
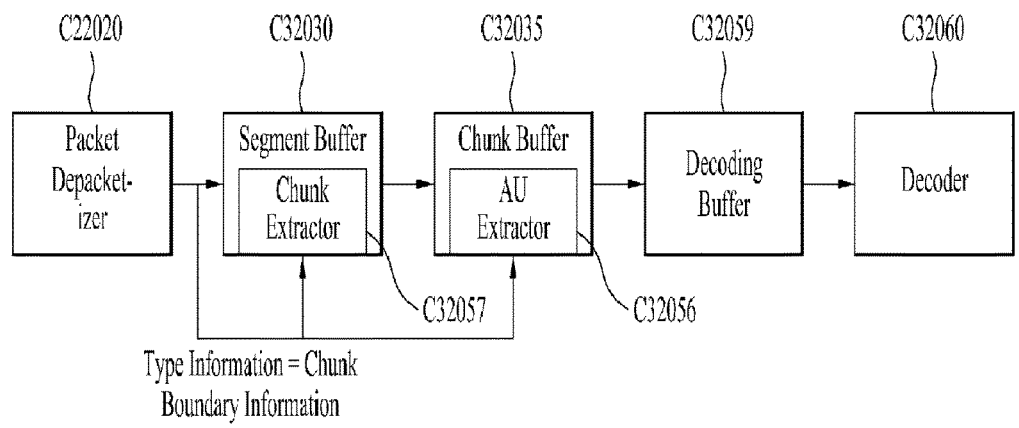
[Fig. 60]
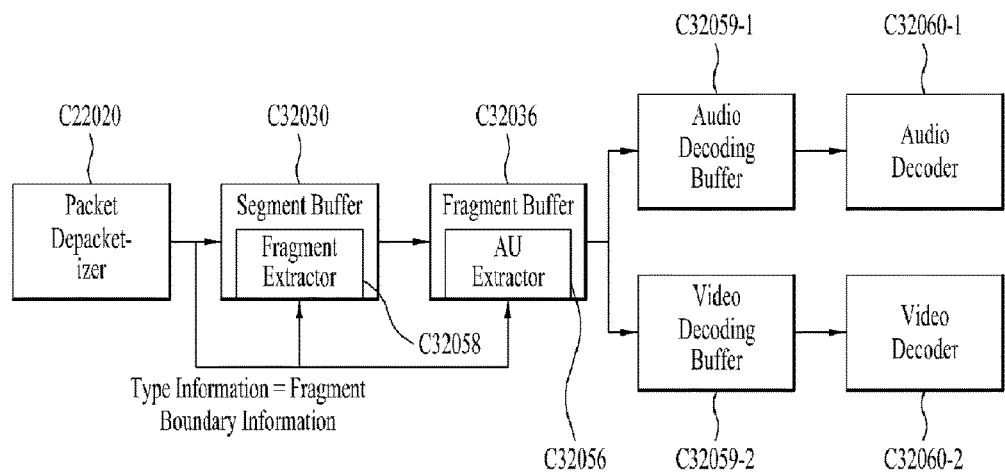

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This application is a Continuation of U.S. patent application Ser. No. 14/913,934 filed on Feb. 23, 2016, which was filed as the National Phase of PCT International Application No. PCT/KR2014/013065 on Dec. 30, 2014, which claims the benefit of priority under 35 U.S.C. § 119(e) to U.S. Provisional Application No. 61/923,242 filed on Jan. 3, 2014, all of which are hereby expressly incorporated by reference into the present application.

FIELD OF THE INVENTION

The present invention relates to an apparatus for transmitting broadcast signals, an apparatus for receiving broadcast signals and methods for transmitting and receiving broadcast signals.

DISCUSSION OF THE RELATED ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data.

Still another object of the present invention is to provide an apparatus for transmitting broadcast signals, an apparatus for receiving broadcast signals and methods for transmitting and receiving broadcast signals to signal signaling information necessary to provide broadcast signals.

The conventional art requires a considerably long time consumed for obtaining multimedia content and displaying the multimedia content for a user, so that the conventional art is inappropriate for the real-time broadcasting environment.

To achieve the object and other advantages and in accordance with the purpose of the invention, as embodied and broadly described herein, the present invention provides a method of transmitting broadcast signals. The method of transmitting broadcast signals includes:

The object of the present invention can be achieved by providing a broadcast signal transmitting apparatus including a signaling encoder for generating signaling information indicating whether a broadcast signal including multimedia content is transmitted in real time using a broadcast network, an internal structure generator for generating at least one object internal structure obtained by dividing a file included in the multimedia content into an independently encoded or decoded data unit, a packet information generator for generating packet information including metadata for identification of the object internal structure when the signaling information indicates that the multimedia content is transmitted in real time, and a transmitter for transmitting a broadcast signal including the object internal structure and the packet information.

The packet information may include boundary information indicating a boundary of the object internal structure and type information indicating a type of the object internal structure.

The boundary information may include a start flag (SF) field indicating whether the packet includes a start point of the object internal structure, and an offset field indicating a position of a start point of the object internal structure in the packet.

The type of the object internal structure may include one of a fragment indicating a data unit including a pair of movie fragment box (moof) and media data container box (mdat), chunk indicating a set of adjacent samples having the same media type, GOP indicating a set of frames including at least one I-frame, an access unit indicating a basic data unit of encoded video or audio, and a NAL unit indicating a data unit packetized in a byte unit.

The packet information may further include mapping information for mapping at least one of a session, an object, and an object internal structure to at least one of a transport session identifier (TSI) and a transport object identifier (TOI).

The packet information may further include grouping information for grouping a transport session and a transport object transmitted in a packet, and the grouping information may further include a divided transport session identifier (DTSI) field for identification of the transport session, a session group identifier (SGI) field for identification of a group of the same transport session, a divided transport object identifier (DTOI) field for identification of the transport object, and an object group identifier (OGI) field for identification of a group of the same transport object.

The SGI field may include information for identification of a period element of MPEG-DASH, the DTSI field may include information for identification of a representation element of MPEG-DASH, the OGI field may include information for identification of a segment element of MPEG-DASH, and the DTOI field may include information for identification of a chunk element of MPEG-DASH.

In another aspect of the present invention, provided herein is a broadcast signal receiving apparatus including a signaling decoder for decoding signaling information indicating whether a broadcast signal including multimedia content is transmitted in real time using a broadcast network, an extractor for extracting at least one object internal structure obtained by dividing a file included in the multimedia content into an independently encoded or decoded data unit, from the broadcast signal based on packet information when the signaling information indicates that the multimedia content is transmitted in real time, wherein the packet information includes metadata for identification of the object internal structure, and a decoder for decoding the object internal structure.

The packet information may include boundary information indicating a boundary of the object internal structure and type information indicating a type of the object internal structure.

The boundary information may include a start flag (SF) field indicating whether the packet includes a start point of the object internal structure, and an offset field indicating a position of a start point of the object internal structure in the packet.

The type of the object internal structure may include one of a fragment indicating a data unit including a pair of movie fragment box (moof) and media data container box (mdat), chunk indicating a set of adjacent samples having the same media type, GOP indicating a set of frames including at least one I-frame, an access unit indicating a basic data unit of encoded video or audio, and a NAL unit indicating a data unit packetized in a byte unit.

The packet information may further include mapping information for mapping at least one of a session, an object, and an object internal structure to at least one of a transport session identifier (TSI) and a transport object identifier (TOI).

The packet information may further include grouping information for grouping a transport session and a transport object transmitted in a packet, and the grouping information may further include a divided transport session identifier (DTSI) field for identification of the transport session, a session group identifier (SGI) field for identification of a group of the same transport session, a divided transport object identifier (DTOI) field for identification of the transport object, and an object group identifier (OGI) field for identification of a group of the same transport object.

The SGI field may include information for identification of a period element of MPEG-DASH, the DTSI field may include information for identification of a representation element of MPEG-DASH, the OGI field may include information for identification of a segment element of MPEG-DASH, and the DTOI field may include information for identification of a chunk element of MPEG-DASH.

SUMMARY OF THE INVENTION

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

The apparatus for transmitting broadcast signals according to the embodiments can reduce a standby time needed for transmitting multimedia content.

The apparatus for receiving broadcast signals according to the embodiments can reduce a standby time needed for reproducing multimedia content.

The embodiments of the present invention can reduce a total time consumed for obtaining multimedia content and displaying the multimedia content for a user.

The embodiments of the present invention can reduce an initial delay time needed for the user who approaches a broadcast channel.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interleaved XFECBLOCKs from each interleaving array according to an embodiment of the present invention.

FIG. 30 illustrates a data processing time when a File Delivery over Unidirectional Transport (FLUTE) protocol is used.

FIG. 31 illustrates a Real-Time Object Delivery over Unidirectional Transport (ROUTE) protocol stack according to an embodiment of the present invention.

FIG. 32 illustrates a data structure of file-based multimedia content according to an embodiment of the present invention.

FIG. 33 illustrates a media segment structure of MPEG-DASH to which the data structure is applied.

FIG. 34 illustrates a data processing time using a ROUTE protocol according to an embodiment of the present invention.

FIG. 35 illustrates a Layered Coding Transport (LCT) packet structure for file transmission according to an embodiment of the present invention.

FIG. 36 illustrates a structure of an LCT packet according to an embodiment of the present invention.

FIG. 37 illustrates real-time broadcast support information signaling based on FDT according to an embodiment of the present invention.

FIG. 38 is a block diagram illustrating a broadcast signal transmission apparatus according to an embodiment of the present invention.

FIG. 39 is a block diagram illustrating a broadcast signal transmission apparatus according to an embodiment of the present invention.

FIG. 40 is a flowchart illustrating a process for generating and transmitting in real time the file-based multimedia content according to an embodiment of the present invention.

FIG. 41 is a flowchart illustrating a process for allowing the broadcast signal transmission apparatus to generate packets using a packetizer according to an embodiment of the present invention.

FIG. 42 is a flowchart illustrating a process for generating/transmitting in real time the file-based multimedia content according to an embodiment of the present invention.

FIG. 43 is a block diagram illustrating a file-based multimedia content receiver according to an embodiment of the present invention.

FIG. 44 is a block diagram illustrating a file-based multimedia content receiver according to an embodiment of the present invention.

FIG. 45 is a flowchart illustrating a process for receiving/consuming a file-based multimedia content according to an embodiment of the present invention.

FIG. 46 is a flowchart illustrating a process for receiving/consuming in real time a file-based multimedia content according to an embodiment of the present invention.

FIG. 47 is a diagram illustrating a structure of a packet including object type information according to another embodiment of the present invention.

FIG. 48 is a diagram illustrating a structure of a packet including object type information according to another embodiment of the present invention.

FIG. 49 is a diagram illustrating a structure of a broadcast signal receiving apparatus using object type information according to another embodiment of the present invention.

FIG. 50 is a diagram illustrating a structure of a broadcast signal receiving apparatus using object type information according to another embodiment of the present invention.

FIG. 51 is a diagram illustrating a structure of a packet including type information according to another embodiment of the present invention.

FIG. 52 is a diagram illustrating a structure of a packet including boundary information according to another embodiment of the present invention.

FIG. 53 is a diagram illustrating a structure of a packet including mapping information according to another embodiment of the present invention.

FIG. 54 is a diagram illustrating a structure of an LCT packet including grouping information according to another embodiment of the present invention.

FIG. 55 is a diagram illustrating grouping of a session and an object according to another embodiment of the present invention.

FIG. 56 is a diagram illustrating a structure of a broadcast signal transmitting apparatus using packet information according to another embodiment of the present invention.

FIG. 57 is a diagram illustrating a structure of a broadcast signal receiving apparatus according to another embodiment of the present invention.

FIG. 58 is a diagram illustrating a structure of a broadcast signal receiving apparatus using packet information according to another embodiment of the present invention.

FIG. 59 is a diagram illustrating a structure of a broadcast signal receiving apparatus using packet information according to another embodiment of the present invention.

FIG. 60 is a diagram illustrating a structure of a broadcast signal receiving apparatus using packet information according to another embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |

TABLE 5-continued

| Value | PHY profile |
|---|---|
| 010 | Advanced profiled |
| 011~110 | Reserved |
| 111 | FEF |

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

(a) DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

(a) RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

(a) AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs (0, . . . , DDP1−1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2−1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$ The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc}=[I_{ldpc}P_{ldpc}]=[i_0,i_1, \ldots ,i_{K_{ldpc}-1},p_0,p_1, \ldots ,p_{N_{ldpc}-K_{ldpc}-1}]$$ [Math figure 3]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0 = p_1 = p_2 = \ldots = p_{N_{ldpc}-K_{ldpc}-1} = 0 \quad \text{[Math figure 4]}$$

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \, p_{2815} = p_{2815} \oplus i_0$$

$$p_{4837} = p_{4837} \oplus i_0 \, p_{4989} = p_{4989} \oplus i_0$$

$$p_{6138} = p_{6138} \oplus i_0 \, p_{6458} = p_{6458} \oplus i_0$$

$$p_{6921} = p_{6921} \oplus i_0 \, p_{6974} = p_{6974} \oplus i_0$$

$$p_{7572} = p_{7572} \oplus i_0 \, p_{8260} = p_{8260} \oplus i_0$$

$$p_{8496} = p_{8496} \oplus i_0 \quad \text{[Math figure 5]}$$

3) For the next 359 information bits, is, s=1, 2, . . . , 359 accumulate is at parity bit addresses using following Math figure.

$$\{x + (s \bmod 360) \times Q_{ldpc}\} \bmod (N_{ldpc} - K_{ldpc}) \quad \text{[Math figure 6]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \, p_{2839} = p_{2839} \oplus i_1$$

$$p_{4861} = p_{4861} \oplus i_1 \, p_{5013} = p_{5013} \oplus i_1$$

$$p_{6162} = p_{6162} \oplus i_1 \, p_{6482} = p_{6482} \oplus i_1$$

$$p_{6945} = p_{6945} \oplus i_1 \, p_{6998} = p_{6998} \oplus i_1$$

$$p_{7596} = p_{7596} \oplus i_1 \, p_{8284} = p_{8284} \oplus i_1$$

$$p_{8520} = p_{8520} \oplus i_1 \quad \text{[Math figure 7]}$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Math figure 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldpc} - K_{ldpc} - 1 \quad \text{[Math figure 8]}$$

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |

TABLE 32-continued

| Modulation type | $\eta_{mod}$ | $N_{QCB\_IG}$ |
|---|---|---|
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,l}, c_{1,l}, \ldots, c_{\eta_{mod}-1,l})$ of the bit interleaving output is demultiplexed into $(d_{1,0,m}, d_{1,1,m} \ldots, d_{1,\eta_{mod}-1,m})$ and $(d_{2,0,m}, d_{2,1,m} \ldots, d_{2,\eta_{mod}-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,l}, c_{1,l}, \ldots, c_{9,l})$ of the Bit Interleaver output is demultiplexed into $(d_{1,0,m}, d_{1,1,m} \ldots, d_{1,3,m})$ and $(d_{2,0,m}, d_{2,1,m} \ldots, d_{2,5,m})$, as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, K, d_{n,s,0,N_{cells}-1}, d_{n,s,1,0}, d_{n,s,1,N_{cells}-1},$$
$$K, d_{n,s,N_{xBLOCK\_TI}(n,s)-1,0},$$
$$K, d_{n,s,N_{xBLOCK\_TI}(n,s)-1,N_{cells}-1})$$

where $d_{n,s,r,q}$ is the $q^{th}$ cell of the $r^{th}$ XFECBLOCK in the $s^{th}$ TI block of the $n^{th}$ TI group and represents the outputs of SSD and MIMO encodings as follows $$d_{n,s,r,q} = \begin{cases} f_{n,s,r,q}, & \text{the output of SSD\textbackslash encoding} \\ g_{n,s,r,q}, & \text{the output of MIMO encoding} \end{cases}.$$

In addition, assume that output XFECBLOCKs from the time interleaver 5050 are defined as $$(h_{n,s,0}, h_{n,s,1}, K, h_{n,s,i}, \ldots, h_{n,s,N_{xBLOCK\_TI}(n,s) \times N_{cells}-1})$$

where $h_{n,s,i}$ is the $i^{th}$ output cell (for i=0, K, $N_{xBLOCK\_TI}$ (n,s)×$N_{cells}$−1) in the $s^{th}$ TI block of the $n^{th}$ TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the $s^{th}$ TI block of the $n^{th}$ TI group, the number of rows $N_r$ of a TI memory is equal to the number of cells $N_{cells}$, i.e., $N_r$=$N_{cells}$ while the number of columns $N_c$ is equal to the number $N_{xBLOCK\_TI}$(n, s).

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$(i=0, . . . , $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

[Math FIG. 9]

GENERATE($R_{n,s,i}$, $C_{n,s,i}$) =
{
$R_{n,s,i}$ = mod($i$, $N_r$),
$T_{n,s,i}$ = mod($S_{shift} \times R_{n,s,i}$, $N_c$),
$C_{n,s,i}$ = mod$\left(T_{n,s,i} + \left\lfloor \dfrac{i}{N_r} \right\rfloor, N_c\right)$
} where $S_{shift}$ is a common shift value for the diagonal-wise reading process regardless of $N_{xBLOCK\_TI}$(n,s), and it is determined by $N_{xBLOCK\_TI\_MAX}$ given in the PLS2-STAT as follows expression.

[Math FIG. 10]

for
$$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$

$$S_{shift} = \dfrac{N'_{xBLOCK\_TI\_MAX} - 1}{2}$$

As a result, the cell positions to be read are calculated by a coordinate as $z_{n,s,i}$=$N_rC_{n,s,i}$+$R_{n,s,i}$.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}$(0,0)=3, $N_{xBLOCK\_TI}$(1,0)=6, $N_{xBLOCK\_TI}$(2,0)=5.

The variable number $N_{xBLOCK\_TI}$(n,s)=$N_r$ will be less than or equal to $N'_{xBLOCK\_TI\_MAX}$. Thus, in order to achieve a single-memory deinterleaving at the receiver side, regardless of $N_{xBLOCK\_TI}$(n,s), the interleaving array for use in a twisted row-column block interleaver is set to the size of $N_r \times N_c$=$N_{cells} \times N'_{xBLOCK\_TI\_MAX}$ by inserting the virtual XFECBLOCKs into the TI memory and the reading process is accomplished as follow expression.

[Math FIG. 11]

p = 0;
for i = 0;i < $N_{cells}N_{xBLOCK\_TI\_MAX}$;i = i + 1
 {GENERATE ($R_{n,s,i}$, $C_{n,s,i}$);
 $V_i$ = $N_rC_{n,s,j}$ + $R_{n,s,j}$
  if $V_i$ < $N_{cells}N_{xBLOCK\_TI}$(n,s)
  {
   $z_{n,s,p}$ = $V_i$; p = p + 1;
  }
 }

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}$=1, $I_{JUMP}$=1, and $P_I$=1. The number of XFECBLOCKs, each of which has $N_{cells}$=30 cells, per TI group is signaled in the PLS2-DYN data by $N_{xBLOCK\_TI}$(0,0)=3, $N_{xBLOCK\_TI}$(1,0)=6, and $N_{xBLOCK\_TI}$(2, 0)=5, respectively. The maximum number of XFECBLOCK is signaled in the PLS2-STAT data by $N_{xBLOCK\_Group\_MAX}$, which leads to $\lfloor N_{xBLOCK\_Group\_MAX} / N_{TI} \rfloor$=$N_{xBLOCK\_TI\_MAX}$=6.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}$=7 and $S_{shift}$=(7−1)/2=3. Note that in the reading process shown as pseudocode above, if $V_i \geq N_{cells} N_{xBLOCK\_TI}$(n,s), the value of $V_i$ is skipped and the next calculated value of $V_i$ is used.

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}$=7 and $S_{shift}$=3.

A method for segmenting a file configured to transmit file-based multimedia content in a real-time broadcast environment, and consuming the file segments according to the embodiments of the present invention will hereinafter be described in detail.

In more detail, the embodiment provides a data structure for transmitting the file-based multimedia content in the real-time broadcast environment. In addition, the embodiment provides a method for identifying not only segmentation generation information of a file needed for transmitting file-based multimedia content but also consumption information in a real-time broadcast environment. In addition, the embodiment provides a method for segmenting/generating a file needed for transmitting the file-based multimedia content in a real-time broadcast environment. The embodiment provides a method for segmenting and consuming the file needed for consuming the file-based multimedia content.

FIG. 30 illustrates a data processing time when a File Delivery over Unidirectional Transport (FLUTE) protocol is used.

Recently, hybrid broadcast services in which a broadcast network and the Internet network are combined have been widely used. The hybrid broadcast service may transmit A/V content to the legacy broadcast network, and may transmit additional data related to A/V content over the Internet. In addition, a service for transmitting some parts of the A/V content may be transmitted over the Internet has recently been provided.

Since the A/V content is transmitted over a heterogeneous network, a method for closely combining A/V content data pieces transmitted over a heterogeneous network and a simple cooperation method are needed. For this purpose, a communication transmission method capable of being simultaneously applied to the broadcast network and the Internet is needed.

A representative one of the A/V content transmission methods capable of being commonly applied to the broadcast network and the Internet is to use the file-based multimedia content. The file-based multimedia content has superior extensibility, is not dependent upon a transmission (Tx) protocol, and has been widely used using a download scheme based on the legacy Internet.

A File Delivery over Unidirectional Transport protocol (FLUTE) is a protocol that is appropriate not only for the interaction between the broadcast network and the Internet but also for transmission of the file-based multimedia content of a large-capacity file.

FLUTE is an application for unidirectional file transmission based on ALC, and is a protocol in which information regarding files needed for file transmission or information needed for transmission are defined. According to FLUTE, information needed for file transmission and information regarding various attributes of a file to be transmitted have been transmitted through transmission of FDT (File Delivery Table) instance, and the corresponding file is then transmitted.

ALC (Asynchronous Layered Coding) is a protocol in which it is possible to control reliability and congestion during a file transmission time in which a single transmitter transmits the file to several receivers. ALC is a combination of an FEC Building Block for error control, a WEBRC Building Block for congestion control, a Layered Coding Transport (LCT) Building Block for session and channel management, and may construct a building block according to the service and necessity.

ALC is used as a content transmission protocol such that it can very efficiently transmit data to many receivers. In addition, ALC has unidirectional characteristics, is transmitted in a limited manner as necessary, does not require specific channel and resources for feedback, and can be used not only in the wireless environmental broadcasting but also in the satellite environmental broadcasting. Since ALC has no feedback, the FEC code scheme can be entirely or partially applied for reliability, resulting in implementation of reliable services. In addition, an object to be sent is FEC-encoded according to the FEC scheme, constructs Tx blocks and additional symbols formed by the FEC scheme, and is then transmitted. ALC session may be composed of one or more channels, and several receivers select a channel of the session according to the network state and receive a desired object over the selected channel. The receivers can be devoted to receive its own content, and are little affected by a state of other receivers or pass loss. Therefore, ALC has high stability or can provide a stable content download service using multi-layered transmission.

LCT may support transmission (Tx) levels for a reliable content transmission (e.g., FLUTE) protocol and a stream transmission protocol. LCT may provide content and characteristics of the basic information to be transmitted to the receiver. For example, LCT may include a Transport Session Identifier (TSI) field, a Transport Object ID (TOI) field, and a Congestion Control Information (CCI) field.

TSI field may include information for identifying the ALC/LCT session. For example, a channel contained in the session may be identified using a transmitter IP address and a UDP port. TOI field may include information for identifying each file object. CCI field may include information regarding a used or unused state and information regarding a Congestion Control Block. In addition, LCT may provide additional information and FEC-associated information through an extended header.

As described above, the object (e.g., file) is packetized according to the FLUTE protocol, and is then packetized according to the ALC/LCT scheme. The packetized ALC/LCT data is re-packetized according to the UDP scheme, and the packetized ALC/LCT/UDP data is packetized according to the IP scheme, resulting in formation of ALC/LCT/UDP/IP data.

The file-based multimedia content may be transmitted not only to the Internet but also to the broadcast network through the content transmission protocol such as LCT. In this case, multimedia content composed of at least one object or file may be transmitted and consumed in units of an object or a file through the LCT. A detailed description thereof will hereinafter be described in detail.

FIG. 30(a) shows a data structure based on the FLUTE protocol. For example, the multimedia content may include at least one object. One object may include at least one fragment (Fragment 1 or Fragment 2).

A data processing time needed for the FLUTE protocol is shown in FIG. 30(b). In FIG. 30(b), the lowest drawing shows the encoding start and end times at which the broadcast signal transmission apparatus starts or stops encoding of one object, and the highest drawing shows the reproduction start and end times at which the broadcast signal reception apparatus starts or stops reproduction of one object.

The broadcast signal transmission apparatus may start transmission of the object upon after completion of generation of the object including at least one fragment. Therefore, there occurs a transmission standby time ($D_{t1}$) between a start time at which the broadcast signal transmission apparatus starts to generate the object and another time at which the broadcast signal transmission apparatus starts to transmit the object.

In addition, the broadcast signal reception apparatus stops reception of the object including at least one object, and then starts reproduction of the object. Therefore, there occurs a reproduction standby time ($D_{r1}$) between a start time at which the broadcast signal reception apparatus starts reception of the object and another time at which the broadcast signal reception apparatus starts to reproduce the object.

Therefore, a predetermined time corresponding to the sum of a transmission standby time and a reproduction standby time is needed before one object is transmitted from the broadcast signal transmission apparatus and is then reproduced by the broadcast signal reception apparatus. This means that the broadcast signal reception apparatus requires a relatively long initial access time to access the corresponding object.

As described above, since the FLUTE protocol is used, the broadcast signal transmission apparatus transmits data on an object basis, the broadcast signal reception apparatus must receive data of one object and must consume the corresponding object. Therefore, object transmission based on the FLUTE protocol is inappropriate for the real-time broadcast environment.

FIG. 31 illustrates a Real-Time Object Delivery over Unidirectional Transport (ROUTE) protocol stack according to an embodiment of the present invention.

The next-generation broadcast system supporting the IP-based hybrid broadcasting may include video data, audio data, subtitle data, signaling data, Electronic Service Guide (ESG) data, and/or NRT content data.

Video data, audio data, subtitle data, etc. may be encapsulated in the form of ISO Base Media File (hereinafter referred to as ISO BMFF). For example, data encapsulated in the form of ISO BMFF may have a of MPEG (Moving Picture Expert Group)-DASH (Dynamic Adaptive Streaming over HTTP) segment or a format of Media Processing Unit (MPU). Then, data encapsulated in the form of BMFF may be equally transmitted over the broadcast network or the Internet or may be differently transmitted according to attributes of respective transmission networks.

In the case of the broadcast network, data encapsulated in the form of ISO BMFF may be encapsulated in the form of an application layer transport protocol packet supporting real-time object transmission. For example, data encapsulated in the form of ISO BMFF may be encapsulated in the form of ROUTE (Real-Time Object Delivery over Unidirectional Transport) and MMT transport packet.

Real-Time Object Delivery over Unidirectional Transport (ROUTE) is a protocol for the delivery of files over IP multicast networks. ROUTE protocol utilizes Asynchronous Layered Coding (ALC), the base protocol designed for massively scalable multicast distribution, Layered Coding Transport (LCT), and other well-known Internet standards.

ROUTE is an enhancement of and functional replacement for FLUTE with additional features. ROUTE protocol is the reliable delivery of delivery objects and associated metadata using LCT packets. The ROUTE protocol may be used for real-time delivery.

Thereafter, data encapsulated in the form of the application layer transport protocol packet may be packetized according to the IP/UDP scheme. The data packetized by the IP/UDP scheme may be referred to as the IP/UDP datagram, and the IP/UDP datagram may be loaded on the broadcast signal and then transmitted.

In the case of the Internet, data encapsulated in the form of ISO BMFF may be transferred to the receiver according to the streaming scheme. For example, the streaming scheme may include MPEG-DASH.

The signaling data may be transmitted using the following methods.

In the case of the broadcast network, signaling data may be transmitted through a specific data pipe (hereinafter referred to as DP) of a transport frame (or frame) applied to a physical layer of the next-generation broadcast transmission system and broadcast network according to attributes of the signaling data. For example, the signaling format may be encapsulated in the form of a bitstream or IP/UDP datagram.

In the case of the Internet, the signaling data may be transmitted as a response to a request of the receiver.

ESG data and NRT content data may be transmitted using the following methods.

In the case of the broadcast network, ESG data and NRT content data may be encapsulated in the form of an application layer transport protocol packet. Thereafter, data encapsulated in the form of the application layer transport protocol packet may be transmitted in the same manner as described above.

In the case of the Internet, ESG data and NRT content data may be transmitted as a response to the request of the receiver.

The physical layers (Broadcast PHY and broadband PHY) of the broadcast signal transmission apparatus according to the embodiment may be shown in FIG. 1. In addition, the physical layers of the broadcast signal reception apparatus may be shown in FIG. 9.

The signaling data and the IP/UDP datagram may be transmitted through a specific data pipe (hereinafter referred to as DP) of a transport frame (or frame). For example, the input formatting block 1000 may receive the signaling data and the IP/UDP datagram, each of the signaling data and the IP/UDP datagram may be demultiplexed into at least one DP. The output processor 9300 may perform the operations opposite to those of the input formatting block 1000.

The following description relates to an exemplary case in which data encapsulated in the form of ISO BMFF is encapsulated in the form of ROUTE transport packet, and a detailed description of the exemplary case will hereinafter be described in detail.

<Data Structure for Real-Time File Generation and Consumption>

FIG. 32 illustrates a data structure of file-based multimedia content according to an embodiment of the present invention.

The data structure of the file-based multimedia content according to the embodiment is shown in FIG. 32. The term "file-based multimedia content" may indicate multimedia content composed of at least one file.

The multimedia content such as a broadcast program may be composed of one presentation. The presentation may include at least one object. For example, the object may be a file. In addition, the object may include at least one fragment.

In accordance with the embodiment, the fragment may be a data unit capable of being independently decoded and reproduced without depending on the preceding data. For example, the fragment including video data may begin from an IDR picture, and header data for parsing media data does not depend on the preceding fragment. The fragment according to the embodiment may be divided and transmitted in units of at least one transfer block (TB).

In accordance with the embodiment, the transfer block (TB) may be a minimum data unit capable of being independently and transmitted without depending on the preceding data. In addition, the TB may be a significant data unit configured in the form of a variable-sized GOP or chunk. For example, the TB may include at least one chunk composed of the same media data as in GOP of video data. The term "chunk" may indicate a segment of the content. In addition, the TB may include at least one source block.

GOP is a basic unit for performing coding used in video coding and is a data unit with a variable size indicating a set of frames including at least one I-frame. According to an embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, B-frame or P-frame may refer to only a frame in the corresponding GOP and may not refer to frames in GOPs except for the corresponding GOP.

The TB may include at least one data, and respective data pieces may have the same or different media types. For example, the media type may include an audio type and a video type. That is, the TB may also include one or more data pieces having different media types in the same manner as in the audio and video data.

The fragment according to the embodiment may include a fragment header and a fragment payload.

The fragment header may include timing information and indexing information to parse the above-mentioned chunks. The fragment header may be comprised of at least one TB. For example, the fragment header may be contained in one TB. In addition, at least one chunk data constructing the fragment payload may be contained in at least one TB. As described above, the fragment header and the fragment payload may be contained in at least one TB.

The TB may be divided into one or more symbols. At least one symbol may be packetized. For example, the broadcast signal transmission apparatus according to the embodiment may packetize at least one symbol into the LCT packet.

The broadcast signal transmission apparatus according to the embodiment may transmit the packetized data to the broadcast signal reception apparatus.

FIG. 33 illustrates a media segment structure of MPEG-DASH to which the data structure is applied.

Referring to FIG. 33, the data structure according to the embodiment is applied to a media segment of MPEG-DASH.

The broadcast signal transmission apparatus according to the embodiment include multimedia contents having a plurality of qualities in the server, provides the multimedia contents appropriate for the user broadcast environment and the environment of the broadcast signal reception apparatus, such that it can provide the seamless real-time streaming service. For example, the broadcast signal transmission apparatus may provide the real-time streaming service using MPEG-DASH.

The broadcast signal transmission apparatus can dynamically transmit XML-type MPD (Media Presentation Description) and a segment of binary-format transmit (Tx) multimedia content to the broadcast signal reception apparatus using the ROUTE protocol according to the broadcast environment and the environment of the broadcast signal reception apparatus.

MPD is comprised of a hierarchical structure, and may include a structural function of each layer and roles of each layer.

The segment may include a media segment. The media segment may be a data unit having a media-related object format being separated per quality or per time to be transmitted to the broadcast signal reception apparatus so as to support the streaming service. The media segment may include information regarding a media stream, at least one access unit, and information regarding a method for accessing Media Presentation contained in the corresponding segment such as a presentation time or index. In addition, the media segment may be divided into at least one subsegment by the segment index.

MPEG-DASH content may include at least one media segment. The media segment may include at least one fragment. For example, the fragment may be the above-mentioned subsegment. As described above, the fragment may include a fragment header and a fragment payload.

The fragment header may include a segment index box (sidx) and a movie fragment box (moof). The segment index box may provide an initial presentation time of media data present in the corresponding fragment, a data offset, and SAP (Stream Access Points) information. The movie fragment box may include metadata regarding a media data box (mdat). For example, the movie fragment box may include timing, indexing, and decoding information of a media data sample contained in the fragment.

The fragment payload may include the media data box (mdat). The media data box (mdat) may include actual media data regarding the corresponding media constituent elements (video and audio data, etc.).

The encoded media data configured on a chunk basis may be contained in the media data box (mdat) corresponding to the fragment payload. As described above, samples corresponding to the same track may be contained in one chunk.

The broadcast signal transmission apparatus may generate at least one TB through fragment segmentation. In addition, the broadcast signal transmission apparatus may include the fragment header and the payload data in different TBs so as to discriminate between the fragment header and the payload data.

In addition, the broadcast signal transmission apparatus may transmit a transfer block (TB) divided on a chunk basis so as to segment/transmit data contained in the fragment payload. That is, the broadcast signal transmission apparatus according to the embodiment may generate a TB in a manner that a border of the chunk is identical to a border of the TB.

Thereafter, the broadcast signal transmission apparatus segments at least one TB such that it can generate at least one symbol. All symbols contained in the object may be identical to each other. In addition, the last symbol of TB may include a plurality of padding bytes such that all symbols contained in the object have the same length.

The broadcast signal transmission apparatus may packetize at least one symbol. For example, the broadcast signal transmission apparatus may generate the LCT packet on the basis of at least one symbol.

Thereafter, the broadcast signal transmission apparatus may transmit the generated LCT packet.

In accordance with the embodiment, the broadcast signal transmission apparatus first generates the fragment payload, and generates the fragment header so as to generate the fragment. In this case, the broadcast signal transmission apparatus may generate a TB corresponding to media data contained in the fragment payload. For example, at least TB corresponding to media data contained in the media data box (mdat) may be sequentially generated on a chunk basis. Thereafter, the broadcast signal transmission apparatus may generate the TB corresponding to the fragment header.

The broadcast signal transmission apparatus may transmit the generated TB according to the generation order so as to broadcast the media content in real time. In contrast, the broadcast signal reception apparatus according to the embodiment first parses the fragment header, and then parses the fragment payload.

The broadcast signal transmission apparatus may transmit data according to the parsing order when media data is pre-encoded or TB is pre-generated.

FIG. 34 illustrates a data processing time using a ROUTE protocol according to an embodiment of the present invention.

FIG. 34(a) shows the data structure according to the embodiment. The multimedia data may include at least one object. Each object may include at least one fragment. For example, one object may include two fragments (Fragment1 and Fragment 2).

The broadcast signal transmission apparatus may segment the fragment into one or more TBs. The TB may be a source block, and the following description will hereinafter be given on the basis of the source block.

For example, the broadcast signal transmission apparatus may segment the fragment 1 into three source blocks (Source Block 0, Source Block 1, and Source Block 2), and may segment the fragment 2 into three source blocks (Source Block 3, Source Block 4, Source Block 5).

The broadcast signal transmission apparatus may independently transmit each segmented source block. The broadcast signal transmission apparatus may start transmission of each source block generated when or just after each source block is generated.

For example, the broadcast signal transmission apparatus can transmit the source block 0 (S0) after the source block 0 (S0) has been generated for a predetermined time (te0~te1). The transmission start time (td0) of the source block 0 (S0) may be identical to the generation completion time (td0) or may be located just after the generation completion time (td0). Likewise, the broadcast signal transmission apparatus may generate the source blocks 1 to 5 (Source Block 1(S1) to Source Block 5(S5)), and may transmit the generated source blocks 1 to 5.

Therefore, the broadcast signal transmission apparatus according to the embodiment may generate a transmission standby time (Dt2) between a start time of generating one source block and another start time of transmitting the source block. The transmission standby time (Dt2) generated by the broadcast signal transmission apparatus is relatively shorter than the transmission standby time (Dt1) generated by the conventional broadcast signal transmission apparatus. Therefore, the broadcast signal transmission apparatus according to the embodiment can greatly reduce a transmission standby time as compared to the conventional broadcast signal transmission apparatus.

The broadcast signal reception apparatus according to the embodiment receives each segmented source block, and combines the received source blocks, such that it can generate at least one fragment. For example, the broadcast signal reception apparatus may receive the source block 0 (S0), the source block 1 (S1), and the source block 2 (S2), and combine the received three source blocks (S0, S1, S2) so as to generate the fragment 1. In addition, the broadcast signal reception apparatus receives the source block 3 (S3), the source block 4 (S4), and the source block 5 (S5), and combines the received three source blocks (S3, S4, S5) so as to generate the fragment 2.

The broadcast signal reception apparatus may separately generate each fragment. The broadcast signal reception apparatus may reproduce each fragment when or just after each fragment is generated. Alternatively, the broadcast signal reception apparatus may reproduce each fragment when or just after the source block corresponding to each fragment is transmitted.

For example, the broadcast signal reception apparatus may generate the fragment 1 after receiving the source blocks 0 to 2 (S0~S2) during a predetermined time (td0~td3). For example, after the broadcast signal reception apparatus receives the source blocks 0 to 2 (S0~S2) during a predetermined time (td0~td3), it can generate the fragment 1. Thereafter, the broadcast signal reception apparatus may reproduce the generated fragment 1. The reproduction start time (tp0) of the fragment 1 may be identical to the generation time of the fragment 1 or may be located after the generation time of the fragment 1. In addition, a reproduction start time (tp0) of the fragment 1 may be identical to a reception completion time of the source block 2 (S2) or may be located just after the reception completion time of the source block 2 (S2).

In the same manner, after the broadcast signal reception apparatus according to the embodiment receives the source blocks 3 to 5 (S3~S5) during a predetermined time (td3~td6), it may generate the fragment 2. Thereafter, the broadcast signal reception apparatus may reproduce the fragment 2.

However, the scope or spirit of the present invention is not limited thereto, and the broadcast signal reception apparatus according to the embodiment may receive the source block and may reproduce data in units of a received source block as necessary.

Therefore, the broadcast signal reception apparatus according to the embodiment may generate a reproduction standby time (Dr2) between a reception start time of one fragment and a reproduction start time of the fragment. The reproduction standby time (Dr2) generated by the broadcast signal reception apparatus is relatively shorter than the reproduction standby time (Dr2) generated by the broadcast signal reception apparatus. Therefore, the broadcast signal reception apparatus according to the embodiment can reduce a reproduction standby time as compared to the conventional broadcast signal reception apparatus.

As described above, a predetermined time corresponding to the sum of a transmission standby time and a reproduction standby time may be considerably reduced. Here, the predetermined time may be needed when one TB is transmitted from the broadcast signal transmission apparatus and is then reproduced by the broadcast signal reception apparatus. This means that an initial access time during which the broadcast signal reception apparatus initially approaches the corresponding object is considerably reduced.

In case of using the ROUTE protocol, the broadcast signal transmission apparatus may transmit data in units of a TB, and the broadcast signal reception apparatus may reproduce the received data in units of a TB or a fragment. As a result, a total time from an acquisition time of multimedia content to a content display time for a user can be reduced, and an initial access time required when the user approaches the broadcast channel can also be reduced.

Therefore, TB transmission based on the ROUTE protocol is appropriate for the real-time broadcast environment.

<Method for Identifying File Segmentation Generation and Consumption Information>

FIG. 35 illustrates a Layered Coding Transport (LCT) packet structure for file transmission according to an embodiment of the present invention.

An application layer transport session may be composed of an IP address and a port number. If the application layer transport session is the ROUTE protocol, the ROUTE session may be composed of one or more LCT (Layered Coding Transport) sessions. For example, if one media component is transmitted through one LCT transport session, at least one media component may be multiplexed and transmitted through one application layer transport session. In addition, at least one transport object may be transmitted through one LCT transport session.

Referring to FIG. 35, if the application layer transmission protocol is based on the LCT, each field of the LCT packet may indicate the following information.

The LCT packet may include an LCT version number field (V), a congestion control flag field (C), a reserved field (R), a transport session identifier flag field (S), a transport object identifier flag field (O), a half-word flag field (H), a sender current time present flag field (T), an expected residual time present flag field (R), a close session flag field (A), a close object flag field (B), an LCT header length field (HDR_LEN), a codepoint field (CP), a congestion control information field (CCI), a transport session identifier field (TSI), a transport object identifier field (TOI), a header extensions field, an FEC payload ID field, and/or an encoding symbol(s) field.

LCT version number field (V) indicates the protocol version number. For example, this field indicates the LCT version number. The version number field of the LCT header MUST be interpreted as the ROUTE version number field. This version of ROUTE implicitly makes use of version '1' of the LCT building block. For example, the version number is '0001b'.

Congestion control flag field (C) indicates the length of Congestion Control Information field. C=0 indicates the Congestion Control Information (CCI) field is 32-bits in length. C=1 indicates the CCI field is 64-bits in length. C=2 indicates the CCI field is 96-bits in length. C=3 indicates the CCI field is 128-bits in length.

Reserved field (R) reserved for future use. For example, Reserved field (R) may be Protocol-Specific Indication field (PSI). Protocol-Specific Indication field (PSI) may be used as an indicator for a specific purpose in the LCT higher protocol. PSI field indicates whether the current packet is a source packet or an FEC repair packet. As the ROUTE source protocol only delivers source packets, this field shall be set to '10b'.

Transport Session Identifier flag field(S) indicates the length of Transport Session Identifier field.

Transport Object Identifier flag field (O) indicates the length of Transport Object Identifier field. For example, the object may indicate one file, and the TOI may indicate ID information of each object, and a file having TOI=0 may be referred to as FDT.

Half-word flag field (H) may indicate whether half-word (16 bits) will be added to the length of TSI or TOI field.

Sender Current Time present flag field (T) indicates whether the Sender Current Time (SCT) field is present or not. T=0 indicates that the Sender Current Time (SCT) field is not present. T=1 indicates that the SCT field is present. The SCT is inserted by senders to indicate to receivers how long the session has been in progress.

Expected Residual Time present flag field (R) indicates whether the Expected Residual Time (ERT) field is present or not. R=0 indicates that the Expected Residual Time (ERT) field is not present. R=1 indicates that the ERT field is present. The ERT is inserted by senders to indicate to receivers how much longer the session/object transmission will continue.

Close Session flag field (A) may indicate whether session completion or an impending state of the session completion.

Close Object flag field (B) may indicate completion or impending completion of a transmitting object.

LCT header length field (HDR_LEN): indicates total length of the LCT header in units of 32-bit words.

Codepoint field (CP) indicates the type of the payload that is carried by this packet. Depending on the type of the payload, additional payload header may be added to prefix the payload data.

Congestion Control Information field (CCI) may be used to transmit congestion control information (e.g., layer numbers, logical channel numbers, sequence numbers, etc.). The Congestion Control Information field in the LCT header contains the required Congestion Control Information.

Transport Session Identifier field (TSI) is a unique ID of a session. The TSI uniquely identifies a session among all sessions from a particular sender. This field identifies the Transport Session in ROUTE. The context of the Transport Session is provided by the LSID (LCT Session Instance description).

LSID defines what is carried in each constituent LCT transport session of the ROUTE session. Each transport session is uniquely identified by a Transport Session Identifier (TSI) in the LCT header. LSID may be transmitted through the same ROUTE session including LCT transport sessions, and may also be transmitted through Web. LSID may be transmitted through the same ROUTE session including LCT transmission sessions and may also be transmitted through a communication network, a broadcast network, the Internet, a cable network, and/or a satellite network. The scope or spirit of a transmission unit of LSID is not limited thereto. For example, LSID may be transmitted through a specific LCT transport session having TSI=0. LSID may include signaling information regarding all transport sessions applied to the ROUTE session. LSID may include LSID version information and LSID validity information. In addition, LSID may include a transport session through which the LCT transport session information is transmitted. The transport session information may include TSI information for identifying the transport session, source flow information that is transmitted to the corresponding TSI and provides information regarding a source flow needed for source data transmission, repair flow information that is transmitted to the corresponding TSI and provides information regarding a repair flow needed for transmission of repair data, and transport session property information including additional characteristic information of the corresponding transport session.

Transport Object Identifier field (TOI) is a unique ID of the object. The TOI indicates which object within the session this packet pertains to. This field indicates to which object within this session the payload of the current packet belongs to. The mapping of the TOI field to the object is provided by the Extended FDT.

Extended FDT specifies the details of the file delivery data. This is the extended FDT instance. The extended FDT together with the LCT packet header may be used to generate the FDT-equivalent descriptions for the delivery object. The Extended FDT may either be embedded or may be provided as a reference. If provided as a reference the Extended FDT may be updated independently of the LSID. If referenced, it shall be delivered as in-band object on TOI=0 of the included source flow.

Header Extensions field may be used as an LCT header extension part for transmission of additional information. The Header Extensions are used in LCT to accommodate optional header fields that are not always used or have variable size.

For example, EXT_TIME extension is used to carry several types of timing information. It includes general purpose timing information, namely the Sender Current Time (SCT), Expected Residual Time (ERT), and Sender Last Change (SLC) time extensions described in the present document. It can also be used for timing information with narrower applicability (e.g., defined for a single protocol instantiation); in this case, it will be described in a separate document.

FEC Payload ID field may include ID information of Transmission Block or Encoding Symbol. FEC Payload ID may indicate an ID to be used when the above file is FEC-encoded. For example, if the FLUTE protocol file is FEC-encoded, FEC Payload ID may be allocated for a broadcast station or broadcast server configured to identify the FEC-encoded FLUTE protocol file.

Encoding Symbol(s) field may include Transmission Block or Encoding symbol data.

The packet payload contains bytes generated from an object. If more than one object is carried in the session, then the Transmission Object ID (TOI) within the LCT header MUST be used to identify from which object the packet payload data is generated.

The LCT packet according to the embodiment may include Real Time Support Extension field (EXT_RTS) corresponding to an extension format of a Header Extensions field. EXT_RTS may include segmentation generation and consumption information of the file, and will hereinafter be referred to as fragment information. The LCT packet according to the embodiment includes EXT_RTS corresponding to an extension format of the Header Extensions field, and may support real-time file transmission and consumption information using a method compatible with the legacy LCT.

The fragment information (EXT_RTS) according to the embodiment may include Header Extension Type field (HET), Fragment Start Indicator field (SI), Fragment Header flag field (FH), and Fragment Header Complete Indicator field (FC).

Header Extension Type field (HET) may indicate the corresponding Header Extension type. The HET field may be an integer of 8 bits. Basically, if HET for use in LCT is in the range of 0 to 127, a variable-length header extension in units of a 32-bit word is present, and the length of HET is written in the Header Extension Length field (HEL) subsequent to HET. If HET is in the range of 128 to 255, Header Extension may have a fixed length of 32 bits.

The fragment information (EXT_RTS) according to the embodiment has a fixed length of 32 bits, such that the corresponding Header Extension type may be identified using one unique value from among the values of 128 to 255, and may identify the corresponding Header Extension type.

SI field may indicate that the corresponding LCT packet includes a start part of the fragment. If a user in the broadcast environment approaches a random access of a file through which the corresponding file-based multimedia content is transmitted, packets having "SI field=0" from among the initial reception packets are discarded, the packets starting from a packet having "SI field=1" starts parsing, so that the packet processing efficiency and the initial delay time can be reduced.

FH field may indicate that the corresponding LCT packet includes the fragment header part. As described above, the fragment header is characterized in that a generation order and a consumption order of the fragment header are different from those of the fragment payload. The broadcast signal reception apparatus according to the embodiment may rearrange transmission blocks sequentially received on the basis of the FH field according to the consumption order, so that it can regenerate the fragment.

FC field may indicate that the corresponding packet includes the last data of the fragment. For example, if the fragment header is transmitted after the fragment payload is first transmitted, the FC field may indicate inclusion of the last data of the fragment header. If the fragment header is first transmitted and the fragment payload is then transmitted, the FC field may indicate inclusion of the last data of the fragment payload. The following description will hereinafter disclose an exemplary case in which the fragment payload is first transmitted and the fragment is then transmitted.

If the broadcast signal reception apparatus receives the packet having "FC field=1", the broadcast signal reception apparatus may recognize reception completion of the fragment header, and may perform fragment recovery by combining the fragment header and the fragment payload.

Padding Bytes field (PB) may indicate the number of padding bytes contained in the corresponding LCT packet. In the legacy LCT, all LCT packets corresponding to one object must be identical to each other. However, when a transmission block (TB) is divided according to the data construction method, the last symbol of each TB may have a different length. Therefore, the broadcast signal transmission apparatus according to the embodiment fills a residual part of the packet with padding bytes, such that it can support the real-time file transmission using a fixed-length packet according to the method compatible with the legacy LCT.

Reserved field reserved for future use.

FIG. 36 illustrates a structure of an LCT packet according to an embodiment of the present invention.

Some parts of FIG. 36 are substantially identical to those of FIG. 35, and as such a detailed description thereof will herein be omitted, such that FIG. 36 will hereinafter be described centering on a difference between FIG. 35 and FIG. 36.

Referring to FIG. 36, fragment information (EXT_RTS) according to an embodiment may include a Fragment Header Length field (FHL) instead of the FC field shown in FIG. 35.

FHL field indicates the number of constituent symbols of the fragment, so that it can provide specific information as to whether reception of the fragment is completed. The FHL field may indicate a total number of symbols corresponding to respective fragments including the fragment header and the fragment payload. In addition, the FHL field may indicate a total number of symbols to be transmitted later from among the fragment header and the fragment payload.

For example, if the fragment payload is first transmitted and the fragment header is then transmitted, the FHL field may indicate a total number of symbols corresponding to the fragment header. In this case, the FHL field may indicate the length of the fragment header.

If the fragment header is first transmitted and the fragment payload is then transmitted, the FHL field may indicate a total number of symbols corresponding to the fragment payload. In this case, the FHL field may indicate the length of the fragment payload.

The following description will hereinafter disclose an exemplary case in which the fragment payload is first transmitted and the fragment header is then transmitted.

The broadcast signal reception apparatus according to an embodiment may receive the LCT packet including the fragment header corresponding to the number of symbols displayed on the FHL field. The broadcast signal reception apparatus checks the number of reception times of the LCT packet including the fragment header, so that it can identify reception completion of the fragment header. Alternatively, the broadcast signal reception apparatus checks the number of TBs corresponding to the fragment header, so that it can identify reception completion of the fragment header.

<Method for Identifying Segmentation Generation and Segmentation Consumption Information of File>

FIG. 37 illustrates real-time broadcast support information signaling based on FDT according to an embodiment of the present invention.

Referring to FIG. 37, the present invention relates to a method for identifying segmentation generation and segmentation consumption information of file-based multimedia content in a real-time broadcast environment. The segmentation generation and segmentation consumption information of the file-based multimedia content may include the above-mentioned data structure and LCT packet information.

The broadcast signal transmission apparatus may further transmit additional signalling information so as to identify segmentation generation information and segmentation consumption information of the file. For example, the signalling information may include metadata ad out-of-band signaling information.

A method for transmitting signaling information regarding the real-time broadcast support information according to the embodiment is shown in FIG. 37.

The broadcast signal transmission apparatus according to the embodiment may transmit signaling information either through a File Delivery Table (FDT) level or through a file-level Real-Time-Support attribute. If Real-Time-Support is set to 1, objects written in the corresponding FDT level or File level may include the above-mentioned data structure and packet information, such that file segmentation generation and consumption in the real-time broadcast environment can be indicated.

FIG. 38 is a block diagram illustrating a broadcast signal transmission apparatus according to an embodiment of the present invention.

Referring to FIG. 38, the broadcast signal transmission apparatus for transmitting broadcast signals including multimedia content using the broadcast network may include a signaling encoder C21005, a Transmission Block Generator C21030, and/or a Transmitter C21050.

The signaling encoder C21005 may generate signaling information. The signaling information may indicate whether multimedia content will be transmitted in real time. The signaling information may indicate that the above-mentioned multimedia content is transmitted from among at least one of the file level and the FDT level in real time.

When the signaling information indicates that multimedia content is transmitted at a power level in real time, all data belonging to the corresponding file can be transmitted in real time. When the signaling information indicates that multimedia content is transmitted at an FDT level in real time, all files or data belonging to the corresponding FDT can be transmitted in real time.

If the signaling information indicates real-time transmission of the multimedia content, the Transmission Block Generator C21030 may divide the file contained in the multimedia content into one or more TBs corresponding to data that is independently encoded and transmitted.

The transmitter C21050 may transmit the transmission block (TB).

A detailed description thereof will hereinafter be described with reference to FIG. 39.

FIG. 39 is a block diagram illustrating a broadcast signal transmission apparatus according to an embodiment of the present invention.

Referring to FIG. 39, the broadcast signal transmission apparatus for transmitting broadcast signals including multimedia content using the broadcast network according to the embodiment may include a signaling encoder (not shown), a Media Encoder C21010, a Fragment Generator C21020, a Transmission Block Generator C21030, a Packetizer C21040, and/or a Transmitter C21050.

The signaling encoder (not shown) may generate signaling information. The signaling information may indicate whether multimedia content will be transmitted in real time.

Media Encoder C21010 may encode multimedia content so that it can generate media data using the encoded multimedia content. Hereinafter, the term "media data" will be referred to as data.

Fragment Generator C21020 may segment each file constructing the multimedia content, so that it can generate at least one fragment indicating a data unit that is independently encoded and reproduced.

Fragment Generator C21020 may generate the fragment payload constructing each fragment and then generate the fragment header.

Fragment Generator C21020 may buffer media data corresponding to the fragment payload. Thereafter, the Fragment Generator C21020 may generate a chunk corresponding to the fragment payload on the basis of the buffered media data. For example, the chunk may be a variable-sized data unit composed of the same media data as in GOP of video data.

If generation of the chunk corresponding to the fragment payload is not completed, the Fragment Generator C21020 continuously buffers the media data, and completes generation of the chunk corresponding to the fragment payload.

Fragment Generator C21020 may determine whether data corresponding to the fragment payload is generated as a chunk whenever the chunk is generated.

If the chunk corresponding to the fragment payload is completed generated, Fragment Generator C21020 may generate the fragment header corresponding to the fragment payload.

Transmission Block Generator C21030 may generate at least one TB indicating a data unit that is encoded and transmitted through fragment segmentation.

The transmission block (TB) according to the embodiment may indicate a minimum data unit that is independently encoded and transmitted without depending on the preceding data. For example, the TB may include one or more chunks composed of the same media data as in GOP of video data.

Transmission Block Generator C21030 may first transmit the TB corresponding to the fragment payload, and may generate the TB corresponding to the fragment header.

Transmission Block Generator C21030 may generate as a single TB. However, the scope or spirit of the present invention is not limited thereto, and the Transmission Block Generator C21030 may generate the fragment header as one or more TBs.

For example, if Fragment Generator C21020 generates the fragment payload constructing each fragment and then generates the fragment header, the Transmission Block Generator C21030 generates the transmission block (TB) corresponding to the fragment payload and then generates the TB corresponding to the fragment header.

However, the scope or spirit of the present invention is not limited thereto. If the fragment header and the fragment payload for the multimedia content are generated, the TB corresponding to the fragment header may be first generated and the TB corresponding to the fragment payload may be generated.

Transmission Block Generator C21030 may generate a transmission block (TB) corresponding to the fragment payload and a TB corresponding to the fragment header as different TB s.

Packetizer C21040 may divide the TB into one or more equal-sized symbols, so that the one or more symbols may be packetized into at least one packet. However, the scope or spirit of the present invention is not limited thereto, and the symbols may also be generated by other devices. In accordance with the embodiment, the symbols may have the same length. However, the last symbol of each TB may be less in length than other symbols.

Thereafter, Packetizer C21040 may packetize at least one symbol into one or more packets. For example, the packet may be an LCT packet. The packet may include a packet header and a packet payload.

The packet header may include fragment information having specific information regarding file segmentation generation and segmentation consumption. The file segmentation generation may indicate that data is divided into at least one chunk or at least one TB capable of independently encoding/transmitting the file constructing the multimedia content. The file segmentation consumption may indicate that at least one fragment capable of performing independent decoding/reproducing by combination of at least one TB is recovered and is reproduced on a fragment basis. In addition, segmentation consumption of the file may include data that is reproduced on a TB basis.

For example, the fragment information may include at least one of an SI field indicating that a packet includes initial data of the fragment, an FH field indicating that a packet includes header data, fragment completion information indicating that generation of a TB corresponding to each fragment is completed, and a PB field indicating the number of padding bytes contained in a packet.

The fragment information may further include a Header Extension Type (HET) field indicating the type of a Header Extension of the corresponding packet.

The fragment completion information may include at least one of the FC field indicating that a packet includes the last data of the fragment header and the FHL field indicating a total number of symbols corresponding to the fragment header.

The fragment information may be generated by Packetizer C21040, and may be generated by a separate device. The following description will hereinafter described on the basis of an exemplary case in which the packetizer C21040 generates the fragment information.

Packetizer C21040 may identify whether the generated symbol includes first data of the fragment.

For example, the packetizer C21040 may identify whether the generated symbol has first data of the fragment payload. If the generated symbol has first data of the fragment payload, the SI field may be set to 1. If the generated symbol does not have first data of the fragment payload, the SI field may be set to zero '0'.

Packetizer C21040 may identify whether the generated symbol has data of the fragment payload or data of the fragment header.

For example, if the generated symbol has data of the fragment payload, the FH field may be set to 1. If the generated symbol does not have data of the fragment payload, the FH field may be set to zero '0'.

Packetizer C21040 may identify whether generation of a TB corresponding to each fragment is completed. If fragment completion information indicating generation completion of a TB corresponding to each fragment may include the FC field indicating inclusion of the last data of the fragment header.

For example, if the generated symbol has data of the fragment header and is the last symbol of the corresponding TB, the FC field may be set to 1. If the generated symbol does not have data of the fragment header is not identical to the last symbol of the corresponding TB, the FC field may be set to zero '0'.

Packetizer C21040 may identify whether the generated symbol is the last symbol of the corresponding TB and has a length different from that of another symbol. For example, another symbol may be a symbol having a predetermined length, and the symbol having a different length from other symbols may be shorter in length than other symbols.

For example, if the generated symbol is the last symbol of the corresponding TB and has a different length from other symbols, the packetizer C21040 may insert the padding bytes into a packet corresponding to the last symbol of each TB. The packetizer C21040 may calculate the number of padding bytes.

In addition, the PB field may indicate the number of padding bytes. The padding byte is added to each symbol having a shorter length than other symbols in such a manner that all symbols may have the same length. Alternatively, the padding bytes may be the remaining parts other than symbols of the packet.

If the generated symbol is not identical to the last symbol of the corresponding TB or has a different length from other symbols, the PB field may be set to zero '0'.

The packet payload may include at least one symbol. The following description will hereinafter disclose an exemplary case in which one packet includes one symbol.

The packet having the last symbol of each TB may include at least one padding byte.

Transmitter C21050 may transmit one or more packet in the order of TB generation.

For example, the transmitter C21050 may first transmit the TB corresponding to the fragment payload, and then transmit the TB corresponding to the fragment header.

However, the scope or spirit of the present invention is not limited thereto. If the fragment header and the fragment payload are pre-generated for multimedia content, the transmitter C21050 according to the embodiment may first transmit the TB corresponding to the fragment header, and then transmit the TB corresponding to the fragment payload.

FIG. 40 is a flowchart illustrating a process for generating and transmitting in real time the file-based multimedia content according to an embodiment of the present invention.

FIG. 40 is a flowchart illustrating a method for transmitting broadcast signals using the above-mentioned broadcast signal transmission apparatus shown in FIG. 39.

Referring to FIG. 40, the broadcast signal transmission apparatus according to the embodiment may encode multimedia content using the Media Encoder C21010 in step CS11100. The broadcast signal transmission apparatus may encode multimedia content and then generate media data.

Thereafter, the broadcast signal transmission apparatus may perform buffering of media data corresponding to the fragment payload in step CS11200. The broadcast signal transmission apparatus may generate a chunk corresponding to the fragment payload on the basis of the buffered media data.

If generation of the chunk corresponding to the fragment payload is not completed, the broadcast signal transmission apparatus continuously perform buffering of media data, and then completes generation of the chunk corresponding to the fragment payload in step CS11300.

Thereafter, the broadcast signal transmission apparatus may divide each file constructing the multimedia content using the fragment generator C21020, such that it may generate at least one fragment indicating a data unit that is independently decoded and reproduced in step CS11400.

The broadcast signal transmission apparatus may generate the fragment payload constructing each fragment, and then generate the fragment header.

The broadcast signal transmission apparatus may determine whether all data corresponding to the fragment payload is generated as a chunk whenever the chunk is generated.

If generation of the chunk corresponding to the fragment payload is completed, the broadcast signal transmission apparatus may generate the fragment header corresponding to the fragment payload.

The broadcast signal transmission apparatus divides the fragment using the transmission block generator C21030, so that it can generate at least one TB indicating a data unit that is independently encoded and transmitted in step CS11500.

For example, when the fragment header is generated after the fragment payload constructing each fragment has been generated, the broadcast signal transmission apparatus may generate the TB corresponding to the fragment payload and then generate the TB corresponding to the fragment header.

The broadcast signal transmission apparatus may generate a TB corresponding to the fragment payload and a TB corresponding to the fragment header as different TBs.

Thereafter, the broadcast signal transmission apparatus may divide the TB into one or more equal-sized symbols using the packetizer C21040, and may packetize at least one symbol into at least one packet in steps CS11600 and CS11700.

A method for generating a packet using the broadcast signal transmission apparatus has already been disclosed in FIG. 40, and as such a detailed description thereof will herein be omitted for convenience of description.

Thereafter, the broadcast signal transmission apparatus may control the transmitter C21050 to transmit one or more packets in the order of TB generation.

FIG. 41 is a flowchart illustrating a process for allowing the broadcast signal transmission apparatus to generate packets using a packetizer according to an embodiment of the present invention.

Referring to FIG. 41, the broadcast signal transmission apparatus may identify whether the generated symbol has first data of the fragment in step CS11710.

For example, if the generated symbol has first data of the fragment payload, the SI field may be set to 1 in step CS11712. If the generated symbol does not include first data of the fragment payload, the SI field may be set to zero '0' in step S11714.

Thereafter, the broadcast signal transmission apparatus may identify whether the generated symbol has data of the fragment payload or data of the fragment header in step CS11720.

For example, if the generated symbol has data of the fragment payload, the FH field may be set to 1 in step CS11722. If the generated symbol does not have data of the fragment payload, the FH field may be set to zero '0' in step CS11724.

The broadcast signal transmission apparatus may identify whether generation of the TB corresponding to each fragment is completed in step CS11730.

For example, if the generated symbol has data of the fragment header and is the last symbol of the corresponding TB, the FC field may be set to 1 in step CS11732. If the generated symbol does not have data of the fragment header or is not identical to the last symbol of the corresponding TB, the FC field may be set to zero '0' in step CS11734.

Thereafter, the broadcast signal transmission apparatus may identify whether the generated symbol is the last symbol of the corresponding TB and has a different length from other symbols in step CS11740.

For example, if the generated symbol is the last symbol of the corresponding TB and has a different length from other symbols, the broadcast signal transmission apparatus may insert the padding bytes into a packet corresponding to the last symbol of each TB. The broadcast signal transmission apparatus may calculate the number of padding bytes in step CS11742. The PB field may indicate the number of padding bytes.

If the generated symbol is not identical to the last symbol of the corresponding TB or has a different length from other symbols, the PB field may be set to zero '0' in step CS11744.

The packet payload may include at least one symbol.

FIG. 42 is a flowchart illustrating a process for generating/transmitting in real time the file-based multimedia content according to an embodiment of the present invention.

Referring to FIG. 42, contents shown in FIGS. 40 and 41 from among all contents of FIG. 42 are substantially identical to each other, and as such a detailed description thereof will herein be omitted for convenience of description.

In accordance with an embodiment, the broadcast signal transmission apparatus may use the FHL field instead of the FC field. For example, the above-mentioned fragment information may include fragment completion information indicating generation completion of a TB corresponding to each fragment. The fragment completion information may include the FHL field indicating a total number of symbols corresponding to the fragment header.

The broadcast signal transmission apparatus according to the embodiment may calculate the number of symbols corresponding to the TB including data of the fragment header, and may record the calculated result in the FHL field in step CS12724.

The FHL field may indicate the length of a fragment header as a total number of symbols corresponding to the fragment header. The FHL field may be contained in the fragment information instead of the above-mentioned FC field in such a manner that the broadcast signal reception apparatus can identify reception completion of the fragment header.

The broadcast signal reception apparatus according to the embodiment checks the number of transmission times of a packet including as many fragment headers as the number of data pieces recorded in the FHL field, so that it can identify whether or not the fragment header is received.

FIG. 43 is a block diagram illustrating a file-based multimedia content receiver according to an embodiment of the present invention.

Referring to FIG. 43, the broadcast signal reception apparatus for transmitting a broadcast signal including multimedia content using the broadcast network may include a receiver (not shown), a signaling decoder C22005, a Transmission Block Regenerator C22030, and/or a Media Decoder C22060.

The signaling decoder C22005 may decode signaling information. The signaling information may indicate whether the multimedia content will be transmitted in real time.

If the signaling information indicates real-time transmission of the multimedia content, Transmission Block Regenerator C22030 combines broadcast signals, so that it can recover at least one TB indicating a data unit that is independently encoded and transmitted.

Media Decoder C22060 may decode the TB.

A detailed description thereof will hereinafter be described with reference to FIG. 44.

FIG. 44 is a block diagram illustrating a file-based multimedia content receiver according to an embodiment of the present invention.

Referring to FIG. 44, the broadcast signal reception apparatus according to the embodiment may include a receiver (not shown), a signaling decoder (not shown), a Packet Filter C22010, a Packet Depacketizer C22020, a Transmission Block Regenerator C22030, a Fragment Regenerator C22040, a Fragment Parser C22050, a Media Decoder C22060, and/or a Media Renderer C22070.

The receiver (not shown) may receive a broadcast signal. The broadcast signal may include at least one packet. Each packet may include a packet header including fragment information and a packet payload including at least one symbol.

The signaling decoder C22005 may decode signaling information. The signaling information may indicate whether the multimedia content will be transmitted in real time.

Packet Filter C22010 may identify a fragment start time starting from at least one packet received at an arbitrary time, and may start packet processing from the fragment start time.

Packet Filter C22010 may identify the fragment start time on the basis of the SI field of fragment information contained in the packet. If Packet Filter C22010 indicates that the corresponding packet includes a start part of the fragment, the previous packets of the corresponding packet are discarded and some packets starting from the corresponding packet may be transmitted to the packet depacketizer C22020.

For example, the packet filter C22010 discards the previous packets, each of which is set to 1, and some packet starting from the corresponding packet that is set to 1 may be filtered.

The packet depacketizer C22020 may depacketize at least one packet, and may extract fragment information contained in the fragment header and at least one symbol contained in the packet payload.

Transmission Block Regenerator C22030 may combine packets so that it can recover at least one TB indicating a data unit that is independently encoded and transmitted. The recovered TB may include data corresponding to the fragment header, and may include data corresponding to the fragment payload.

Fragment Regenerator C22040 combines at least one TB, completes recovery of the fragment header and the fragment payload, and combines the fragment header and the fragment payload, so that the fragment regenerator C22040 may recover the fragment indicating a data unit that is independently decoded and reproduced.

Fragment Regenerator C22040 combines the TB on the basis of fragment information, so that the fragment regenerator C22040 may recover the fragment payload and the fragment header. Fragment Regenerator C22040 may first recover the fragment payload in the order of reception packets, and may recover the fragment header.

If the FH field indicates that the packet has data of the fragment header, the fragment regenerator C22040 may combine at least one TB corresponding to the fragment header so that it recovers the fragment header according to the combined result.

If the FH field indicates that the packet does not include data of the fragment header, the Fragment Regenerator C22040 may recover the fragment payload by combining at least one TB.

For example, if the FH field is set to zero '0', the Fragment Regenerator C22040 may determine fragment payload so that it can recover the fragment payload. If the FH field is set to 1, the fragment regenerator C22040 determines the fragment header so that it can recover the fragment header.

Thereafter, if Fragment Regenerator C22040 completes recovery of the fragment payload and the fragment header corresponding to each fragment, the recovered fragment payload and the recovered fragment header are combined so that the fragment is recovered.

There are two methods for allowing the fragment regenerator C22040 to determine whether recovery of the fragment payload and the fragment header corresponding to each fragment has been completed.

The first method is to use the FC field contained in the fragment information.

The fragment completion information may include the FC field indicating that the packet has the last data of the fragment header. If the FC field indicates that the packet has the last data of the fragment header, the Fragment Regenerator C22040 determines that the fragment header constructing each fragment and the fragment payload have been received, and can recover the fragment header and the fragment payload.

For example, if the fragment payload constructing each fragment is first received and the fragment header is then received, the FC field may indicate that the corresponding packet includes the last data of the fragment header.

Therefore, if the FC field indicates that the corresponding packet has the last data of the fragment header, the Fragment Regenerator C22040 may recognize reception completion of the fragment header and may recover the fragment header. Thereafter, the Fragment Regenerator C22040 may combine the fragment header and the fragment payload so as to recover the fragment.

If the FC field indicates that the corresponding packet has the last data of the fragment header, the broadcast signal reception apparatus may repeat a process for recovering the transmission block (TB).

For example, if the FC field is not set to 1, the broadcast signal reception apparatus may repeat the recovery process of the TB. If the FC field is set to 1, the Fragment Regenerator C22040 may recover the fragment by combination of the fragment header and the fragment payload.

The second method can determine whether recovery of the fragment payload constructing each fragment and the fragment header has been completed on the basis of the FHL field contained in the fragment information.

The Fragment Regenerator C22040 may count the number of packets including data of the fragment header.

The fragment completion information may further include the FHL field indicating a total number of symbols corresponding to the fragment header. If the value recorded in the FHL field is identical to the number of packets having data of the fragment header, the Fragment Regenerator C22040 may recover the fragment header and the fragment payload.

A detailed description of a method for allowing the fragment regenerator C22040 to use the FHL field is shown in FIG. 44.

Fragment Parser C22050 may parse the recovered fragment. Since the fragment header is located at the front of the recovered fragment and the fragment payload is located at the rear of the recovered fragment, the Fragment Parser C22050 may first parse the fragment header and then parse the fragment payload.

Fragment Parser C22050 may parse the recovered fragment so that it can generate at least one media access unit. For example, the media access unit may include at least one media data. The media access unit may have a unit of media data having a predetermined size.

Media Decoder C22060 may decode the fragment. Media Decoder C22060 may decode at least one media access unit so as to generate media data.

Media Renderer C22070 may render the decoded media data so as to perform presentation.

FIG. 45 is a flowchart illustrating a process for receiving/consuming a file-based multimedia content according to an embodiment of the present invention.

Contents shown in FIG. 44 can be equally applied to the broadcast signal reception method according to the embodiment.

Referring to FIG. 45, a broadcast signal reception method for receiving multimedia content including at least one file includes: receiving the multimedia content divided into at least one packet; recovering at least one TB indicating a data unit that is independently encoded and transmitted by packet combination; and completing recovery of the fragment header and the fragment payload by combination of one or more TBs, recovering a fragment indicating a data unit that is independently encoded and reproduced by combination of the fragment header and the fragment payload, and/or performing fragment decoding.

The broadcast signal reception apparatus according to the embodiment may receive a broadcast signal using the receiver (not shown) in step CS21010. The broadcast signal may include at least one packet.

Thereafter, the broadcast signal reception apparatus according to the embodiment may control the packet filter C22010 to identify a fragment start time from at least one packet received at an arbitrary time in step CS21020.

Thereafter, the broadcast signal reception apparatus according to the embodiment may depacketize at least one packet using the packet depacketizer C22020, so that it can extract at least one symbol contained in the fragment information and packet payload contained in the packet header in step CS21030.

Thereafter, the broadcast signal reception apparatus combines packets using the transmission block regenerator C22030, so that it can recover at least one TB indicating a data unit that is independently encoded and transmitted in step CS21040. The reproduced TB may include data corresponding to the fragment header, and may include data corresponding to the fragment payload.

The broadcast signal reception apparatus according to the embodiment may control the fragment regenerator C22040 to identify whether the TB reproduced on the basis of fragment information is a TB corresponding to the fragment header and a TB corresponding to the fragment payload in step CS21050.

Thereafter, the broadcast signal reception apparatus may combine the recovered TB so that it can recover the fragment payload and the fragment header.

If the FH field indicates that the packet does not include data of the fragment header, the broadcast signal reception apparatus combines at least one TB corresponding to the fragment payload so that it can recover the fragment payload in step CS21060.

If the FH field indicates that the packet has data of the fragment header, the broadcast signal reception apparatus may recover the fragment header by combination of at least one TB corresponding to the fragment header in step CS21070.

The broadcast signal reception apparatus may determine whether the fragment payload constructing each fragment and the fragment header on the basis of the FC field contained in fragment information have been completely recovered in step CS21080.

If the FC field indicates that the corresponding packet does not have the last data of the fragment header, the broadcast signal reception apparatus may repeat the TB recovery process.

If the FC field indicates that the corresponding packet has the last data of the fragment, the broadcast signal reception apparatus may determine reception completion of each fragment.

For example, if the fragment header is received after the fragment payload constructing each fragment is first received, the FC field may indicate that the corresponding packet has the last data of the fragment header.

Therefore, if the FC field indicates that the packet has the last data of the fragment header, the broadcast signal reception apparatus determines that the fragment header constructing each fragment and the fragment payload have been completely received, so that it can recover the fragment header and the fragment payload.

If the FC field indicates that the corresponding packet does not have the last data of the fragment header, the broadcast signal reception apparatus may repeat the TB recovery process.

Thereafter, the broadcast signal reception apparatus may combine at least one TB using the Fragment Regenerator C22040 to complete recovery of the fragment header and the fragment payload, and may combine the fragment header and the fragment payload to recover the fragment indicating a data unit that is independently decoded and reproduced in step CS21090.

The broadcast signal reception apparatus according to the embodiment may parse the recovered fragment using the fragment parser C22050 in step CS21090. The broadcast signal reception apparatus parses the recovered fragment so that it can generate at least one media access unit. However, the scope or spirit of the present invention is not limited thereto, and the broadcast signal reception apparatus parses the TB so that it can generate at least one media access unit.

Thereafter, the broadcast signal reception apparatus according to the embodiment may decode at least one media access unit using the media decoder C22060, so that it can generate media data in step CS21100.

The broadcast signal reception apparatus according to the embodiment may perform rendering of the decoded media data using the media renderer C22070 so as to perform presentation in step CS21110.

FIG. 46 is a flowchart illustrating a process for receiving/consuming in real time a file-based multimedia content according to an embodiment of the present invention.

Referring to FIG. 46, some parts of FIG. 46 are substantially identical to those of FIG. 45, and as such a detailed description thereof will herein be omitted.

The broadcast signal reception apparatus according to the embodiment may determine whether the fragment header and the fragment payload constructing each fragment have been completely received on the basis of the FHL field.

The broadcast signal reception apparatus according to the embodiment may allow the fragment regenerator C22040 to identify whether the TB recovered on the basis of fragment information is a TB corresponding to the fragment header or a TB corresponding to the fragment payload in step CS22050.

Thereafter, the broadcast signal reception apparatus combines the recovered TBs so that it can recover each of the fragment payload and the fragment header.

If the FH field indicates that the corresponding packet has data corresponding to the fragment payload, the broadcast signal reception apparatus may combine at least one TB so that it can recover the fragment payload in step CS22060.

If the FH field indicates that the corresponding packet has data corresponding to the fragment header, the Fragment Regenerator C22040 may recover the fragment header by combination of at least one TB in step CS22070.

Thereafter, if the broadcast signal reception apparatus completes recovery of the fragment payload constructing each fragment and the fragment header, the fragment signal reception apparatus may recover the fragment by combination of the recovered fragment payload and the fragment header.

The broadcast signal reception apparatus may determine whether the fragment payload constructing each fragment and the fragment header have been completely reproduced on the basis of the FHL field contained in fragment information.

The broadcast signal reception apparatus may count the number (N) of packets constructing each fragment in step CS22080. For example, the broadcast signal reception apparatus may count the number of packets each having data of the fragment header. One packet may include at least one symbol, and the following description will hereinafter describe an exemplary case in which one packet includes one symbol.

The FHL field may indicate the number of symbols constructing the fragment. If as many packets as the number of symbols recorded in the FHL field are not received, the broadcast signal reception apparatus may repeat the TB recovery process. For example, if reception of the fragment payload constructing each fragment and the fragment header is not completed, the broadcast signal reception apparatus may repeat the TB recovery process.

Fragment completion information may further include the FHL field indicating a total number of symbols corresponding to the fragment header.

If the value recorded in the FHL field is identical to the number of packets, the broadcast signal reception apparatus determines that the fragment payload constructing each fragment and the fragment header have been completely received, and then recovers the fragment header and the fragment payload in step CS22090.

For example, the FHL field may indicate a total number of symbols corresponding to each fragment including both the fragment header and the fragment payload. In this case, if as many packets as the number of symbols recorded in the FHL field are received, the broadcast signal reception apparatus can determine that the fragment payload constructing each fragment and the fragment header have been completely received.

For example, the FHL field may indicate a total number of symbols to be transmitted later from among the fragment header and the fragment payload.

If the fragment payload constructing each fragment is first received and the fragment header is then received, the FHL field may indicate a total number of symbols corresponding to the fragment header. In this case, the number of symbols recorded in the FHL field is identical to the number of packets corresponding to the received fragment header, the broadcast signal reception apparatus may determine that the fragment payload constructing each fragment and the fragment header have been completely received.

In addition, if the fragment header constructing each fragment is first received and the fragment payload is then received, the FHL field may indicate a total number of symbols corresponding to the fragment payload. In this case, if the number of symbols recorded in the FHL field is identical to the number of packets corresponding to the received fragment payload, the broadcast signal reception apparatus may determine that the fragment payload constructing each fragment and the fragment header have been completely received.

Thereafter, if the fragment payload constructing each fragment and the fragment header have been completely received, the broadcast signal reception apparatus combines the fragment header and the fragment payload so as to recover the fragment in step CS22100.

Thus far, an embodiment of the present invention in which multimedia content is transmitted and received through a broadcast network in a transport block unit in real time using a transport block as a data unit with a variable size has been described.

Hereinafter, another embodiment of the present invention in which multimedia content is transmitted and received through a broadcast network in an object internal structure unit with a variable size in real time using boundary information and type information of the object internal structure will be described.

However, the same terms of another embodiment of the present invention as in an embodiment of the present invention may include the above description, and thus a detailed description thereof will be omitted herein. In addition, the descriptions related to FIGS. 1 to 46 can also be applied to FIGS. 47 to 60.

<Identifying Method of Transport Object Type-1>

FIG. 47 is a diagram illustrating a structure of a packet including object type information according to another embodiment of the present invention.

According to another embodiment of the present invention, a packet may be an LCT packet and the LCT packet may include an LCT version number field (V), a congestion control flag field (C), a protocol-specific indication field (PSI), a transport session identifier flag field (S), a transport object identifier flag field (O), a half-word flag field (H), a sender current time present flag field (T), an expected residual time present flag field (R), a close session flag field (A), a close object flag field (B), an LCT header length field (HDR_LEN), a codepoint field (CP), a congestion control information field (CCI), a transport session identifier field (TSI), a transport object identifier field (TOI), a header extensions field, an FEC Payload ID field, and/or an encoding symbol(s) field.

According to another embodiment of the present invention, a packet may include packet information including metadata. The packet information may include object type information indicating a type of an object that is transmitted by the current packet during transmission of MPEG-DASH content. The object type information may indicate a type of an object that is transmitted in a current packet or packets to which the same TOI is applied.

For example, the object type information may identify an object type using two reserved bits positioned at a $12^{th}$ bit from a start point of an LCT packet.

When MPEG-DASH content is transmitted in an LCT packet, the object type may include a regular file, initialization segment, media segment, and/or self-initializing segment.

For example, when a value of the object type information is "00", the object type may indicate "regular file", when a value of the object type information is "01", the object type may indicate "initialization segment", when a value of the object type information is "10", the object type may indicate "media segment", and a value of the object type information is "11", the object type may indicate "self-initializing segment".

An object type indicated by object type information may be varied according to transmitted file content and a scheme for defining a value of object type information may be transmitted in the form of signaling information separately from a session for current transmission or out-of-band.

The regular file refers to a data unit of the object form such as a regular file constituting multimedia content.

The initialization segment refers to a data unit of the object form including initialization information for access to representation. Initialization Segment may include a file type box (ftyp) and a movie box (moov). The file type box (ftyp) may include a file type, a file version, and compatibility information. The movie box (moov) may include metadata for describing media content.

The media segment refers to a data unit of the object form associated with media divided according to quality and time, which is to be transmitted to a broadcast signal receiving apparatus in order to support a streaming service. The media segment may include a segment type box (styp), a segment index box (sidx), a movie fragment box (moof), and a media data box (mdat). The segment type box (styp) may include segment type information. The segment index box (sidx) may provide stream access points (SAP) information, data offset, initial presentation time of media data present in the corresponding media segment, etc. The movie fragment box (moof) may include metadata about media data box (mdat). The media data box (mdat) may include actual media data about a component media component (video, audio, etc.).

The self-initializing segment refers to a data unit of the object form including both information of initialization segment and information of media segment.

<Identifying Method of Transport Object Type-2>

FIG. 48 is a diagram illustrating a structure of a packet including object type information according to another embodiment of the present invention.

In addition to the aforementioned method, the object type information can identify a type of an object that is transmitted in a current packet using LCT header extension. The object type information using LCT header extension can be applied to a packet, etc. for a transport protocol such as a realtime protocol (RTP), etc.

The object type information may include a header extension type (HET) field, a type field, and/or a reserved field.

The HET field may be an 8-bit integer and may indicate a type of the corresponding header extension. For example, the HET field may be one characteristic value among values of 128 to 255 and may identify a type of the corresponding header extension. In this case, the header extension may have a fixed length of 32 bits.

The type field may indicate a type of an object that is transmitted in a current LCT packet or packets to which the same TOI is applied. Hereinafter, the type field may be represented by object type information. When MPEG-DASH content is transmitted in the LCT packet, the object type may include the regular file, initialization segment, media segment, and self-initializing segment according to a value of the object type information.

For example, when a value of the object type information is "0x00", the object type may indicate "regular file", when a value of the object type information is "0x01", the object type may indicate "initialization segment", when a value of the object type information is "0x10", the object type may indicate "media segment", and when a value of the object type information is "0x11", the object type may indicate "self-initializing segment".

The reserved field is reserved for future use.

Hereinafter, a detailed description for FIG. 48 is the same as in the above detailed description, and thus will be omitted herein.

FIG. 49 is a diagram illustrating a structure of a broadcast signal receiving apparatus using object type information according to another embodiment of the present invention.

The broadcast signal receiving apparatus may different procedures based on the object type information according to an object type. That is, upon specifying and transmitting object type information in an LCT packet, the broadcast signal receiving apparatus may identify an object received based on the object type information and perform an appropriate operation according to an object type.

A broadcast signal receiving apparatus according to another embodiment of the present invention may include a signaling decoder C32005, a parser C32050, and/or a decoder C32060. However, components of the broadcast signal receiving apparatus are not limited thereto and the aforementioned components may be further included.

The signaling decoder C32005 may decode signaling information. The signaling information indicates whether a broadcast signal including multimedia content is transmitted using a broadcast network in real time.

The parser C32050 may parse at least one object based on the object type information and generate initialization information for access to Representation and at least one access unit. To this end, the parser C32050 may include an initialization segment parser C32051, a media segment parser C32052, and/or a self-initializing segment parser C32053. The initialization segment parser C32051, the media segment parser C32052, and the self-initializing segment parser C32053 will be described in detail in the next diagrams.

The decoder C32060 may initialize the corresponding decoder C32060 based on the initialization information. In addition, the decoder C32060 may decode at least one object. In this case, the decoder C32060 may receive information about an object in the form of at least one access unit and decode at least one access unit to generate media data.

FIG. 50 is a diagram illustrating a structure of a broadcast signal receiving apparatus using object type information according to another embodiment of the present invention.

The broadcast signal receiving apparatus may include a packet filter C32010, a segment buffer C32030, the parser C32050, a decoding buffer C32059, and/or the decoder C32060.

The packet filter C32010 may identify the object type information from at least one received packet and classify the object type information so as to perform a procedure corresponding to each object type based on the object type information.

For example, when the object type information is "1", the packet filter C32010 may transmit data of an LCT packet to the initialization segment parser C32051 through a segment buffer C32031, when the object type information is "2", the packet filter C32010 may transmit data of an LCT packet to the media segment parser C32052 through a segment buffer C32032, when the object type information is "3", the packet filter C32010 may transmit data of an LCT packet to the self-initializing segment parser C32053 through a segment buffer C32033.

The segment buffer C32030 may receive data of an LCT packet from a packet filter and store the data for a predetermined period of time. The segment buffer C32030 may be present as one component or a plurality of segment buffers C32031, C32032, and C32033.

The parser C32050 may parse at least one object based on the object type information and generate initialization information for access to representation and at least one access unit. To this end, the parser C32050 may include the initialization segment parser C32051, the media segment parser C32052, and/or the self-initializing segment parser C32053.

The initialization segment parser C32051 may parse initialization segment stored in the segment buffer C32031 and generate initialization information for access to representation. In addition, the initialization segment parser C32051 may receive initialization segment from the self-initializing segment parser C32053 and generate initialization information for access to representation.

The media segment parser C32052 may parse media segment stored in the segment buffer C32032 and generate information about media stream, at least one access unit, and information about a method for access to media presentation in the corresponding segment, such as presentation time or Index. In addition, the media segment parser C32052 may receive media segment from the self-initializing segment parser c32053 and generate information of media stream, at least one access unit, and information about a method for access to media presentation in the corresponding segment, such as presentation time or index.

The self-initializing segment parser C32053 may parse self-initializing segment stored in the segment buffer c32033 and generate initialization segment and media segment.

The decoding buffer C32059 may receive at least one access unit from the parser C32050 or the media segment parser C32052 and store the access unit for a predetermined period of time.

The decoder C32060 may initialize the corresponding decoder C32060 based on the initialization information. In addition, the decoder C32060 may decode at least one object. In this case, the decoder C32060 may receive information about an object in the form of at least one access unit and may decode at least one access unit to generate media data.

As described above, upon transmitting MPEG-DASH content, a broadcast signal transmitting apparatus according to another embodiment of the present invention may transmit object type information indicating a type of an object that is transmitted in a current packet. In addition, the broadcast signal transmitting apparatus may identify a type of an object in a packet received based on the object type information and perform an appropriate process on each object.

<Type of Object Internal Structure>

FIG. 51 is a diagram illustrating a structure of a packet including type information according to another embodiment of the present invention.

Upon transmitting data in an object internal structure unit as an independently meaningful unit, a broadcast signal transmitting apparatus may transmit data with a variable size. Thus, upon receiving and identifying an object internal structure even prior to receiving one entire object, a broadcast signal receiving apparatus may perform reproduction in an object internal structure unit. As a result, multimedia content may be transmitted and reproduced through a broadcast network in real time. According to another embodiment of the present invention, in order to identify an object internal structure, Type information and Boundary Information may be used.

Hereinafter, type information for identification of an object internal structure will be described in detail.

During transmission of MPEG-DASH content, packet information may include type information using LCT header extension. The type information may indicate a type of an object internal structure that is transmitted in a current packet. The type information may be referred to as internal structure type information for differentiation from object type information. The type information can be applied to a packet, etc. for a transport protocol such as realtime protocol (RTP), etc.

The type information may include a header extension type field (HET), an internal unit type field, and/or a reserved field.

The HET field is the same as in the above description and thus a detailed description thereof is omitted herein.

The internal structure type field may indicate a type of an object internal structure transmitted in an LCT packet.

An object may correspond to a segment of MPEG-DASH and an object internal structure may correspond to a lower component included in the object. For example, a type of the object internal structure may include fragment, chunk or GOP, an access unit, and a NAL unit. The type of the object internal structure may not be limited thereto and may further include meaningful units.

The fragment refers to a data unit that can be independently decoded and reproduced without dependence upon preceding data. Alternatively, the fragment may refer to a data unit including one pair of movie fragment box (moof) and media data container box (mdat). For example, the fragment may correspond to subsegment of MPEG-DASH or correspond to a fragment of MMT. The fragment may include at least one chunk or at least one GOP.

The chunk is a set of adjacent samples with the same media type and is a data unit with a variable size.

GOP is a basic unit for performing coding used in video coding and is a data unit with a variable size indicating a set of frames including at least one I-frame. According to another embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, B-frame or P-frame may refer to only a frame in the corresponding GOP and may not refer to frames in GOPs except for the corresponding GOP.

The access unit may refer a basic data unit of encoded video or audio and include one image frame or audio frame.

The NAL unit is an encapsulated and compressed video stream including summary information, etc. about a slice compressed in consideration of communication with a network device. For example, the NAL unit is a data unit obtained by packetizing data such as a NAL unit slice, a parameter set, SEI, etc. in a byte unit.

The reserved field may be reserved for future use.

Hereinafter, for convenience of description, the internal structure type field may be represented by type information.

<Boundary of Object Internal Structure>

FIG. 52 is a diagram illustrating a structure of a packet including boundary information according to another embodiment of the present invention.

Hereinafter, boundary information for identification of an object internal structure will be described in detail.

During transmission of MPEG-DASH content, packet information may include boundary information using LCT header extension. The boundary information may indicate a boundary of an object internal structure that is transmitted in a current packet. The boundary information can be applied to a packet, etc. for a transport protocol such as a realtime protocol (RTP), etc.

The boundary information may include a header extension type field (HET), a start flag field (SF), a reserved field, and/or an offset field.

The HET field is the same as in the above description and thus is not described in detail.

The start flag field (SF) may indicate that an LCT packet includes a start point of an object internal structure.

The reserved field may be reserved for future use.

The offset field may include position information indicating a start point of the object internal structure in an LCT packet. The position information may include a byte distance to the start point of the object internal structure from a payload start point of the LCT packet.

As described above, a broadcast signal transmitting apparatus may not transmit data in object units based on type information and boundary information and may transmit data in an object internal structure unit with a variable length.

A broadcast signal receiving apparatus may not receive and reproduce data in object units and may receive and reproduce data in an object internal structure unit with a variable length. Thus, the broadcast signal receiving apparatus may identify the object internal structure based on type information and boundary information and perform reproduction for each received object internal structure.

For example, the broadcast signal receiving apparatus may identify a type of a current object internal structure based on packets corresponding to start and end points of the object internal structure represented by the boundary information or type information included in at least one packet transmitted between the start and end points.

As a result, the broadcast signal receiving apparatus may rapidly identify the object internal structure and perform reproduction in real time even prior to receiving one entire object.

<Mapping of Transport Object and Signaling Information>

FIG. 53 is a diagram illustrating a structure of a packet including mapping information according to another embodiment of the present invention.

According to another embodiment of the present invention, an object internal structure can be identified using mapping information in addition to the aforementioned type information and boundary information.

During transmission of DASH content, the packet information may include the mapping information using LCT header extension. The mapping information maps at least one of a session transmitted in a current packet, an object and an object internal structure to at least one of a transport session identifier (TSI) and a transport object identifier (TOI). The mapping information may be used in a packet, etc. for a transport protocol such as a realtime protocol (RTP), etc.

According to an embodiment of the present invention, mapping information may include a header extension type field (HET), a header extension length field (HEL), and a uniform resource locator field (URL).

The HET field is the same as in the above description and is not described in detail.

The HEL field indicates an overall length of LCT header extension with a variable length. Basically, when HET has a value between 0 and 127, header extension with a variable length of a 32-bit word unit in LCT, and the HEL field subsequent to the HET field indicates an overall length of LCT header extension in a 32-bit word unit.

The URL field may be a variable field and may include a session for current transmission, an object, and a unique address on the Internet of an object internal structure.

Hereinafter, for convenience of description, the URL field may be represented via mapping information.

The mapping information may indicate URL of signaling information. In addition, the mapping information may include an identifier allocated by the signaling information as well as a session, an object, or a unique address of an object internal structure. The identifier may include a period ID, an adaptation set ID, a representation ID, and a component ID. Accordingly, in the case of MPEG-DASH content, the mapping information may include a segment URL, a representation ID, a component ID, an adaptation set ID, a period ID, etc.

For more perfect mapping, signaling information according to another embodiment of the present invention may further include mapping information for mapping URL of an object or identifier to TOI or TSI. That is, the signaling information may further include a portion of the URL of the object or identifier, to which currently transmitted TOI and TSI are mapped. In this case, the mapping information may be information for mapping the URL of the object or identifier to TOI or TSI according to one of 1:1, 1:multi, and multi:1.

<Grouping Method of Transport Session and Transport Object>

FIG. 54 is a diagram illustrating a structure of an LCT packet including grouping information according to another embodiment of the present invention.

According to another embodiment of the present invention, in addition to the aforementioned method, an object internal structure can be identified using the grouping information.

An LCT packet according to another embodiment of the present invention may include a session group identifier field (SGI) and a divided transport session identifier field (DTSI). SGI and DTSI are the form obtained by splitting a legacy transport session identifier field (TSI).

An LCT packet according to another embodiment of the present invention may include an object group identifier field (OGI) and a divided transport object identifier field (DTOI). OGI and DTOI are the form obtained by splitting a legacy transport object identifier field (TOI).

The S field indicates a length of a legacy TSI field, the O field indicates a length of a legacy TOI, and the H field indicates whether half-word (16 bits) is added to a length of a legacy TOI field and legacy TSI field.

Accordingly, the sum of lengths of the SGI field and DTSI field may be the same as a legacy TSI field and may be determined based on values of the S field and H field. In addition, the sum of lengths of the OGI field and DTOI field may be the same as a legacy TOI field and may be determined based on values of the O field and H field.

According to another embodiment of the present invention, the legacy TSI and TOI may be subdivided into SGI, DTSI, OGI, and DTOI, and SGI, DTSI, OGI, and DTOI may identify different data units.

SGI, DTSI, OGI, and DTO will be described in detail with reference to the next diagram.

FIG. 55 is a diagram illustrating grouping of a session and an object according to another embodiment of the present invention.

media presentation description (MPD) is an element for providing MPEG-DASH content as a streaming service. For example, the aforementioned presentation may be the concept of one service and may correspond to a package of MMT and MPD of MPEG-DASH. MPD C40000 may include at least one period. For example, the MPD C40000 may include a first period C41000 and a second period C42000.

The Period is an element obtained by dividing MPEG-DASH content according to reproduction time. An available bit rate, a language, a caption, a subtitle, etc. may not be changed in the period. Each period may include start time information and periods may be arranged in ascending order of a start time in MPD. For example, the first period C41000 is an element in a period of 0 to 30 min, and the second period C42000 is an element in a period of 30 to 60 min. A period may include at least one adaptationset (not shown) as a lower element.

The adaptationset is a set of at least one media content component of an interchangeable encoded version. The adaptationset may include at least one Representation as a lower element. For example, The adaptationset may include first representation C41100, second representation C41200, and third representation C41300.

Representation may be an element of a transmissible encoded version of at least one media content component and may include at least one media stream. A media content component may include a video component, an audio component, and a caption component. Representation may include information about quality of the media content component. Thus, a broadcast signal receiving apparatus may change representation in one adaptationset in order to adapt to a network environment.

For example, the first representation C41100 may be an audio or video component, the second representation C41200 may be an English caption component, and the third representation C41300 may be a Korean caption component. Representation may include at least one segment as a lower element. For example, the first representation C41100 may include a first segment C41110, a second segment C41120, and a third segment C41130.

Segment is an element with a greatest data unit, which can be retrieved according to one HTTP request. URL may be provided to each segment. For example, the aforementioned object may be the concept corresponding to a file, initialization segment, media segment, or self-initializing segment, may correspond to a segment of MPEG-DASH, and may correspond to MPU of MMT. Each Segment may include at least one fragment as a lower element. For example, the second segment C41120 may include a first fragment C41122, a second fragment C41124, and a third fragment C41126.

Fragment refers to a data unit that can be independently decoded and reproduced without depending upon preceding data. For example, Fragment may correspond to subsegment of MPEG-DASH and fragment of MMT. Fragment may include at least one chunk or at least one GOP. For example, the first fragment C41122 may include a fragment header and a fragment payload. The fragment header may include a segment index box (sidx) and a movie fragment box (moof). The fragment payload may include a media data container box (mdat). The media data container box (mdat) may include first to fifth Chunks.

The chunk is a set of adjacent samples having the same media type and is a data unit with a variable size.

According to the aforementioned embodiment of the present invention, TSI may identify a transport session, and each representation may be mapped to each TSI. In addition, TOI may identify a transport object in a transport session and each segment may be mapped to each TOI.

However, according to another embodiment of the present invention, TSI may be divided into GSI and DTSI, TOI is divided into OGI and DTOI, and GSI, DTSI, GOI, and DTOI may be mapped to respective new data units, which is not limited to the following embodiment of the present invention.

For example, SGI may identify a group of the same transport session and each period may be mapped to each SGI. A value of SGI of a first period C41000 may be mapped to "1" and a value of SGI of a second period C42000 may be mapped to "2". The value of SGI may not be limited to the aforementioned embodiment and may have the same value as period ID for identification of period.

DTSI may identify a transport session and each representation may be mapped to each DTSI. A value of DTSI of the first representation C41100 may be mapped to "1", a value of DTSI of the second representation C41200 may be mapped to "2", and a value of the DTSI of the third representation C41300 may be mapped to "2". The value of DTSI may not be limited to the aforementioned embodiment and may have the same value as a representation ID for identification of representation.

OGI may identify a group of the same object in a transport session and each Segment may be mapped to each OGI. A value of OGI of the first segment C41110 may be mapped to "1", a value of OGI of the second segment C41120 may be mapped to "2", and a value of OGI of the third segment C41130 may be mapped to "3".

DTOI identify a transport object. Each chunk or each GOP of a fragment header and a fragment payload may be mapped to each DTOI. A value of DTOI of a header of the first fragment C41122 may be mapped to "0" and values of DTOI of first to fifth chunks in a payload of the first fragment C41122 may be mapped to "10" to "14".

In the case of DTOI, usage may be defined according to a given value. For example, a DTOI value may be set in an ascending order or a descending order according to an arrangement order of objects. In this case, a broadcast signal receiving apparatus may re-arrange objects based on a DTOI value and generate a fragment or a segment. In addition, a specific DTOI value may indicate a fragment header. In this case, the broadcast signal transmitting apparatus or the broadcast signal receiving apparatus may determine whether a fragment header is completely transmitted based on the corresponding DTOI value.

FIG. 56 is a diagram illustrating a structure of a broadcast signal transmitting apparatus using packet information according to another embodiment of the present invention.

The broadcast signal transmitting apparatus may include a signaling encoder C31005, an internal structure generator C31030, a packet information generator C31035, and/or a transmitter C31050.

The signaling encoder C31005 may generate signaling information indicating whether a broadcast signal including multimedia content is transmitted in real time using a broadcast network. The signaling information may indicate that multimedia content is transmitted in real time in at least one of a file level or an FDT level. When the signaling information indicates that multimedia content is transmitted in real time in a file level, all data belonging to the corresponding file can be transmitted in real time. In addition, when the signaling information indicates that multimedia content is transmitted in real time in an FDT level, all files or data belonging to the corresponding FDT can be transmitted in real time.

The internal structure generator C31030 may generate at least one object internal structure as an independently encoded or decoded data unit. The object internal structure is obtained by dividing a file included in multimedia content into at least one data unit.

When the signaling information indicates that multimedia content is transmitted in real time, the packet information generator C31035 may generate packet information including metadata for identification of an object internal structure. Here, the packet information may include metadata about a packet for transmission of multimedia content and include metadata for identification of the object internal structure. The packet information may include boundary information indicating a boundary of the object internal structure and type information indicating a type of the object internal structure.

The boundary information may include a start flag (SF) field indicating whether a corresponding packet includes a start point of an object internal structure and an offset field indicating a position of a start point of the object internal structure in the corresponding packet.

The type of the object internal structure may include one of a fragment indicating a data unit including a pair of movie fragment box (moof) and media data container box (mdat), Chunk indicating a set of adjacent samples having the same media type, GOP indicating a set of frames including at least one I-frame, an access unit indicating a basic data unit of encoded video or audio, and a NAL unit indicating a data unit packetized in a byte unit.

In addition, the packet information may include mapping information for mapping at least one of a session, an object, and an object internal structure to at least one of a transport session identifier (TSI) and a transport object identifier (TOI).

The packet information may include grouping information for grouping a transport session and a transport object transmitted in a packet. The grouping information may include a divided transport session identifier (DTSI) field for identification of a transport session, a session group identifier (SGI) field for identification of a group having the same transport session, a divided transport object identifier (DTOI) field for identification of a transport object, and an object group identifier (OGI) field for identification of a group having the same transport object. Here, the SGI field may include information for identification of a period element of MPEG-DASH, the DTSI field may include information for identification of a representation element of MPEG-DASH, the OGI field may include information for identification of a segment element of MPEG-DASH, and the DTOI field may include information for identification of a chunk element of MPEG-DASH.

As described above, the packet information may identity at least one of a session, an object, and an object internal structure based on type information and boundary information, mapping information, and grouping information.

The broadcast signal transmitting apparatus may further include a packetizer (not shown). The packetizer may divide the object internal structure into at least one symbol with the same size and packetize the at least one symbol as at least one packet. However, the present invention is not limited thereto, and the symbol may be generated by another apparatus. The lengths of symbols according to another embodiment of the present invention may be the same. Then the packetizer may packetize at least one symbol as at least one packet. For example, the packet may include a packet header and a packet payload.

The packet header may include packet information for identification of an object internal structure.

The transmitter C31050 may transmit a broadcast signal including an object internal structure and packet information.

FIG. 57 is a diagram illustrating a structure of a broadcast signal receiving apparatus according to another embodiment of the present invention.

Hereinafter, common parts of the broadcast signal transmitting apparatus are not described, and the broadcast signal receiving apparatus will be described in terms of differences from the broadcast signal transmitting apparatus.

The broadcast signal receiving apparatus may identify an object internal structure based on packet information and performing decoding in a unit of received object internal structure. Thus, the broadcast signal receiving apparatus may not receive one entire object and may produce an object internal structure despite receiving the object internal structure.

A broadcast signal receiving apparatus according to another embodiment of the present invention may include a signaling decoder C32005, an extractor C32050, and/or a decoder C32060. However, the broadcast signal receiving apparatus may further include the aforementioned components.

The signaling decoder C32005 may decode signaling information. The signaling information indicates whether a broadcast signal including multimedia content is transmitted in real time using a broadcast network.

The extractor C32050 may identify an object internal structure from a broadcast signal and extract the object internal structure. The extractor C32050 may extract an object internal structure and transmit the object internal structure to the decoder C32060 based on packet information even prior to receiving one entire object. However, an operation of the extractor C32050 may be changed according to a type of the object internal structure. The aforementioned parser C32050 may perform the same operation as the extractor C32050 and the extractor C32050 may be represented by the parser C32050.

The extractor C32050 may identify a type of a current object internal structure according to type information and boundary information. For example, the extractor C32050 may identify a type of a current object internal structure based on a packet corresponding to start and end points of the object internal structure represented in the boundary information and type information included in at least one packet transmitted between the start and end points.

The extractor C32050 may extract at least one of an access unit, GOP or chunk, and fragment, which are object internal structures stored in an object buffer or a segment buffer. To this end, the extractor C32050 may further include an AU extractor C32056 for extracting the access unit, a chunk extractor C32057 for extracting chunk or GOP, and a fragment extractor C32058 for extracting fragment. Lower components of the extractor C32050 will be described in detail with reference to the next diagram.

The decoder C32060 may receive the object internal structure and decode the corresponding object internal structure based on type information. In this case, the decoder C32060 may receive information about the object internal structure in the form of at least one access unit and decode at least one access unit to generate Media Data.

FIG. 58 is a diagram illustrating a structure of a broadcast signal receiving apparatus using packet information according to another embodiment of the present invention.

Hereinafter, an operation and configuration of a broadcast signal receiving apparatus when a type of an object internal structure is an access unit will be described.

The broadcast signal receiving apparatus may further include a packet depacketizer C22020, a segment buffer C32030, an AU extractor C32056, a decoding buffer C32059, and/or a decoder C32060.

The packet depacketizer C22020 may depacketize at least one packet and extract packet information contained in a packet header. For example, the packet depacketizer C22020 may extract type information and boundary information included in the packet header and extract at least one symbol included in a packet payload. At least one symbol may be a symbol included in the object internal structure or a symbol included in an object.

The packet depacketizer C22020 may transmit the at least one extracted object or the at least one extracted object internal structure to the decoder C32060.

The segment buffer C32030 may receive packet of an LCT packet from the packet depacketizer C22020 and store the data for a predetermined period of time. The segment buffer C32030 may be repeated by an object buffer C32030. The segment buffer C32030 may further include the AU extractor C32056, a chunk extractor (not shown), and/or a fragment extractor (not shown). In addition, the segment buffer C320300 may further include a fragment buffer (not shown) and/or a chunk buffer (not shown).

When type information indicates that the type of the object internal structure is an access unit, the segment buffer C32030 may include the AU extractor C32056. However, the present invention is not limited thereto, and the AU extractor C32056 may be present independently from the segment buffer C32030.

The AU extractor C32056 may extract the access unit stored in the segment buffer C32030 based on boundary information. For example, one access unit may be from a start point of the access unit indicated by the boundary information to a start point of the next access unit.

Then the AU extractor C32056 may transmit the extracted access unit to the decoder C32060 through the decoding buffer C32059.

As described above, even if the broadcast signal receiving apparatus does not receive one entire object, upon completely receiving an internal structure of the corresponding object based on the type information and boundary information, the AU extractor C32056 may immediately extract the object internal structure and may transmit the object internal structure to the decoder C32060.

The decoding buffer C32059 may receive data from the segment buffer C32030 and store the data for a predetermined period of time. The access unit may be transmitted to the decoder C32060 or another component for a processing time given to the access unit in the decoding buffer C32059. In this case, timing information about the processing time such as a presentation time stamp (PTS), etc. may be given to the access unit in the form of LCT header extension.

The decoder C32060 may receive the object internal structure and decode the corresponding object internal structure based on the type information. In this case, the decoder C32060 may receive the corresponding object internal structure in the form of an access unit as well as in the form of object internal structure.

When type information indicates that the type of the object internal structure is an access unit, the decoder C32060 may decode the corresponding access unit as an internal structure of the corresponding object even prior to receiving an entire corresponding object.

FIG. 59 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is chunk or GOP will be described. The broadcast signal receiving apparatus may further include a packet depacketizer C22020, a segment buffer C32030, a chunk buffer C32035, a decoding buffer C32059, and/or a decoder C32060.

The packet depacketizer C22020 may transmit at least one extracted object or at least one object internal structure to the decoder C32060 through the segment buffer C32030.

The segment buffer C32030 may include the chunk extractor C32057. In addition, the segment buffer C32030 may further include the chunk buffer C32035.

When type information indicates that the type of the object internal structure is chunk or GOP, the chunk extractor C32057 may extract chunk or GOP stored in the segment buffer C32030 based on boundary information. For example, one chunk or GOP may be from a start point of the chunk or GOP indicated by the boundary information to a start point of the next chunk or GOP. The chunk extractor C32057 may be present in the segment buffer C32030 or independently.

The chunk buffer C32035 may receive at least one chunk or GOP and store the chunk or GOP for a predetermined period of time. The chunk buffer C32035 may be present in the segment buffer C32030 or independently. The chunk buffer C32035 may further include the AU extractor C32056.

The AU extractor C32056 may extract at least one access unit from the chunk or GOP stored in the chunk buffer C32035. Then the AU extractor C32056 may transmit the at least one extracted access unit to the decoder C32060 through the decoding buffer C32059.

When type information indicates that the type of the object internal structure is chunk or GOP, the decoder C32060 may decode the corresponding chunk or GOP as an internal structure of the corresponding object even prior to receiving an entire corresponding object.

FIG. 60 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is fragment will be described. The broadcast signal receiving apparatus may further include a packet depacketizer C22020, a segment buffer C32030, a fragment buffer C32036, an audio decoding buffer C32059-1, a video decoding buffer C32059-2, an audio decoder C32060-1, and/or a video decoder C32060-2.

The packet depacketizer C22020 may transmit at least one extracted object or at least one extracted object internal structure to the audio decoder C32060-1 and/or the video decoder C32060-2.

A segment buffer C320300 may include the fragment extractor C32058. In addition, the segment buffer C32030 may further include a fragment buffer C32036.

When the type information indicates that the type of the object internal structure is fragment, the fragment extractor C32058 may extract fragment stored in the segment buffer C320300. For example, one fragment may be from a start point of the fragment to a start point of the next fragment. The fragment extractor C32058 may be present in the segment buffer C32030 or independently.

The fragment buffer C32036 may receive fragment or store the fragment for a predetermined period of time. The fragment buffer C32036 may be present in the segment buffer C32030 or independently. The fragment buffer C32036 may further include the AU extractor C32056. In the fragment buffer C32036 may further include a chunk buffer (not shown).

The AU extractor C32056 may extract at least one access unit from fragment stored in the fragment buffer C32036. The AU extractor C32056 may be present in the fragment buffer C32036 or independently. In addition, the broadcast signal receiving apparatus may further include a chunk buffer (not shown), and the AU extractor C32056 may extract at least one access unit from chunk or GOP included in the chunk buffer. Then the AU extractor C32056 may transmit at least one extracted access unit to the audio decoder C32060-1 and/or the video decoder C32060-2.

The decoding buffer may include an audio decoding buffer C32059-1 and/or a video decoding buffer C32059-2. The audio decoding buffer C32059-1 may receive data associated with audio and store the data for a predetermined period of time. The video decoding buffer C32059-2 may receive data associated with video and store the data for a predetermined period of time.

When the type information indicates that the type of the object internal structure is fragment, the decoder may decode the corresponding fragment as an internal structure of the corresponding object even prior to receiving an entire corresponding object. The decoder may further include the audio decoder C32060-1 for decoding data associated with audio and/or the video decoder C 32060-2 for decoding data associated with video.

As described above, the broadcast signal transmitting apparatus may not transmit data in an object unit and may transmit data in an object internal structure unit with a variable length. In this case, the broadcast signal transmitting apparatus may transmit the transmitted type information and boundary information of the object internal structure.

The broadcast signal receiving apparatus may not reproduce data in an object unit and may reproduce data in an object internal structure unit with a variable length. Accordingly, the broadcast signal receiving apparatus may identify an object internal structure based on the type information and boundary information and perform reproduction for each received object internal structure.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A device with one or more processors for processing broadcast signals, the device comprising:
   a depacketizing processor for extracting one or more delivery objects from one or more Layered Coding Transport (LCT) packets of the broadcast signals based on signaling information including mapping information,
   wherein the one or more LCT packets are used to transport the one or more delivery objects including service data for one or more broadcast services of the broadcast signals,
   wherein the one or more delivery object are carried in one or more transport sessions,
   wherein each LCT packet includes a header having a Transport Object Identifier (TOI) identifying a delivery object being carried in the each LCT packet,
   wherein the mapping information is used to establish a one-to-one mapping between the TOI and a uniform resource locator (URL) for the delivery object,
   wherein the one or more LCT packets and the signaling information are transmitted separately,
   wherein the header of each LCT packet further includes type information indicating whether a type of the delivery object being carried in the each LCT packet is a media segment type or an initialization segment type; and
   a decoding processor for decoding the service data for the broadcast service.

2. The device of claim 1,
   wherein the signaling information further includes another mapping information, the other mapping information being mapped to a Transport Session Identifier (TSI) in the one or more LCT packets, the TSI identifying the transport session.

3. A method comprising:
   at an electronic device with one or more processors for processing broadcast signals:
   extracting one or more delivery objects from one or more Layered Coding Transport (LCT) packets based on signaling information including mapping information,
   wherein the one or more LCT packets are used to transport the one or more delivery objects including service data for one or more broadcast services of the broadcast signals,
   wherein the one or more delivery object are carried in one or more transport sessions, and
   wherein each LCT packet includes a header having a Transport Object Identifier (TOI) identifying a delivery object being carried in the each LCT packet, wherein the mapping information is used to establish a one-to-one mapping between the TOI and a uniform resource locator (URL) for the delivery object, wherein the one or more LCT packets and the signaling information are transmitted separately, wherein the header of each LCT packet further includes type information indicating whether a type of the delivery object being carried in the each LCT packet is a media segment type or an initialization segment type; and decoding the service data for the broadcast service.

4. The method according to claim 3, wherein the signaling information further includes another mapping information, the other mapping information being mapped to a Transport Session Identifier (TSI) in the one or more LCT packets, the TSI identifying the transport session.

* * * * *